United States Patent
Yamada et al.

(10) Patent No.: US 7,315,395 B2
(45) Date of Patent: Jan. 1, 2008

(54) IMAGE PROCESSING APPARATUS, IMAGE PROCESSING METHOD, PROGRAM FOR IMPLEMENTING THE METHOD, AND STORAGE MEDIUM

(75) Inventors: Akitoshi Yamada, Kanagawa (JP); Masao Kato, Kanagawa (JP)

(73) Assignee: Canon Kabushiki Kaisha (JP)

( * ) Notice: Subject to any disclaimer, the term of this patent is extended or adjusted under 35 U.S.C. 154(b) by 864 days.

(21) Appl. No.: 10/386,907

(22) Filed: Mar. 12, 2003

(65) Prior Publication Data

US 2004/0051905 A1    Mar. 18, 2004

(30) Foreign Application Priority Data

Mar. 15, 2002   (JP)   ............... 2002-072149

(51) Int. Cl.
*H04N 1/405* (2006.01)

(52) U.S. Cl. .................. 358/1.9; 358/3.05; 358/3.14

(58) Field of Classification Search ...... 358/3.03–3.06, 358/3.13–3.14, 1.9, 2.1, 3.21, 1.16
See application file for complete search history.

(56) References Cited

U.S. PATENT DOCUMENTS

| | | | | |
|---|---|---|---|---|
| 4,547,811 A | * | 10/1985 | Ochi et al. ................. | 382/176 |
| 4,833,531 A | * | 5/1989 | Abe et al. .................. | 382/300 |
| 4,922,332 A | * | 5/1990 | Taniguchi et al. .......... | 358/528 |
| 5,325,448 A | * | 6/1994 | Katayama et al. .......... | 382/270 |
| 6,285,464 B1 | * | 9/2001 | Katayama et al. ........... | 358/3.05 |

FOREIGN PATENT DOCUMENTS

| | | |
|---|---|---|
| JP | 54-56847 A | 5/1979 |
| JP | 59-123670 A | 7/1984 |
| JP | 59-138461 A | 8/1984 |
| JP | 60-71260 A | 4/1985 |
| JP | 63-35074 A | 2/1988 |
| JP | 05-56266 A | 3/1993 |
| JP | 8-279920 A | 10/1996 |
| JP | 9-139841 A | 5/1997 |
| JP | 11-10918 A | 1/1999 |
| JP | 2000-333000 A | 11/2000 |

* cited by examiner

*Primary Examiner*—Thomas D. Lee
*Assistant Examiner*—Stephen Brinich
(74) *Attorney, Agent, or Firm*—Rossi, Kimms & McDowell LLP

(57) ABSTRACT

There is provided an image processing apparatus which enables high-speed processing with simplified multiplications and divisions even in the case of error diffusion comprised of a combination of processes of two or more colors. The image processing apparatus performs error diffusion on multivalued image data composed of a plurality of density components and outputs the result of the error diffusion. A plurality of error tables are stored in a storage device. One error table is selected from the plurality of error tables according to a density value of a first density component among the plurality of density components and a density value of at least one other density component when performing the error diffusion on the first density component. A CPU performs the error diffusion on the multivalued image data using the selected error table.

20 Claims, 15 Drawing Sheets

FIG. 2
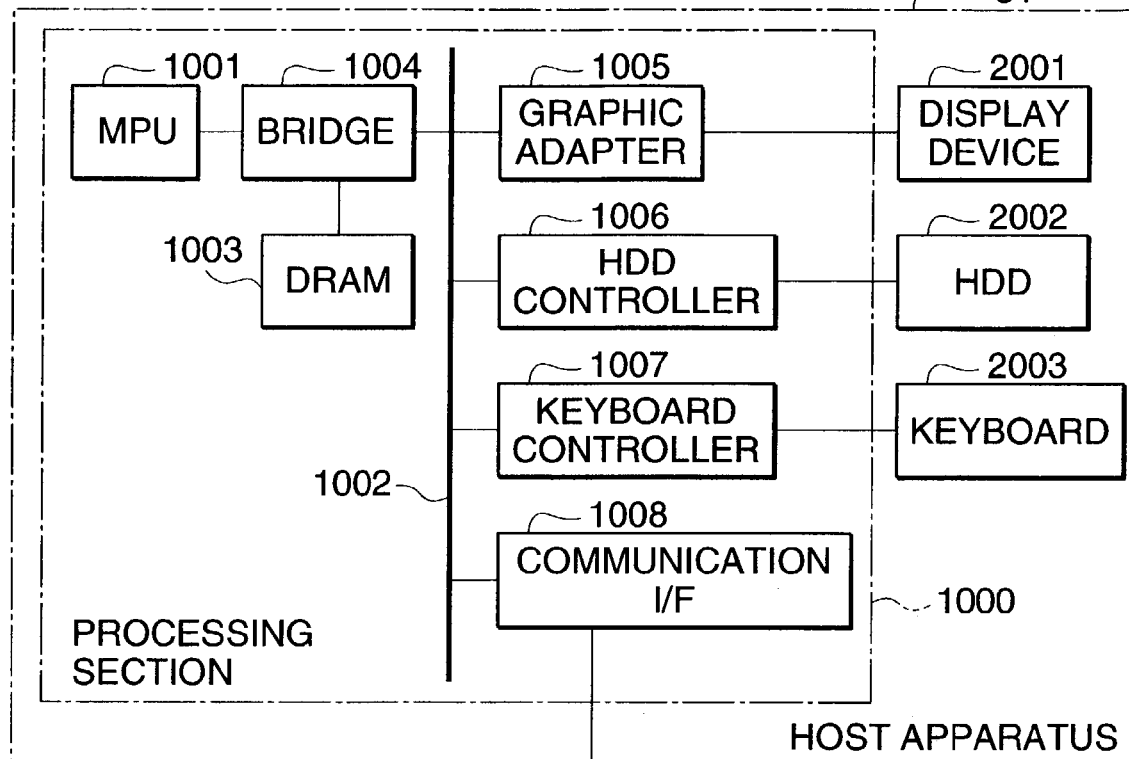
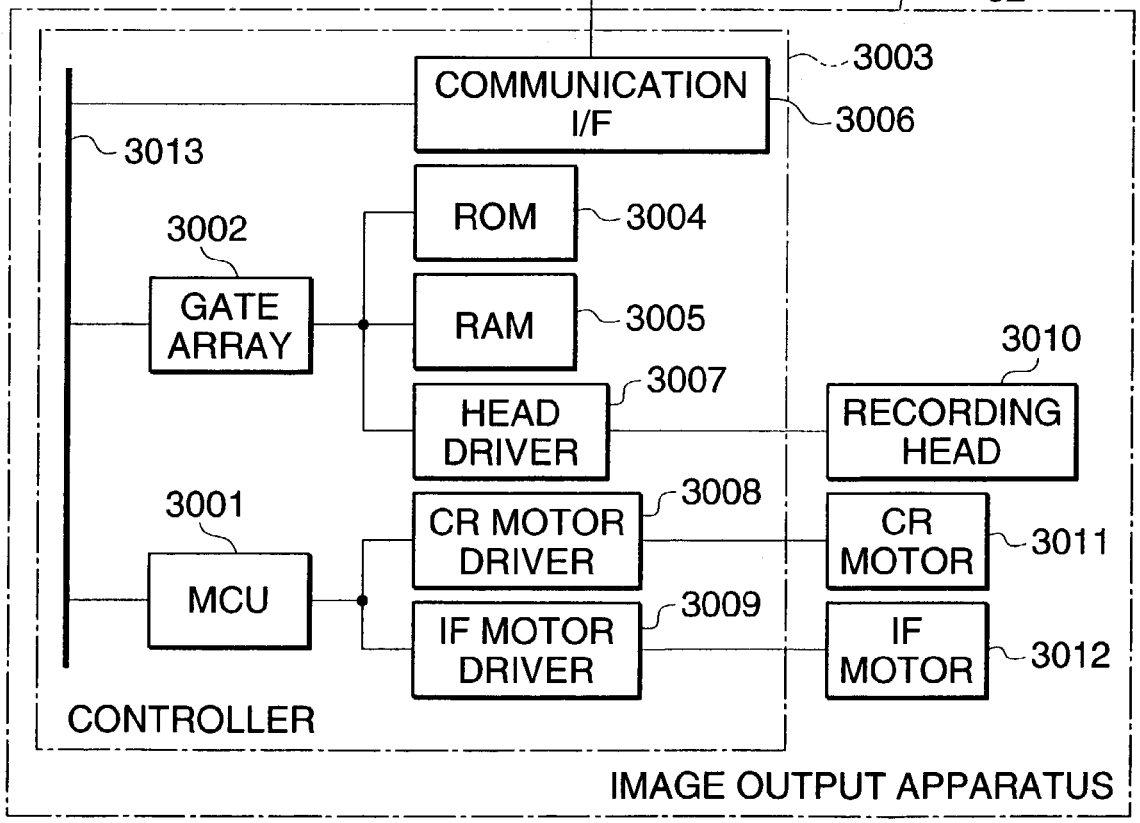

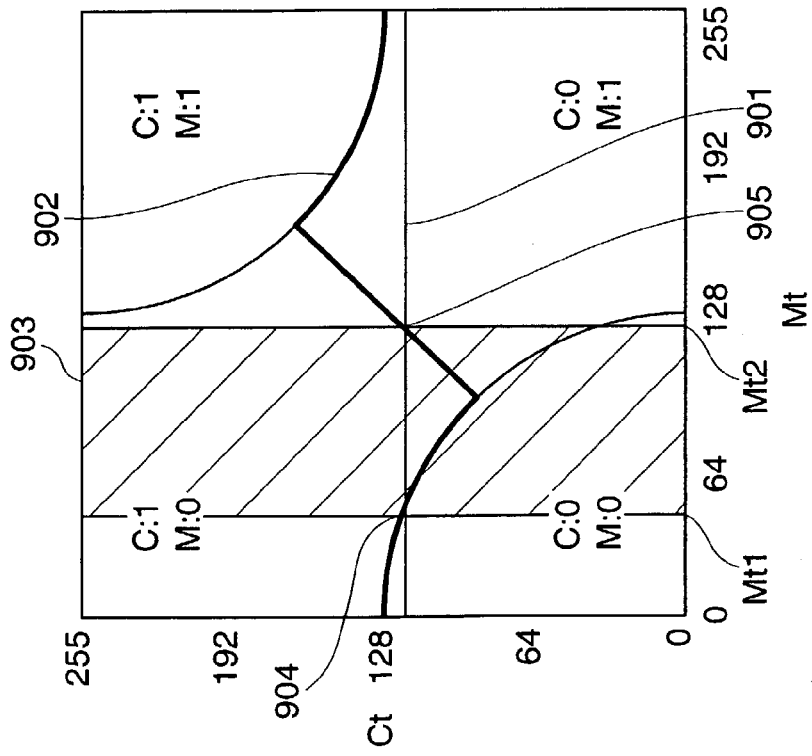

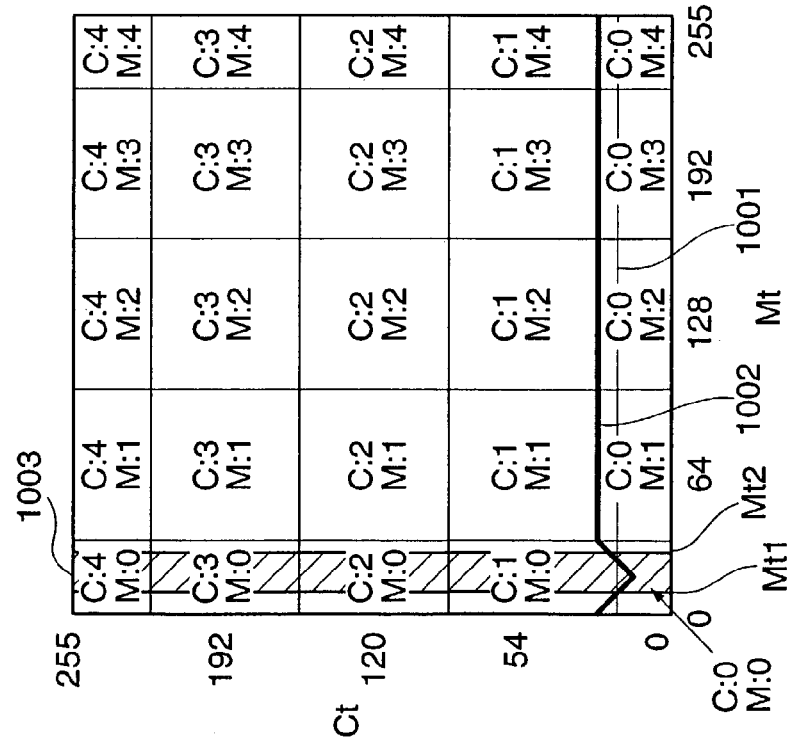

IMAGE PROCESSING APPARATUS, IMAGE PROCESSING METHOD, PROGRAM FOR IMPLEMENTING THE METHOD, AND STORAGE MEDIUM

BACKGROUND OF THE INVENTION

1. Field of the Invention

The present invention relates to an image processing apparatus and an image processing method that perform error diffusion on multivalued image data composed of a plurality of density components and outputs the error diffusion result, and a program for implementing the image processing method, as well as a storage medium storing the program.

2. Description of the Related Art

Conventionally, an error diffusing process has been known as a dithering process in which multivalued images are expressed in binary notation ("An Adaptive Algorithm for Spatial Gray Scale" in Society for Information Display 1975 Symposium Digest of Technical Papers, 1975, 36). In this process, where a notice pixel is designated by P, the density thereof is designated by v, the densities of peripheral pixels P0, P1, P2, P3 around the notice pixel P are designated by v0, v1, v2, and v3, respectively, and a binarization threshold is designated by T, a binarization error E of the notice pixel P is distributed to the peripheral pixels P0, P1, P2, and P3 by respective weighting factors W0, W1, W2, and W3 found empirically so that the average density can be macroscopically equal to the density of the original image.

For example, where binary data to be outputted is designated by o, the output binary data, binarization error E, the densities v0, v1, v2, and v3 of the peripheral pixels P1, P1, P2, and P3 are expressed by:

if $v \geq T$, $o=1$ and $E=v-V\text{max}$ if $v<T$, $o=0$ and $E=v-V\text{min}$      (1)

(Vmax: maximum density, Vmin: minimum density)

$v0=v0+E \times W0$      (2)

$v1=v1+E \times W1$      (3)

$v2=v2+E \times W2$      (4)

$v3=v3+E \times W3$      (5)

(Examples of the weighting factors: $W0=7/16$, $W1=1/16$, $W2=5/16$, and $W3=3/16$)

As an example of methods for performing the error diffusion at high speed, a method has been proposed in Japanese Laid-Open Patent Publication (Kokai) No. 63-35074 in which a value of a binarization error weighted in advance is determined for every value of density information such that the sum of the determined values is equal to the binarization error, thus simplifying multiplications and divisions and eliminating roundoff errors.

A description will now be given of the above method with reference to FIGS. 14A and 14B. FIG. 14A is a view showing the relationship between density values of cyan and magenta and output values thereof according to the conventional error diffusion method, and FIG. 14B is a view showing an example of a table of total cyan density values and weighted diffusion error values for use in the conventional error diffusion method.

For the convenience's sake, the following description refers to the case where a binary error diffusing process in which the output values are 1 or 2. As shown in FIG. 14A, there is no correlation between a total density value Ct as the sum of an input density value and an accumulated error value of the cyan component and a total density value Mt as the sum of an input density value and an accumulated error value of the magenta component, and the respective output values of the cyan and magenta components are determined to be 0 or 1 with a threshold thereof being set to 128. As shown in FIG. 14B, an output quantized value Cout determined for the cyan total density value Ct, an error value Error determined uniquely by the output quantized value Cout, and diffusion errors Error×W0 (abbreviated as E×W0), Error×W1 (abbreviated as E×W1), Error×W2 (abbreviated as E×W2), and Error×W3 (abbreviated as E×W3), which are weighted by respective predetermined weighting values W0, W1, W2, W3 based on the error value Error, can be collected into a table.

Tables 1 to 4 show detailed examples of values used for quantization of the cyan component. Detailed description of examples of values used for quantization of the magenta component is omitted.

TABLE 1

| Ct | Cout | Error | ExW0 | ExW1 | ExW2 | ExW3 |
|----|------|-------|------|------|------|------|
| 0  | 0 | 0  | 0.00  | 0.00  | 0.00 | 0.00 |
| 1  | 0 | 1  | 0.44  | 0.31  | 0.19 | 0.06 |
| 2  | 0 | 2  | 0.88  | 0.63  | 0.38 | 0.13 |
| 3  | 0 | 3  | 1.31  | 0.94  | 0.56 | 0.19 |
| 4  | 0 | 4  | 1.75  | 1.25  | 0.75 | 0.25 |
| 5  | 0 | 5  | 2.19  | 1.56  | 0.94 | 0.31 |
| 6  | 0 | 6  | 2.63  | 1.88  | 1.13 | 0.38 |
| 7  | 0 | 7  | 3.06  | 2.19  | 1.31 | 0.44 |
| 8  | 0 | 8  | 3.50  | 2.50  | 1.50 | 0.50 |
| 9  | 0 | 9  | 3.94  | 2.81  | 1.69 | 0.56 |
| 10 | 0 | 10 | 4.38  | 3.13  | 1.88 | 0.63 |
| 11 | 0 | 11 | 4.81  | 3.44  | 2.06 | 0.69 |
| 12 | 0 | 12 | 5.25  | 3.75  | 2.25 | 0.75 |
| 13 | 0 | 13 | 5.69  | 4.06  | 2.44 | 0.81 |
| 14 | 0 | 14 | 6.13  | 4.38  | 2.63 | 0.88 |
| 15 | 0 | 15 | 6.56  | 4.69  | 2.81 | 0.94 |
| 16 | 0 | 16 | 7.00  | 5.00  | 3.00 | 1.00 |
| 17 | 0 | 17 | 7.44  | 5.31  | 3.19 | 1.06 |
| 18 | 0 | 18 | 7.88  | 5.63  | 3.38 | 1.13 |
| 19 | 0 | 19 | 8.31  | 5.94  | 3.56 | 1.19 |
| 20 | 0 | 20 | 8.75  | 6.25  | 3.75 | 1.25 |
| 21 | 0 | 21 | 9.19  | 6.56  | 3.94 | 1.31 |
| 22 | 0 | 22 | 9.63  | 6.88  | 4.13 | 1.38 |
| 23 | 0 | 23 | 10.06 | 7.19  | 4.31 | 1.44 |
| 24 | 0 | 24 | 10.50 | 7.50  | 4.50 | 1.50 |
| 25 | 0 | 25 | 10.94 | 7.81  | 4.69 | 1.56 |
| 26 | 0 | 26 | 11.38 | 8.13  | 4.88 | 1.63 |
| 27 | 0 | 27 | 11.81 | 8.44  | 5.06 | 1.69 |
| 28 | 0 | 28 | 12.25 | 8.75  | 5.25 | 1.75 |
| 29 | 0 | 29 | 12.69 | 9.06  | 5.44 | 1.81 |
| 30 | 0 | 30 | 13.13 | 9.38  | 5.63 | 1.88 |
| 31 | 0 | 31 | 13.56 | 9.69  | 5.81 | 1.94 |
| 32 | 0 | 32 | 14.00 | 10.00 | 6.00 | 2.00 |
| 33 | 0 | 33 | 14.44 | 10.31 | 6.19 | 2.06 |
| 34 | 0 | 34 | 14.88 | 10.63 | 6.38 | 2.13 |
| 35 | 0 | 35 | 15.31 | 10.94 | 6.56 | 2.19 |
| 36 | 0 | 36 | 15.75 | 11.25 | 6.75 | 2.25 |
| 37 | 0 | 37 | 16.19 | 11.56 | 6.94 | 2.31 |
| 38 | 0 | 38 | 16.63 | 11.88 | 7.13 | 2.38 |
| 39 | 0 | 39 | 17.06 | 12.19 | 7.31 | 2.44 |
| 40 | 0 | 40 | 17.50 | 12.50 | 7.50 | 2.50 |
| 41 | 0 | 41 | 17.94 | 12.81 | 7.69 | 2.56 |
| 42 | 0 | 42 | 18.38 | 13.13 | 7.88 | 2.63 |
| 43 | 0 | 43 | 18.81 | 13.44 | 8.06 | 2.69 |
| 44 | 0 | 44 | 19.25 | 13.75 | 8.25 | 2.75 |
| 45 | 0 | 45 | 19.69 | 14.06 | 8.44 | 2.81 |
| 46 | 0 | 46 | 20.13 | 14.38 | 8.63 | 2.88 |
| 47 | 0 | 47 | 20.56 | 14.69 | 8.81 | 2.94 |
| 48 | 0 | 48 | 21.00 | 15.00 | 9.00 | 3.00 |
| 49 | 0 | 49 | 21.44 | 15.31 | 9.19 | 3.06 |
| 50 | 0 | 50 | 21.88 | 15.63 | 9.38 | 3.13 |
| 51 | 0 | 51 | 22.31 | 15.94 | 9.56 | 3.19 |

TABLE 1-continued

| Ct | Cout | Error | ExW0 | ExW1 | ExW2 | ExW3 |
|---|---|---|---|---|---|---|
| 52 | 0 | 52 | 22.75 | 16.25 | 9.75 | 3.25 |
| 53 | 0 | 53 | 23.19 | 16.56 | 9.94 | 3.31 |
| 54 | 0 | 54 | 23.63 | 16.88 | 10.13 | 3.38 |
| 55 | 0 | 55 | 24.06 | 17.19 | 10.31 | 3.44 |
| 56 | 0 | 56 | 24.50 | 17.50 | 10.50 | 3.50 |
| 57 | 0 | 57 | 24.94 | 17.81 | 10.69 | 3.56 |
| 58 | 0 | 58 | 25.38 | 18.13 | 10.88 | 3.63 |
| 59 | 0 | 59 | 25.81 | 18.44 | 11.06 | 3.69 |
| 60 | 0 | 60 | 26.25 | 18.75 | 11.25 | 3.75 |
| 61 | 0 | 61 | 26.69 | 19.06 | 11.44 | 3.81 |
| 62 | 0 | 62 | 27.13 | 19.38 | 11.63 | 3.88 |
| 63 | 0 | 63 | 27.56 | 19.69 | 11.81 | 3.94 |

TABLE 2

| Ct | Cout | Error | ExW0 | ExW1 | ExW2 | ExW3 |
|---|---|---|---|---|---|---|
| 64 | 0 | 64 | 28.00 | 20.00 | 12.00 | 4.00 |
| 65 | 0 | 65 | 28.44 | 20.31 | 12.19 | 4.06 |
| 66 | 0 | 66 | 28.88 | 20.63 | 12.38 | 4.13 |
| 67 | 0 | 67 | 29.31 | 20.94 | 12.56 | 4.19 |
| 68 | 0 | 68 | 29.75 | 21.25 | 12.75 | 4.25 |
| 69 | 0 | 69 | 30.19 | 21.56 | 12.94 | 4.31 |
| 70 | 0 | 70 | 30.63 | 21.88 | 13.13 | 4.38 |
| 71 | 0 | 71 | 31.06 | 22.19 | 13.31 | 4.44 |
| 72 | 0 | 72 | 31.50 | 22.50 | 13.50 | 4.50 |
| 73 | 0 | 73 | 31.94 | 22.81 | 13.69 | 4.56 |
| 74 | 0 | 74 | 32.38 | 23.13 | 13.88 | 4.63 |
| 75 | 0 | 75 | 32.81 | 23.44 | 14.06 | 4.69 |
| 76 | 0 | 76 | 33.25 | 23.75 | 14.25 | 4.75 |
| 77 | 0 | 77 | 33.69 | 24.06 | 14.44 | 4.81 |
| 78 | 0 | 78 | 34.13 | 24.38 | 14.63 | 4.88 |
| 79 | 0 | 79 | 34.56 | 24.69 | 14.81 | 4.94 |
| 80 | 0 | 80 | 35.00 | 25.00 | 15.00 | 5.00 |
| 81 | 0 | 81 | 35.44 | 25.31 | 15.19 | 5.06 |
| 82 | 0 | 82 | 35.88 | 25.63 | 15.38 | 5.13 |
| 83 | 0 | 83 | 36.31 | 25.94 | 15.56 | 5.19 |
| 84 | 0 | 84 | 36.75 | 26.25 | 15.75 | 5.25 |
| 85 | 0 | 85 | 37.19 | 26.56 | 15.94 | 5.31 |
| 86 | 0 | 86 | 37.63 | 26.88 | 16.13 | 5.38 |
| 87 | 0 | 87 | 38.06 | 27.19 | 16.31 | 5.44 |
| 88 | 0 | 88 | 38.50 | 27.50 | 16.50 | 5.50 |
| 89 | 0 | 89 | 38.94 | 27.81 | 16.69 | 5.56 |
| 90 | 0 | 90 | 39.38 | 28.13 | 16.88 | 5.63 |
| 91 | 0 | 91 | 39.81 | 28.44 | 17.06 | 5.69 |
| 92 | 0 | 92 | 40.25 | 28.75 | 17.25 | 5.75 |
| 93 | 0 | 93 | 40.69 | 29.06 | 17.44 | 5.81 |
| 94 | 0 | 94 | 41.13 | 29.38 | 17.63 | 5.88 |
| 95 | 0 | 95 | 41.56 | 29.69 | 17.81 | 5.94 |
| 96 | 0 | 96 | 42.00 | 30.00 | 18.00 | 6.00 |
| 97 | 0 | 97 | 42.44 | 30.31 | 18.19 | 6.06 |
| 98 | 0 | 98 | 42.88 | 30.63 | 18.38 | 6.13 |
| 99 | 0 | 99 | 43.31 | 30.94 | 18.56 | 6.19 |
| 100 | 0 | 100 | 43.75 | 31.25 | 18.75 | 6.25 |
| 101 | 0 | 101 | 44.19 | 31.56 | 18.94 | 6.31 |
| 102 | 0 | 102 | 44.63 | 31.88 | 19.13 | 6.38 |
| 103 | 0 | 103 | 45.06 | 32.19 | 19.31 | 6.44 |
| 104 | 0 | 104 | 45.50 | 32.50 | 19.50 | 6.50 |
| 105 | 0 | 105 | 45.94 | 32.81 | 19.69 | 6.56 |
| 106 | 0 | 106 | 46.38 | 33.13 | 19.88 | 6.63 |
| 107 | 0 | 107 | 46.81 | 33.44 | 20.06 | 6.69 |
| 108 | 0 | 108 | 47.25 | 33.75 | 20.25 | 6.75 |
| 109 | 0 | 109 | 47.69 | 34.06 | 20.44 | 6.81 |
| 110 | 0 | 110 | 48.13 | 34.38 | 20.63 | 6.88 |
| 111 | 0 | 111 | 48.56 | 34.69 | 20.81 | 6.94 |
| 112 | 0 | 112 | 49.00 | 35.00 | 21.00 | 7.00 |
| 113 | 0 | 113 | 49.44 | 35.31 | 21.19 | 7.06 |
| 114 | 0 | 114 | 49.88 | 35.63 | 21.38 | 7.13 |
| 115 | 0 | 115 | 50.31 | 35.94 | 21.56 | 7.19 |
| 116 | 0 | 116 | 50.75 | 36.25 | 21.75 | 7.25 |
| 117 | 0 | 117 | 51.19 | 36.56 | 21.94 | 7.31 |
| 118 | 0 | 118 | 51.63 | 36.88 | 22.13 | 7.38 |
| 119 | 0 | 119 | 52.06 | 37.19 | 22.31 | 7.44 |
| 120 | 0 | 120 | 52.50 | 37.50 | 22.50 | 7.50 |

TABLE 2-continued

| Ct | Cout | Error | ExW0 | ExW1 | ExW2 | ExW3 |
|---|---|---|---|---|---|---|
| 121 | 0 | 121 | 52.94 | 37.81 | 22.69 | 7.56 |
| 122 | 0 | 122 | 53.38 | 38.13 | 22.88 | 7.63 |
| 123 | 0 | 123 | 53.81 | 38.44 | 23.06 | 7.69 |
| 124 | 0 | 124 | 54.25 | 38.75 | 23.25 | 7.75 |
| 125 | 0 | 125 | 54.69 | 39.06 | 23.44 | 7.81 |
| 126 | 0 | 126 | 55.13 | 39.38 | 23.63 | 7.88 |
| 127 | 0 | 127 | 55.56 | 39.69 | 23.81 | 7.94 |

TABLE 3

| Ct | Cout | Error | ExW0 | ExW1 | ExW2 | ExW3 |
|---|---|---|---|---|---|---|
| 128 | 1 | −127 | −55.56 | −39.69 | −23.81 | −7.94 |
| 129 | 1 | −126 | −55.13 | −39.38 | −23.63 | −7.88 |
| 130 | 1 | −125 | −54.69 | −39.06 | −23.44 | −7.81 |
| 131 | 1 | −124 | −54.25 | −38.75 | −23.25 | −7.75 |
| 132 | 1 | −123 | −53.81 | −38.44 | −23.06 | −7.69 |
| 133 | 1 | −122 | −53.38 | −38.13 | −22.88 | −7.63 |
| 134 | 1 | −121 | −52.94 | −37.81 | −22.69 | −7.56 |
| 135 | 1 | −120 | −52.50 | −37.50 | −22.50 | −7.50 |
| 136 | 1 | −119 | −52.06 | −37.19 | −22.31 | −7.44 |
| 137 | 1 | −118 | −51.63 | −36.88 | −22.13 | −7.38 |
| 138 | 1 | −117 | −51.19 | −36.56 | −21.94 | −7.31 |
| 139 | 1 | −116 | −50.75 | −36.25 | −21.75 | −7.25 |
| 140 | 1 | −115 | −50.31 | −35.94 | −21.56 | −7.19 |
| 141 | 1 | −114 | −49.88 | −35.63 | −21.38 | −7.13 |
| 142 | 1 | −113 | −49.44 | −35.31 | −21.19 | −7.06 |
| 143 | 1 | −112 | −49.00 | −35.00 | −21.00 | −7.00 |
| 144 | 1 | −111 | −48.56 | −34.69 | −20.81 | −6.94 |
| 145 | 1 | −110 | −48.13 | −34.38 | −20.63 | −6.88 |
| 146 | 1 | −109 | −47.69 | −34.06 | −20.44 | −6.81 |
| 147 | 1 | −108 | −47.25 | −33.75 | −20.25 | −6.75 |
| 148 | 1 | −107 | −46.81 | −33.44 | −20.06 | −6.69 |
| 149 | 1 | −106 | −46.38 | −33.13 | −19.88 | −6.63 |
| 150 | 1 | −105 | −45.94 | −32.81 | −19.69 | −6.56 |
| 151 | 1 | −104 | −45.50 | −32.50 | −19.50 | −6.50 |
| 152 | 1 | −103 | −45.06 | −32.19 | −19.31 | −6.44 |
| 153 | 1 | −102 | −44.63 | −31.88 | −19.13 | −6.38 |
| 154 | 1 | −101 | −44.19 | −31.56 | −18.94 | −6.31 |
| 155 | 1 | −100 | −43.75 | −31.25 | −18.75 | −6.25 |
| 156 | 1 | −99 | −43.31 | −30.94 | −18.56 | −6.19 |
| 157 | 1 | −98 | −42.88 | −30.63 | −18.38 | −6.13 |
| 158 | 1 | −97 | −42.44 | −30.31 | −18.19 | −6.06 |
| 159 | 1 | −96 | −42.00 | −30.00 | −18.00 | −6.00 |
| 160 | 1 | −95 | −41.56 | −29.69 | −17.81 | −5.94 |
| 161 | 1 | −94 | −41.13 | −29.38 | −17.63 | −5.88 |
| 162 | 1 | −93 | −40.69 | −29.06 | −17.44 | −5.81 |
| 163 | 1 | −92 | −40.25 | −28.75 | −17.25 | −5.75 |
| 164 | 1 | −91 | −39.81 | −28.44 | −17.06 | −5.69 |
| 165 | 1 | −90 | −39.38 | −28.13 | −16.88 | −5.63 |
| 166 | 1 | −89 | −38.94 | −27.81 | −16.69 | −5.56 |
| 167 | 1 | −88 | −38.50 | −27.50 | −16.50 | −5.50 |
| 168 | 1 | −87 | −38.06 | −27.19 | −16.31 | −5.44 |
| 169 | 1 | −86 | −37.63 | −26.88 | −16.13 | −5.38 |
| 170 | 1 | −85 | −37.19 | −26.56 | −15.94 | −5.31 |
| 171 | 1 | −84 | −36.75 | −26.25 | −15.75 | −5.25 |
| 172 | 1 | −83 | −36.31 | −25.94 | −15.56 | −5.19 |
| 173 | 1 | −82 | −35.88 | −25.63 | −15.38 | −5.13 |
| 174 | 1 | −81 | −35.44 | −25.31 | −15.19 | −5.06 |
| 175 | 1 | −80 | −35.00 | −25.00 | −15.00 | −5.00 |
| 176 | 1 | −79 | −34.56 | −24.69 | −14.81 | −4.94 |
| 177 | 1 | −78 | −34.13 | −24.38 | −14.63 | −4.88 |
| 178 | 1 | −77 | −33.69 | −24.06 | −14.44 | −4.81 |
| 179 | 1 | −76 | −33.25 | −23.75 | −14.25 | −4.75 |
| 180 | 1 | −75 | −32.81 | −23.44 | −14.06 | −4.69 |
| 181 | 1 | −74 | −32.38 | −23.13 | −13.88 | −4.63 |
| 182 | 1 | −73 | −31.94 | −22.81 | −13.69 | −4.56 |
| 183 | 1 | −72 | −31.50 | −22.50 | −13.50 | −4.50 |
| 184 | 1 | −71 | −31.06 | −22.19 | −13.31 | −4.44 |
| 185 | 1 | −70 | −30.63 | −21.88 | −13.13 | −4.38 |
| 186 | 1 | −69 | −30.19 | −21.56 | −12.94 | −4.31 |
| 187 | 1 | −68 | −29.75 | −21.25 | −12.75 | −4.25 |
| 188 | 1 | −67 | −29.31 | −20.94 | −12.56 | −4.19 |
| 189 | 1 | −66 | −28.88 | −20.63 | −12.38 | −4.13 |

TABLE 3-continued

| Ct | Cout | Error | ExW0 | ExW1 | ExW2 | ExW3 |
|---|---|---|---|---|---|---|
| 190 | 1 | −65 | −28.44 | −20.31 | −12.19 | −4.06 |
| 191 | 1 | −64 | −28.00 | −20.00 | −12.00 | −4.00 |

TABLE 4

| Ct | Cout | Error | ExW0 | ExW1 | ExW2 | ExW3 |
|---|---|---|---|---|---|---|
| 192 | 1 | −63 | −27.56 | −19.69 | −11.81 | −3.94 |
| 193 | 1 | −62 | −27.13 | −19.38 | −11.63 | −3.88 |
| 194 | 1 | −61 | −26.69 | −19.06 | −11.44 | −3.81 |
| 195 | 1 | −60 | −26.25 | −18.75 | −11.25 | −3.75 |
| 196 | 1 | −59 | −25.81 | −18.44 | −11.06 | −3.69 |
| 197 | 1 | −58 | −25.38 | −18.13 | −10.88 | −3.63 |
| 198 | 1 | −57 | −24.94 | −17.81 | −10.69 | −3.56 |
| 199 | 1 | −56 | −24.50 | −17.50 | −10.50 | −3.50 |
| 200 | 1 | −55 | −24.06 | −17.19 | −10.31 | −3.44 |
| 201 | 1 | −54 | −23.63 | −16.88 | −10.13 | −3.38 |
| 202 | 1 | −53 | −23.19 | −16.56 | −9.94 | −3.31 |
| 203 | 1 | −52 | −22.75 | −16.25 | −9.75 | −3.25 |
| 204 | 1 | −51 | −22.31 | −15.94 | −9.56 | −3.19 |
| 205 | 1 | −50 | −21.88 | −15.63 | −9.38 | −3.13 |
| 206 | 1 | −49 | −21.44 | −15.31 | −9.19 | −3.06 |
| 207 | 1 | −48 | −21.00 | −15.00 | −9.00 | −3.00 |
| 208 | 1 | −47 | −20.56 | −14.69 | −8.81 | −2.94 |
| 209 | 1 | −46 | −20.13 | −14.38 | −8.63 | −2.88 |
| 210 | 1 | −45 | −19.69 | −14.06 | −8.44 | −2.81 |
| 211 | 1 | −44 | −19.25 | −13.75 | −8.25 | −2.75 |
| 212 | 1 | −43 | −18.81 | −13.44 | −8.06 | −2.69 |
| 213 | 1 | −42 | −18.38 | −13.13 | −7.88 | −2.63 |
| 214 | 1 | −41 | −17.94 | −12.81 | −7.69 | −2.56 |
| 215 | 1 | −40 | −17.50 | −12.50 | −7.50 | −2.50 |
| 216 | 1 | −39 | −17.06 | −12.19 | −7.31 | −2.44 |
| 217 | 1 | −38 | −16.63 | −11.88 | −7.13 | −2.38 |
| 218 | 1 | −37 | −16.19 | −11.56 | −6.94 | −2.31 |
| 219 | 1 | −36 | −15.75 | −11.25 | −6.75 | −2.25 |
| 220 | 1 | −35 | −15.31 | −10.94 | −6.56 | −2.19 |
| 221 | 1 | −34 | −14.88 | −10.63 | −6.38 | −2.13 |
| 222 | 1 | −33 | −14.44 | −10.31 | −6.19 | −2.06 |
| 223 | 1 | −32 | −14.00 | −10.00 | −6.00 | −2.00 |
| 224 | 1 | −31 | −13.56 | −9.69 | −5.81 | −1.94 |
| 225 | 1 | −30 | −13.13 | −9.38 | −5.63 | −1.88 |
| 226 | 1 | −29 | −12.69 | −9.06 | −5.44 | −1.81 |
| 227 | 1 | −28 | −12.25 | −8.75 | −5.25 | −1.75 |
| 228 | 1 | −27 | −11.81 | −8.44 | −5.06 | −1.69 |
| 229 | 1 | −26 | −11.38 | −8.13 | −4.88 | −1.63 |
| 230 | 1 | −25 | −10.94 | −7.81 | −4.69 | −1.56 |
| 231 | 1 | −24 | −10.50 | −7.50 | −4.50 | −1.50 |
| 232 | 1 | −23 | −10.06 | −7.19 | −4.31 | −1.44 |
| 233 | 1 | −22 | −9.63 | −6.88 | −4.13 | −1.38 |
| 234 | 1 | −21 | −9.19 | −6.56 | −3.94 | −1.31 |
| 235 | 1 | −20 | −8.75 | −6.25 | −3.75 | −1.25 |
| 236 | 1 | −19 | −8.31 | −5.94 | −3.56 | −1.19 |
| 237 | 1 | −18 | −7.88 | −5.63 | −3.38 | −1.13 |
| 238 | 1 | −17 | −7.44 | −5.31 | −3.19 | −1.06 |
| 239 | 1 | −16 | −7.00 | −5.00 | −3.00 | −1.00 |
| 240 | 1 | −15 | −6.56 | −4.69 | −2.81 | −0.94 |
| 241 | 1 | −14 | −6.13 | −4.38 | −2.63 | −0.88 |
| 242 | 1 | −13 | −5.69 | −4.06 | −2.44 | −0.81 |
| 243 | 1 | −12 | −5.25 | −3.75 | −2.25 | −0.75 |
| 244 | 1 | −11 | −4.81 | −3.44 | −2.06 | −0.69 |
| 245 | 1 | −10 | −4.38 | −3.13 | −1.88 | −0.63 |
| 246 | 1 | −9 | −3.94 | −2.81 | −1.69 | −0.56 |
| 247 | 1 | −8 | −3.50 | −2.50 | −1.50 | −0.50 |
| 248 | 1 | −7 | −3.06 | −2.19 | −1.31 | −0.44 |
| 249 | 1 | −6 | −2.63 | −1.88 | −1.13 | −0.38 |
| 250 | 1 | −5 | −2.19 | −1.56 | −0.94 | −0.31 |
| 251 | 1 | −4 | −1.75 | −1.25 | −0.75 | −0.25 |
| 252 | 1 | −3 | −1.31 | −0.94 | −0.56 | −0.19 |
| 253 | 1 | −2 | −0.88 | −0.63 | −0.38 | −0.13 |
| 254 | 1 | −1 | −0.44 | −0.31 | −0.19 | −0.06 |
| 255 | 1 | 0 | 0.00 | 0.00 | 0.00 | 0.00 |

In the conventional error diffusion method, the values Cout and ExW0-ExW3 shown in FIG. 14B are calculated in advance, and the resulting values are held as an LUT (Look Up Table), and quantized output values and error values are acquired by referring to the LUT using the total density value Ct as parameters at the time of the actual error diffusion. Therefore, it is unnecessary to perform complicated multiplications and divisions, and hence perform error diffusion can be made at high speed.

Further, to output a multivalued image using inks of four colors consisting of cyan (C), magenta (M), yellow (Y), and black (K), a dithering process has been conventionally carried out in which error diffusion or the like is performed for individual colors independently of each other. Thus, even if visual characteristics are excellent in terms of a single color, favorable visual characteristics cannot be necessarily achieved in the case where two or more colors are overlapped.

To address this problem, Japanese Laid-Open Patent Publication (Kokai) No. 8-279920 and Japanese Laid-Open Patent Publication (Kokai) No. 11-10918, for example, have disclosed a pseudo halftoning process in which error diffusion is performed on two or more colors to achieve favorable visual characteristics even if two or more colors are overlapped.

Also, Japanese Laid-Open Patent Publication (Kokai) No. 9-139841 has disclosed a process in which dithering is performed individually for two or more colors, and then output values based on the sum of input values are corrected to thus improve the visual characteristics.

Particularly, as is known, to reduce the graininess of intermediate density regions of a color image, it is effective to form an image such that dots of the cyan component (C) and dots of the magenta component (M) are not overlapped. To this end, the following method has been employed. FIG. 15 is a view useful in explaining image formation control according to a conventional ink-jet printing method.

Here, it is assumed that image data is expressed as multivalued data in which density components (YMCK) of each pixel are each composed of 8 bits (gradation values of 0 to 255).

Where the density values of the C component and the M component of a notice pixel in a multivalued color image are designated by Ct and Mt, respectively, and the density values of the C component and the M component of the original image are designated by C and M, respectively, the density values Ct and Mt are expressed by:

$$Ct = C + Cerr$$

$$Mt = M + Merr$$

Here, Cerr and Merr represent accumulated error values obtained by error diffusion of the C component and M component, respectively, of the notice pixel.

When forming an image comprised of C and M components as shown in FIG. 15, control is provided in four ways according to the densities of the C component and M component of a notice pixel as described below.

1. If the sum of Ct and Mt is equal to or less than a threshold (Threshold 1), i.e. if the sum of Ct and Mt lies inside a region R1 of FIG. 15, dot-recording using C (cyan) ink and M (magenta) ink is not performed.

2. If the sum of Ct and Mt is greater than the threshold (Threshold 1) and less than another threshold (Threshold 2) and Ct is greater than Mt, i.e. if the sum of Ct and Mt lies inside a region R2 of FIG. 15, dot-recording using only C ink is performed.

3. If the sum of Ct and Mt is greater than the threshold (Threshold 1) and less than the other threshold (Threshold 2)

and Ct is equal to or less than Mt, i.e. if the sum of Ct and Mt lies inside a region R3 of FIG. 15, dot-recording using only M ink is performed.

4. If the sum of Ct and Mt is equal to or greater than the threshold (Threshold 2), i.e. if the sum of Ct and Mt lies inside a region R4 of FIG. 15, dot-recording using C ink and M ink is performed.

It should be noted that the relation between the above-mentioned two thresholds is expressed by Threshold 1>Threshold 2.

However, it is impossible to directly apply to the error diffusing process comprised of a combination of processes of two or more colors, the conventional method in which a value of a binarization error weighted in advance is determined for every value of density information such that the sum of the determined values is equal to the binarization error, thus simplifying multiplications and divisions and eliminating roundoff errors (Japanese Laid-Open Patent Publication (Kokai) No. 63-35074). A description will now be given of the reason for this with reference to FIGS. 16A and 16B. FIGS. 16A and 16B are views useful in explaining problems of the conventional method to be solved. For the convenience's sake, the following description refers to a binary error diffusing process in which the output values are 1 or 2.

FIG. 16A shows the relationship between the total density value Ct as the sum of an input density value and an accumulated error value of the cyan component, the total density value Mt as the sum of an input density value and an accumulated error value of the magenta component, and output values of the cyan and magenta components. FIG. 16B shows the relationship between the total density value (about 120 in FIG. 16B) of the cyan component, cyan binarization thresholds, and quantization results. In FIG. 16B, at two points (704 and 705), a thick line 701 representing the total density value (about 120 in FIG. 16B) intersects a curved line 702 representing the binarization threshold. Thus, the output quantized value is 1 inside a hatched region 703 (Mt1≦Mt<Mt2), whereas the output quantized value is 0 inside other regions (Mt<Mt1, Mt2≦Mt).

As described above, in the error diffusion comprised of a combination of processes of two or more colors, different quantized values may be outputted with respect to the same total density value Ct. For this reason, the conventional method (Japanese Laid-Open Patent Publication (Kokai) No. 63-35074) cannot be applied as it is to the error diffusing process comprised of a combination of processes of two or more colors, and it is therefore difficult to perform error diffusion at high speed.

SUMMARY OF THE INVENTION

It is, therefore, an object of the present invention to provide an image processing apparatus and an image processing method that enable high-speed processing with simplified multiplications and divisions even in the case of error diffusion comprised of a combination of processes of two or more colors, and a program for implementing the method, as well as a storage medium storing the program.

To attain the above object, in a first aspect of the present invention, there is provided an image processing apparatus that performs error diffusion on multivalued image data composed of a plurality of density components and outputs a result of the error diffusion, comprising a holding device that holds a plurality of error tables, a selecting device that, when performing the error diffusion on a first density component among the plurality of density components, selects one error table from the plurality of error tables according to a density value of the first density component and a density value of at least one other density component, and a processing device that performs the error diffusion on the multivalued image data using the selected error table.

To attain the above object, in a second aspect of the present invention, there is provided an image processing apparatus that performs error diffusion on multivalued image data composed of a plurality of density components and outputs a result of the error diffusion, comprising a holding device that holds a plurality of error tables, a selecting device that, when performing the error diffusion on a first density component among the plurality of density components, selects one error table from the plurality of error tables according to a density value of the first density component and density values of at least two other density components, and a processing device that performs the error diffusion on multivalued image data using the selected error table.

To attain the above object, in a third aspect of the present invention, there is provided an image processing apparatus that performs error diffusion on multivalued image data composed of a plurality of density components and outputs a result of the error diffusion, comprising a holding device that holds a plurality of error tables, a modulating device that, when performing the error diffusion on a first density component among the plurality of density components, performs modulation on a density value of the first density component and outputs a result of the modulation, a selecting device that selects one error table from the plurality of error tables according to the outputted result of the modulation and a density value of at least one other density component, and a processing device that performs the error diffusion on the multivalued image data using the selected error table.

To attain the above object, in a fourth aspect of the present invention, there is provided an image processing apparatus that performs error diffusion on multivalued image data composed of a plurality of density components and outputs a result of the error diffusion, comprising a holding device that holds a plurality of error tables, a modulating device that, when performing error diffusion on a first density component among the plurality of density components, performs modulation on a density value of the first density component and outputs a result of the modulation, a selecting device that selects one error table from the plurality of error tables according to the outputted result of the modulation and density values of at least two other density components, and a processing device that performs the error diffusion on the multivalued image data using the selected error table.

To attain the above object, in a fifth aspect of the present invention, there is provided an image processing apparatus that performs error diffusion on multivalued image data composed of a plurality of density components and outputs a result of the error diffusion, comprising a holding device that holds a plurality of error tables, a threshold determining device that, when performing the error diffusion on a first density component among the plurality of density components, determines a threshold according to a density value of at least one other density component, a comparing device that performs comparison between the threshold determined by the threshold determining device and the first density component, and outputs a result of the comparison, a selecting device that selects one error table from the plurality of error tables according to the outputted result of the comparison, and a processing device that performs the error diffusion on the multivalued image data using the selected error table.

To attain the above object, in a sixth aspect of the present invention, there is provided an image processing apparatus that performs error diffusion on multivalued image data composed of a plurality of density components and outputs a result of the error diffusion, comprising a holding device that holds a plurality of error tables, a determining device that, when performing the error diffusion on a first density component among the plurality of density components, determines a threshold according to at least one of a sum of and a maximum value of density values of at least two other density components, a comparing device that performs comparison between the determined threshold and the first density component, and outputs a result of the comparison, a selecting device that selects one error table from the plurality of error tables according to the outputted result of the comparison and a processing device that performs the error diffusion on the multivalued image data using the selected error table.

To attain the above object, in a seventh aspect of the present invention, there is provided an image processing apparatus that performs error diffusion on multivalued image data composed of a plurality of density components and outputs a result of the error diffusion, comprising a holding device that holds a plurality of quantization tables, a modulating device that, when performing the error diffusion on a first density component among the plurality of density components, performs modulation on a density value of the first component and outputs a result of the modulation, a determining device that determines a threshold according to a density value of at least one other density component, a comparing device that performs comparison between the determined threshold and the outputted result of the modulation, and outputs a result of the comparison, a selecting device that selects one quantization table from the plurality of quantization tables according to the outputted result of the comparison, and a processing device that performs the error diffusion on the multivalued image data using the selected quantization table.

To attain the above object, in an eighth aspect of the present invention, there is provided an image processing apparatus that performs error diffusion on multivalued image data composed of a plurality of density components and outputs a result of the error diffusion, comprising a holding device that holds a plurality of quantization tables, a modulating device that, when performing the error diffusion on a first density component among the plurality of density components, performs modulation on a density value of the first component and outputs a result of the modulation, a determining device that determines a threshold according to at least one of a sum of and a maximum value of density values of at least two other density components, a comparing device that performs comparison between the determined threshold and the outputted result of the modulation, and outputs a result of the comparison, a selecting device that selects one quantization table from the plurality of quantization tables according to the outputted result of the comparison, and a processing device that performs the error diffusion on the multivalued image data using the selected quantization table.

In a preferred form of each of the first to eighth aspects, the first density component is different from the other density components in at least one of color, coloring density, and discharge rate.

To attain the above object, in a ninth aspect of the present invention, there is provided an image processing method that performs error diffusion on multivalued image data composed of a plurality of density components and outputs a result of the error diffusion, comprising the steps of selecting one error table from a plurality of error tables, held in advance, according to a density value of a first density component among the plurality of density components and a density value of at least one other density component when performing the error diffusion on the first density component among the plurality of density components, and performing the error diffusion on the multivalued image data using the selected error table.

To attain the above object, in a tenth aspect of the present invention, there is provided an image processing method that performs error diffusion on multivalued image data composed of a plurality of density components and outputs a result of the error diffusion, comprising the steps of selecting one error table from a plurality of error tables, held in advance, according to a density value of a first density component among the plurality of density components and one of a sum of and a maximum value of density values of at least two other density components when performing the error diffusion on the first density component among the plurality of density components, and performing the error diffusion on multivalued image data using the selected error table.

To attain the above object, in an eleventh aspect of the present invention, there is provided an image processing method that performs error diffusion on multivalued image data composed of a plurality of density components and outputs a result of the error diffusion, comprising the steps of performing modulation on a density value of a first density component among the plurality of density components and outputting a result of the modulation when performing the error diffusion on the first density component among the plurality of density components, selecting one error table from a plurality of error tables, held in advance, according to the outputted result of the modulation and a density value of at least one other density component, and performing the error diffusion on the multivalued image data using the selected error table.

To attain the above object, in a twelfth aspect of the present invention, there is provided an image processing method that performs error diffusion on multivalued image data composed of a plurality of density components and outputs a result of the error diffusion, comprising the steps of performing modulation on a density value of a first density component among the plurality of density components and outputting a result of the modulation when performing the error diffusion on the first density component among the plurality of density components, selecting one error table from a plurality of error tables, held in advance, according to the outputted result of the modulation and density values of at least two other density components, and performing the error diffusion on the multivalued image data using the selected error table.

To attain the above object, in a thirteenth aspect of the present invention, there is provided an image processing method that performs error diffusion on multivalued image data composed of a plurality of density components and outputs a result of the error diffusion, comprising the steps of determining a threshold according to a density value of at least one density component other than a first density component among the plurality of density components when performing the error diffusion on the first density component among the plurality of density components, performing comparison between the determined threshold and the first density component, and outputting a result of the comparison, selecting one error table from a plurality of error tables, held in advance, according to the outputted result of the comparison, and performing the error diffusion on the multivalued image data using the selected error table.

To attain the above object, in a fourteenth aspect of the present invention, there is provided an image processing method that performs error diffusion on multivalued image data composed of a plurality of density components and outputs a result of the error diffusion, comprising the steps of determining a threshold according to at least one of a sum of and a maximum value of density values of at least two density components other than a first density component among the plurality of density components when performing the error diffusion on the first density component among the plurality of density components, performing comparison between the determined threshold and the first density component, and outputting a result of the comparison, selecting one error table from a plurality of error tables, held in advance, according to the outputted result of the comparison, and performing the error diffusion on the multivalued image data using the selected error table.

To attain the above object, in a fifteenth aspect of the present invention, there is provided an image processing method that performs error diffusion on multivalued image data composed of a plurality of density components and outputs a result of the error diffusion, comprising the steps of performing modulation on a density value of a first component among the plurality of density components and outputting a result of the modulation when performing the error diffusion on the first density component among the plurality of density components, determining a threshold according to a density value of at least one other density component, performing comparison between the determined threshold and the outputted result of the modulation, and outputting a result of the comparison, selecting one quantization table from a plurality of quantization tables, held in advance, according to the outputted result of the comparison, and performing the error diffusion on the multivalued image data using the selected quantization table.

To attain the above object, in a sixteenth aspect of the present invention, there is provided an image processing method that performs error diffusion on multivalued image data composed of a plurality of density components and outputs a result of the error diffusion, comprising the steps of performing modulation on a density value of a first component among the plurality of density components and outputting a result of the modulation when performing the error diffusion on the first density component among the plurality of density components, determining a threshold according to at least one of a sum of and a maximum value of density values of at least two other density components, performing comparison between the determined threshold and the outputted result of the modulation, and outputting a result of the comparison, selecting one quantization table from a plurality of quantization tables, held in advance, according to the outputted result of the comparison, and performing the error diffusion on the multivalued image data using the selected quantization table.

In a preferred form of each of the ninth to sixteenth aspects, the first density component is different from the other density components in at least one of color, coloring density, and discharge rate.

To attain the above object, in a seventeenth aspect of the present invention, there is provided a program executed by a computer, for performing error diffusion on multivalued image data composed of a plurality of density components and outputting a result of the error diffusion, comprising a module operable when performing the error diffusion on a first density component among the plurality of density components, for selecting one error table from a plurality of error tables, held in advance, according to a density value of the first density component and a density value of at least one other density component, and a module for performing the error diffusion on the multivalued image data using the selected error table.

To attain the above object, in an eighteenth aspect of the present invention, there is provided a program executed by a computer, for performing error diffusion on multivalued image data composed of a plurality of density components and outputting a result of the error diffusion, comprising a module operable when performing the error diffusion on a first density component among the plurality of density components, for selecting one error table from a plurality of error tables, held in advance, according to a density value of the first density component and one of a sum of and a maximum value of density values of at least two other density components, and a module for performing the error diffusion on multivalued image data using the selected error table.

To attain the above object, in a nineteenth aspect of the present invention, there is provided a program executed by a computer, for performing error diffusion on multivalued image data composed of a plurality of density components and outputting a result of the error diffusion, comprising a module operable when performing the error diffusion on a first density component among the plurality of density components, for performing modulation on a density value of the first density component and outputting a result of the modulation, a module for selecting one error table from a plurality of error tables, held in advance, according to the outputted result of the modulation and a density value of at least one other density component, and a module for performing the error diffusion on the multivalued image data using the selected error table.

To attain the above object, in a twentieth aspect of the present invention, there is provided a program executed by a computer, for performing error diffusion on multivalued image data composed of a plurality of density components and outputting a result of the error diffusion, comprising a module operable when performing error diffusion on a first density component among the plurality of density components, for performing modulation on a density value of the first density component and outputting a result of the modulation, a module for selecting one error table from a plurality of error tables, held in advance, according to the outputted result of the modulation and density values of at least two other density components, and a module for performing the error diffusion on the multivalued image data using the selected error table.

To attain the above object, in a twenty-first aspect of the present invention, there is provided a program executed by a computer, for performing error diffusion on multivalued image data composed of a plurality of density components and outputting a result of the error diffusion, comprising a module operable when performing the error diffusion on a first density component among the plurality of density components, for determining a threshold according to a density value of at least one other density component, a module for performing comparison between the determined threshold and the first density component, and outputting a result of the comparison, a module for selecting one error table from a plurality of error tables, held in advance, according to the outputted result of the comparison, and a module for performing the error diffusion on the multivalued image data using the selected error table.

To attain the above object, in a twenty-second aspect of the present invention, there is provided a program executed by a computer, for performing error diffusion on multivalued image data composed of a plurality of density components and outputting a result of the error diffusion, comprising a module operable when performing the error diffusion on a first density component among the plurality of density components, for determining a threshold according to at least one of a sum of and a maximum value of density values of at least two other density components, a module for performing comparison between the determined threshold and the first density component, and outputting a result of the comparison, a module for selecting one error table from a plurality of error tables, held in advance, according to the outputted result of the comparison, and a module for performing the error diffusion on the multivalued image data using the selected error table.

To attain the above object, in a twenty-third aspect of the present invention, there is provided a program executed by a computer, for performing error diffusion on multivalued image data composed of a plurality of density components and outputting a result of the error diffusion, comprising a module operable when performing the error diffusion on a first density component among the plurality of density components, for performing modulation on a density value of the first component and outputting a result of the modulation, a module for determining a threshold according to a density value of at least one other density component, a module for performing comparison between the determined threshold and the outputted result of the modulation, and outputting a result of the comparison, a module for selecting one quantization table from a plurality of quantization tables, held in advance, according to the outputted result of the comparison, and a module for performing the error diffusion on the multivalued image data using the selected quantization table.

To attain the above object, in a twenty-fourth aspect of the present invention, there is provided a program executed by a computer, for performing error diffusion on multivalued image data composed of a plurality of density components and outputting a result of the error diffusion, comprising a module operable when performing the error diffusion on a first density component among the plurality of density components, for performing modulation on a density value of the first component and outputting a result of the modulation, a module for determining a threshold according to at least one of a sum of and a maximum value of density values of at least two other density components, a module for performing comparison between the determined threshold and the outputted result of the modulation, and outputting a result of the comparison, a module for selecting one quantization table from a plurality of quantization tables, held in advance, according to the outputted result of the comparison, and a module for performing the error diffusion on the multivalued image data using the selected quantization table.

In a preferred form of each of the seventeenth to twenty-fourth aspects, the first density component is different from the other density components in at least one of color, coloring density, and discharge rate.

To attain the above object, in a twenty-fifth aspect of the present invention, there is provided a computer-readable storage medium storing each of the above described programs.

The above and other objects, features, and advantages of the invention will become more apparent from the following detailed description taken in conjunction with the accompanying drawings.

BRIEF DESCRIPTION OF THE DRAWINGS

FIG. 2 is a schematic block diagram showing the hardware configuration of a host apparatus 51 and an image output apparatus 53, both of which constitute the information processing system in FIG. 1;

FIGS. 7A to 7C are views showing the relationship between threshold tables, output quantized value tables, and diffusion error tables used for the image formation control in FIG. 6, wherein:

FIG. 7A is a view showing the relationship between a total density value Ct as the sum of an input density value and an accumulated error value of a cyan component, a total density value Mt as the sum of an input density value and an accumulated error value of a magenta component, and output values of the cyan and magenta components in an error diffusing process with two or more colors being combined;

FIG. 7B is a view showing an output quantized value table Out_TableA and a diffusion error table Error_TableA; and FIG. 7C shows an output quantized value table Out_TableB and a diffusion error table Error_TableB.

FIGS. 11A to 11C are views showing the relationship between threshold tables, output quantized value tables, and diffusion error tables used for error diffusion performed by the image processing apparatus according to the third embodiment, wherein:

FIG. 11A is a view showing the relationship between a total density value Ct as the sum of an input density value and an accumulated error value of a cyan component, a total density value Mt as the sum of an input density value and an accumulated error value of a magenta component, and output values of the cyan and magenta components in an error diffusing process with two or more colors being combined;

FIG. 11B is a view showing an output quantized value table Out_TableA and an error diffusion table Error_TableA; and FIG. 11C shows an output quantized value table Out_TableB and an error diffusion table Error_TableB;

FIGS. 13A to 13C are views showing the relationship between threshold tables, output quantized value tables, and diffusion error tables used for the image formation control in FIG. 12, wherein:

FIG. 13A shows the relationship between a total density value Ct as the sum of an input density value and an accumulated error value of a cyan component, a total density value Mt as the sum of an input density value and an accumulated error value of a magenta component, and output values of the cyan and magenta components in an error diffusing process;

FIG. 13B shows an output quantized value table Out_TableA (CoutA) and a diffusion error table Error_TableA; and FIG. 13C shows an output quantized value table Out_TableB and a diffusion error table Error_TableB;

DETAILED DESCRIPTION OF THE PREFERRED EMBODIMENTS

The present invention will now be described in detail with reference to the drawings showing preferred embodiments thereof.

Figure 1:
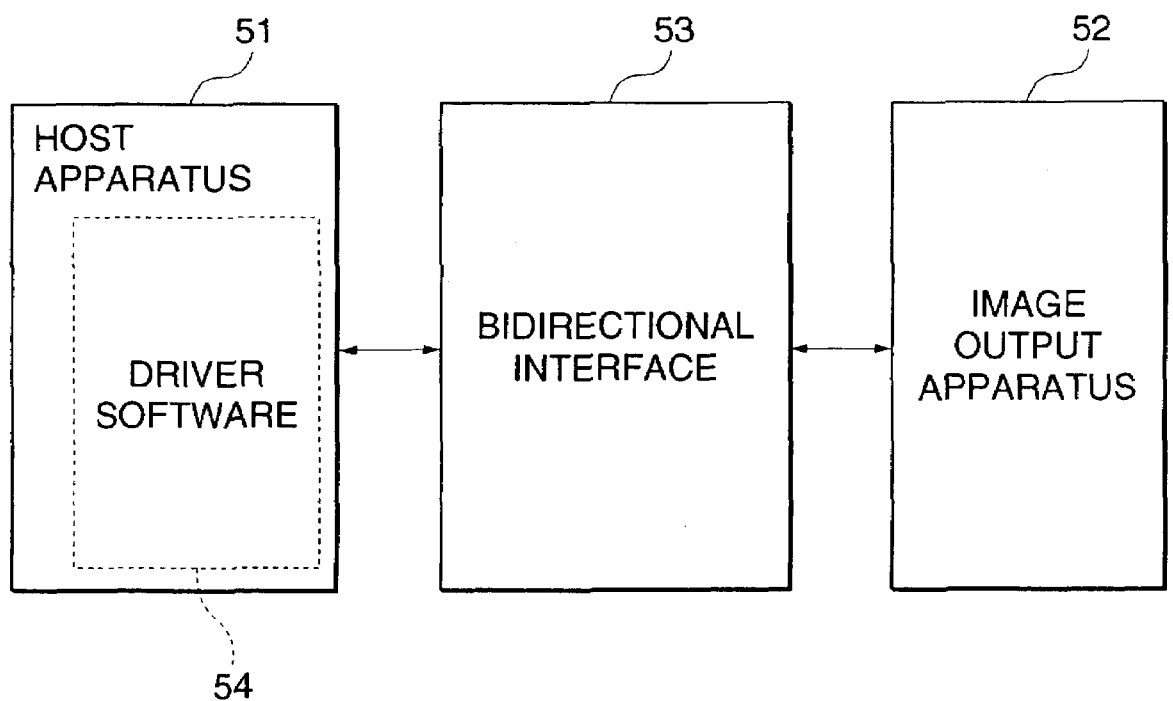
FIG. 1 is a schematic block diagram showing the arrangement of an information processing system to which is applied an image processing apparatus according to a first embodiment of the present invention.

FIG. 1 is a schematic block diagram showing the arrangement of an information processing system to which is applied an image processing apparatus according to a first embodiment of the present invention.

As shown in FIG. 1, the information processing system to which is applied the image processing apparatus is comprised of a host apparatus 51 such as a personal computer, and a plurality of image output apparatuses 52 such as ink-jet printers (IJRA). The host apparatus 51 and the image output apparatuses 52 are connected to each other via a bidirectional interface 53. A memory, not shown, of the host apparatus 51 has driver software 54 for image processing loaded therein.

A description will now be given of the hardware configuration of the host apparatus 51 and each of the image output apparatuses 52 with reference to FIG. 2. FIG. 2 is a schematic block diagram showing the hardware configuration of the host apparatus 51 and the image output apparatus 52, which constitute the information processing system shown in FIG. 1.

As shown in FIG. 2, the host apparatus 51 is comprised of a processing section 1000 and peripherals connected thereto. The processing section 1000 of the host apparatus 51 is comprised of an MPU 1001 that controls the overall operation of the host apparatus 51 according to control programs; a bus 1002 that connects component parts of the system to each other; a DRAM 1003 that temporarily stores programs, data, etc. to be executed by the MPU 1001; and a bridge 1004 that is used to connect the bus 1002 to the DRAM 1003 and the MPU 1001. A graphic adapter 1005, an HDD controller 1006, a keyboard controller 1007, and a communication I/F 1008 are connected to the bus 1002.

The graphic adapter 1005 has, for example, a function of providing control such that graphic information is displayed on a display device 2001 such as a CRT. The HDD controller 1006 provides interface for communication with an HDD (hard disk device) 2002, and the keyboard controller 1007 provides interface for communication with the keyboard 2003. The communication I/F 1008 is a parallel interface that provides interface for communication between the host apparatus 51 and the image output apparatus 52 according to the IEEE standard 1284.

The image output apparatus 52 is comprised of a driving section that includes a recording head 3010, a carrier (CR) motor 3011 that drives a carrier to convey the recording head 3010, and a conveying motor (LF motor) 3012 that conveys sheets; and a controller 3003. The controller 3003 has a control program executing function and a peripheral control function, and includes an MCU 3001 that controls the overall operation of the main body of the image output apparatus 52, a system bus 3013 that connects component parts of the controller 3003 to each other, and a gate array (G.A.) 3002 that has incorporated therein a mechanism for supplying recording data to the recording head 3010, a mechanism for decoding memory addresses, and a mechanism for generating control pulses to the carrier motor 3011.

The controller 3003 further includes a ROM 3004 that stores control programs to be executed by the MCU 3001, host printing information, and so forth; a DRAM 3005 that stores a variety of data (e.g. image recording information, and recording data to be supplied to the recording head 3010); a communication I/F 3006 as a parallel interface that provides interface for communication between the host apparatus 51 and the image output apparatus 52 according to the IEEE standard 1284; and a head driver 3007 that converts a head recording signal outputted from the gate array 3002 into an electric signal for driving the recording head 3010.

The controller 3003 further includes a CR motor driver 3008 that converts a carrier motor control pulse outputted from the gate array 3002 into an electric signal for actually driving the carrier (CR) motor 3011, and an LF motor driver 3009 that converts a conveying motor control pulse outputted from the MCU 3001 into an electric signal for actually driving the conveying motor (LF motor) 3012.

Figure 3:
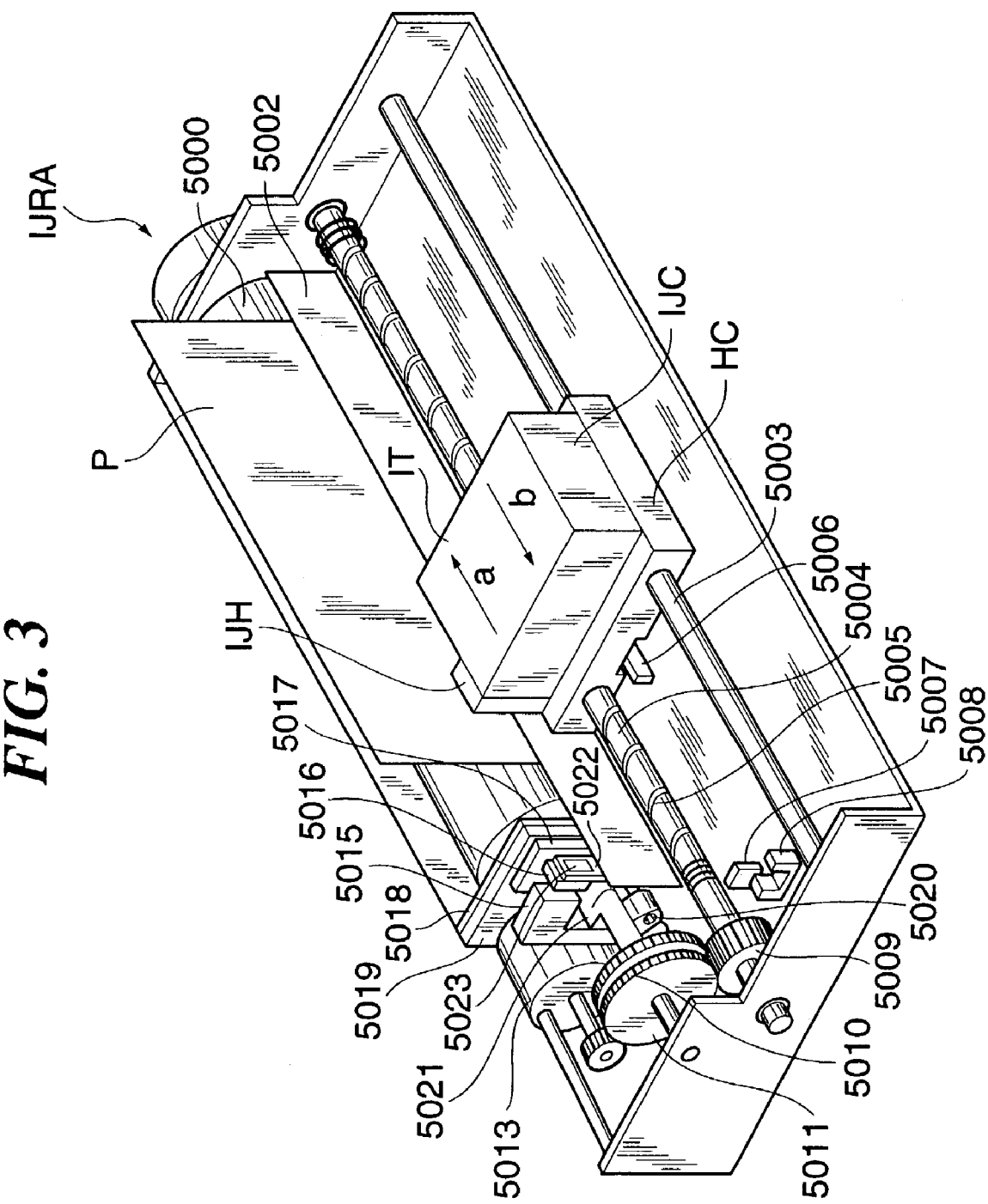
FIG. 3 is a perspective view showing the specific construction of the image output apparatus 52 in FIG. 2.

A description will now be given of the specific construction of the image output apparatus 52 with reference to FIG. 3. FIG. 3 is a perspective view showing the specific construction of the image output apparatus 52.

As shown in FIG. 3, the image output apparatus 52 includes a carriage HC. The carriage HC is engaged with a spiral groove 5004 of a lead screw 5005, which rotates in response to the forward and backward rotation of a driving motor 5014 via driving force transmission gears 5011 and 5009. This moves the carriage HC back and forth in directions indicated by arrows a and b. The carriage HC carries an integral type ink-jet cartridge IJC that has a recording head IJH (corresponding to the recording head 3010 in FIG. 2) and an ink tank IT incorporated therein. The image output apparatus 52 is further provided with a sheet pressing plate 5002 that presses a sheet P against a platen 5000 over the moving span of the carriage HC.

The carriage HC is provided with a lever 5006 for detecting the carriage HC when it lies at a home position thereof. When the carriage HC lies at the home position, the lever 5006 is detected by photo-couplers 5007 and 5008. The photo-couplers 5007 and 5008 detecting the lever 5006 function as home position detecting means for detecting that the carriage HC lies at the home position and changing the rotational direction of the driver motor 5013.

When the ink-jet cartridge IJC lies at a home position thereof, a front surface of the recording head IJH thereof is capped by a cap member 5022 supported by a member 5016. A suction means 5015 performs suction restoration on the recording head IJH of the ink-jet cartridge IJC through an in-cap opening 5023. Further, the image output apparatus 52 is provided with a cleaning blade 5017 that is adapted to be moved back and forth by a member 5019, and the cleaning blade 5017 and the member 5019 are supported by a main body supporting plate 5018. Further, the image output apparatus 52 is provided with a lever 5012 for starting a sucking action for the suction restoration. The lever 5012 moves with the movement of a cam 5020 engaged with the carriage HC, and a driving force is transmitted from the driving motor 5013 to the cam 5020 via a known transmitting means such as a clutch.

Although the image output apparatus 52 is constructed such that the above described capping, cleaning, and suction restoration can be performed as desired at the respective corresponding positions due to the operation of the lead screw 5005 when the carriage HC enters a region on the home position side, the present invention is not limited to this insofar as desired operation can be performed in known timing.

Incidentally, although the ink-jet cartridge IJC is comprised of the ink tank IT and the recording head IJH integrated with each other, i.e. formed in one body, as mentioned above such that it may be replaced as a unit with a new ink-jet cartridge IJC, the present invention is not limited to this, but the ink-jet cartridge IJC may be constructed such that the ink tank IT and the recording head IJH are capable of being separated from each other so that only the ink tank IT can be replaced upon ink exhaustion.

Further, the recording head IJH is capable of recording a color image on the sheet P using inks of at least four colors consisting of yellow (Y), magenta (M), cyan (C), and black (K) based on multivalued density data of Y, M, C, and K components.

Figure 4:
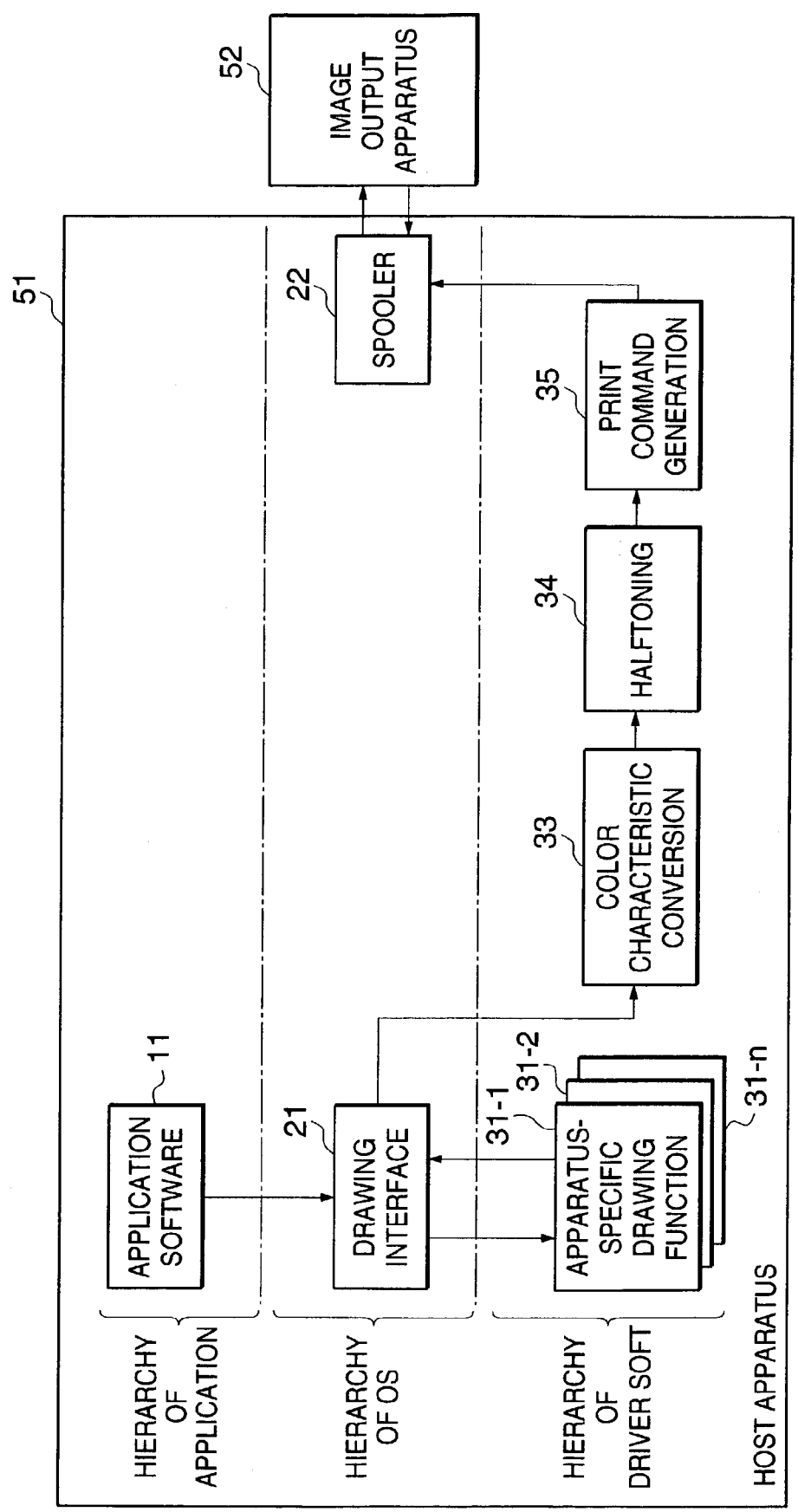
FIG. 4 is a block diagram showing the configuration of software used in the information processing system in FIG. 1.

A description will now be given of the software configuration of the information processing system according to the present embodiment with reference to FIG. 4. FIG. 4 is a block diagram showing the configuration of software employed in the information processing system shown in FIG. 1.

As shown in FIG. 4, in the host apparatus 51, three kinds of software consisting of hierarchical application software, operating system, and driver software cooperate with each other to perform image processing so as to output recording data to the image output apparatus 52.

According to the present embodiment, 1) apparatus-specific drawing functions 31-1, 31-2, . . . , 31-n are provided correspondingly to the respective image output apparatuses 52 to execute drawing operations of the image output apparatuses 52;

2) program parts used for performing processing specific to the respective image output apparatuses 52 are separated from a program for performing processing commonly to all of the image output apparatuses 52; and 3) basic processing parts of the driver software are constructed independently of each of the image output apparatuses 52.

The hierarchy of the application software is comprised of application software 11, and the hierarchy of the OS (operation system) is comprised of a drawing interface that provides interface for receiving a drawing instruction from the application software 11, and a spooler 22 that transfers the generated image data to the image output apparatus 52 such as ink-jet printers.

The hierarchy of the driver software is comprised of the apparatus specific drawing functions 31-1 31-2, . . . , 31-n storing expressive forms specific to the respective corresponding image output apparatuses 52, a color characteristic converting section 33 that receives line-separated image data from the OS and converts an internal color system of the driver software into a color system specific to the image output apparatus 52, a halftoning section 34 that converts the image data into quantized quantities representing the status of respective pixels of the image output apparatus 52, and a print command generating section 35 that outputs the half-toned image data with a command to the image output apparatus 52 added thereto to the spooler 22.

The line-separated image data converted into quantized quantities is subjected to image processing such as color characteristic conversion performed by the color characteristic converting section 33 and half toning performed by the halftoning section 34. Further, the print command generating section 35 compresses the image data and adds a command thereto, and the resulting data is transferred to the image output apparatus 52 via the spooler 22 provided in the OS (operating system).

Figure 5:
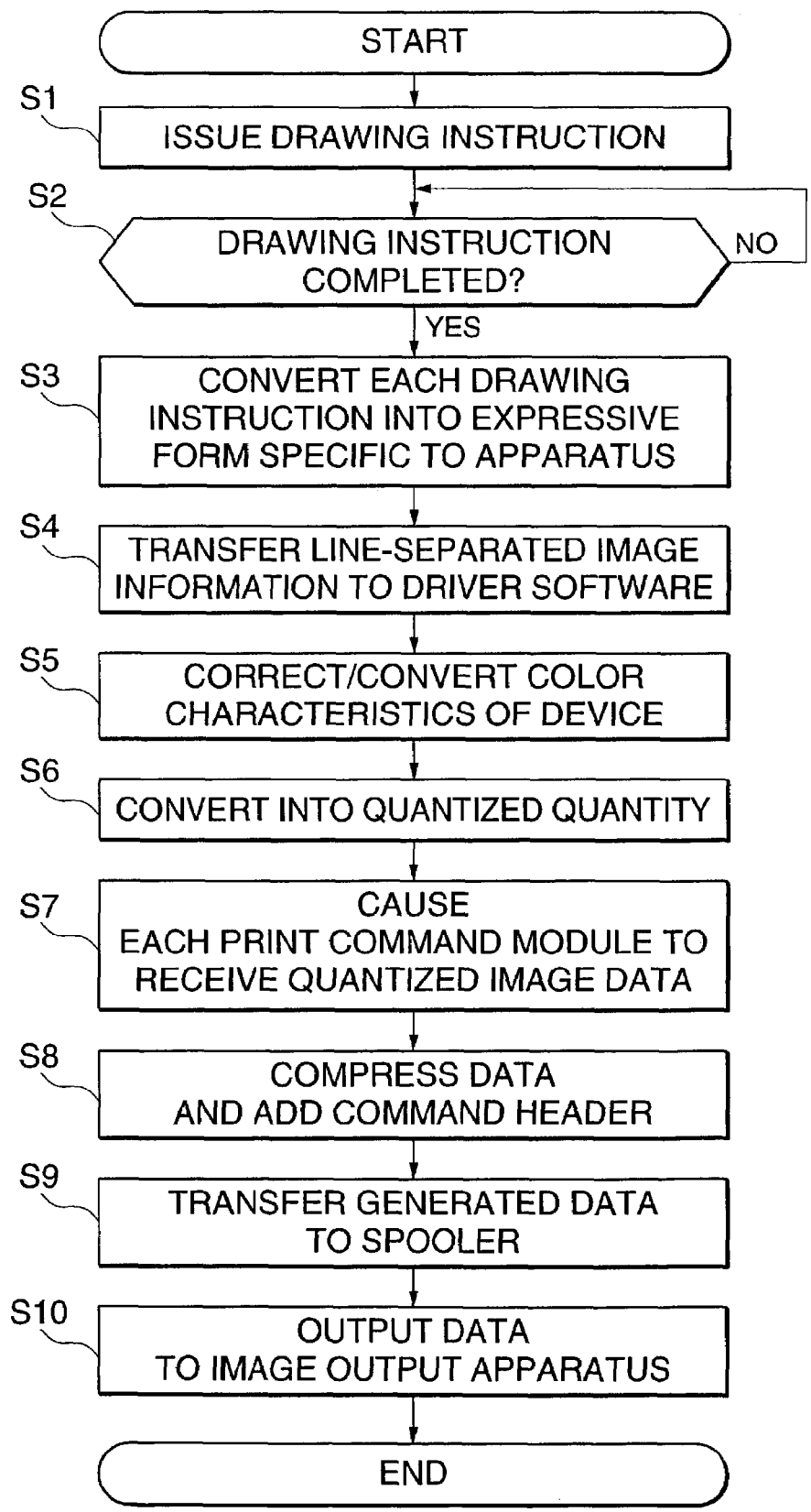
FIG. 5 is a flow chart showing an image forming procedure using the software of the information processing system image, which is configured as shown in FIG. 4.

A description will now be given of image processing according to the present embodiment with reference to FIG. 5. FIG. 5 is a flow chart showing the procedure for performing image processing using the above described software of the image forming system, which is configured as shown in FIG. 4. Here, the following description refers to the case where the application software 11 outputs an image to one of the image output apparatuses 52.

To output an image to the image output apparatus 52, as shown in FIG. 5, the application software 11 first issues an instruction for drawing characters, lines, figures, and/or bitmaps, etc. via the drawing interface 21 of the OS (step S1). Upon completion of a drawing instruction composing a screen/sheet surface in accordance with the instruction (step S2), the OS calls the corresponding one of the apparatus-specific drawing functions 31-1, 31-2, . . . , 31-n inside the driver software while converting each drawing instruction from an internal format in the OS into an expressive form (in which each drawing unit is line-separated) specific to the image output apparatus 52 (step S3). Image information obtained by line-separating the screen/sheet surface is then transferred to the driver software (step S4).

In the driver software, the color characteristic converting section 33 corrects the color characteristics of the image output apparatus 52 and converts the internal color system of the driver software into a color system specific to the image output apparatus 52 (step S5). The halftoning section 34 converts image data into quantize quantities representing the conditions of respective pixels in the image output apparatus 52 (half-toning) (step S6). It should be noted that the conversion into quantized quantities is carried out according to the form of data to be processed by the image output apparatus 52. For example, image data is binarized if the image output apparatus 52 performs recording based on binary data, and image data is converted into multivalued data if the image output apparatus 52 performs recording based on multivalued data (for recording using dark and light color inks or using large and small droplet inks). The halftoning process will be described later in further detail.

The print command generating section 35 receives quantized (binarized or multivalued) image data (step S7). The print command generating section 35 performs processing on the quantized image information in different manners according to the characteristics of the image output apparatus 52. Further, the print command generating section 35 performs compression of the image data and addition of a command header (step S8).

Thereafter, the print command generating section 35 transfers the generated data to the spooler 22 provided in the OS (step S9), and the spooler 22 outputs the data to the image output apparatus 52 (step S10).

It should be noted that in the present embodiment, a program according to the flow chart of FIG. 5 is stored in a storage device in the host apparatus 51, and the above described control can be realized by executing the program read out from the storage device.

Since the basic processing parts of the driver software are constructed independently of each of the image output apparatuses 52 as described above, it is possible to flexibly change the allotment of data processing to the driver software and the image output apparatus 52 without damaging the configuration of the driver software. This is advantageous in terms of software maintenance and management.

A detailed description will now be given of error diffusion performed by the halftoning section 34 according to the present embodiment. In the following description, it is assumed that the error diffusion is performed on multivalued image data as density data whose pixels are each composed of a yellow (Y) component, magenta (M) component, cyan (C) component, and black (K) component, and each component is composed of 8 bits (expressed in 256 gradation values).

The present embodiment employs a method in which threshold control is executed with ease using threshold tables, and a description will now be given of this method. In the following description, it is assumed that image data is expressed as multivalued data whose pixels are each composed of density components (Y, M, C, and K) each composed of 8 bits (gradation values of 0 to 255), and the image data is outputted as binary data.

Where the density values of a C component and an M component of a notice pixel in a multivalued color image are designated by Ct and Mt, respectively, and the density values of a C component and an M component of the original image are designated by C and M, respectively, the density values C and M are expressed by:

$Ct = C + Cerr$ $Mt = Merr$

Here, Cerr and Merr are accumulated error values obtained by error diffusion of the C component and the M component, respectively, of the notice pixel.

According to the present embodiment, the formation of an image composed of C and M components as shown in FIG. 5 is controlled in the following manner according to the densities of the C component and the M component of a notice pixel.

First, a threshold (Cthreshold) to be used for error diffusion on the C component is found based on the density value Mt of the M component. The density value Ct of the C component and the threshold Cthreshold are then compared with each other, and if the density value Ct is greater than the threshold Cthreshold, the image is outputted using C ink.

A threshold (Mthreshold) to be used for error diffusion on the M component is then found based on the density value Ct of the C component. The density value Mt of the M component and the threshold Mthreshold are then compared with each other, and if the density value Mt is greater than the threshold Mthreshold, the image is outputted using M ink.

Figure 6:
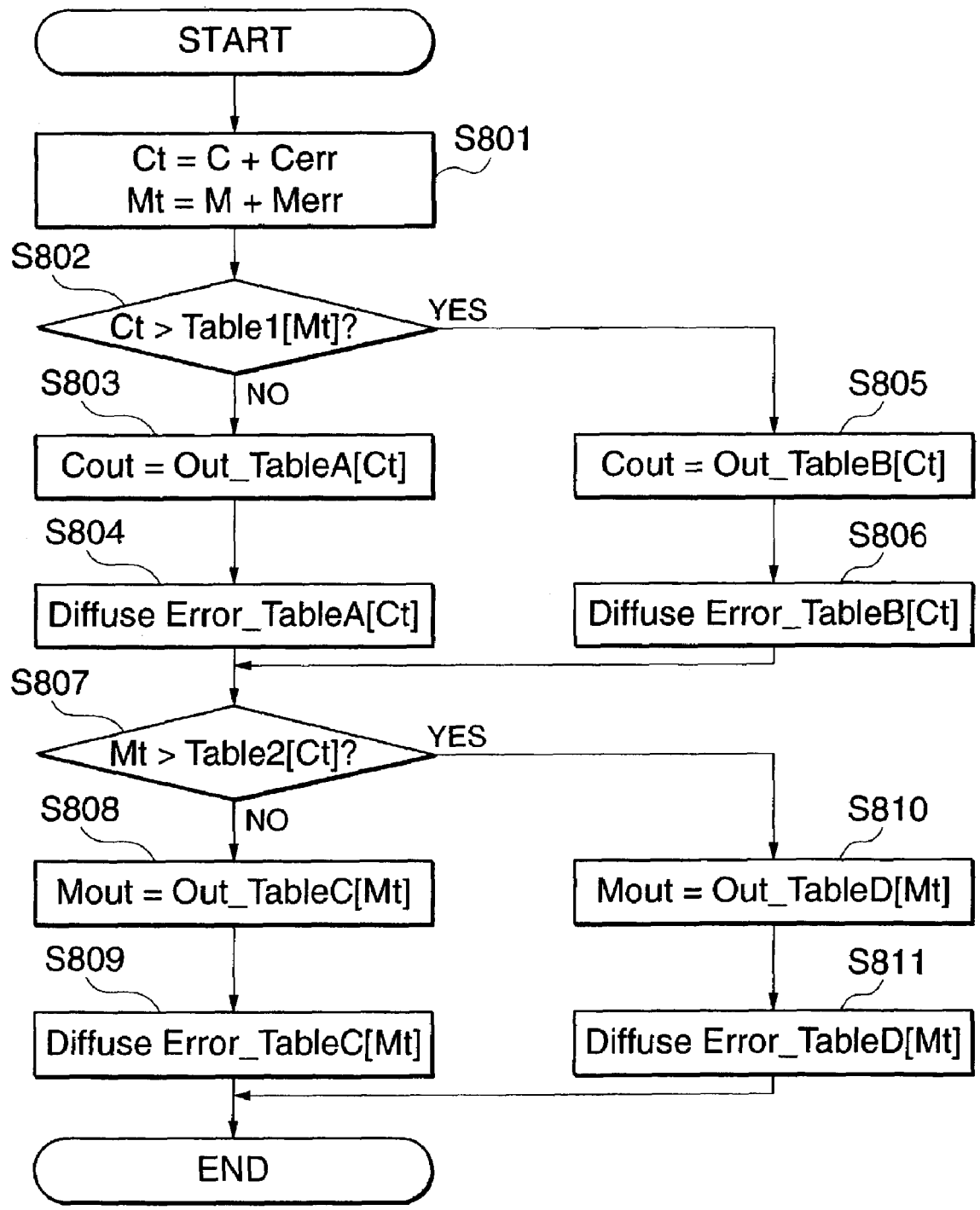
FIG. 6 is a flow chart showing the procedure for providing control of image formation by the host apparatus 51 in FIG. 1.

A detailed description will now be given of the procedure for providing the above mentioned image formation control with reference to FIG. 6. FIG. 6 is a flow chart showing the image formation control provided by the host apparatus 51 shown in FIG. 1. The present embodiment, it is assumed that binary quantization is performed in which an output quantization level of 0 or 1 is used. For the convenience's sake, it is also assumed that two colors consisting of cyan and magenta are subjected to processing.

In the image formation control, as shown in FIG. 6, total pixel density values Ct and Mt are first obtained by adding accumulated error values Cerr and Merr from peripheral pixels to input pixel density values C and M of cyan and magenta components in a step S801. In the next step S802, a threshold Table1[Mt] corresponding to the total density value Mt of the magenta component is read out from a cyan component binarization threshold table Table1, and the threshold Table1[Mt] corresponding to the total density value Mt and the total density value Ct of the cyan component are compared with each other. If the total density value Ct is greater than the threshold Table1[Mt], a value Out_TableB[Ct] corresponding to the total density value Ct is read out from an output quantized value table Out_TableB and the read out value Out_TableB[Ct] is set to an output quantized value Cout. Then, in a step S806, an error value corresponding to the output quantized value Cout is read out from a diffusion error table Error_TableB, and the error is diffused to peripheral pixels. The process then proceeds to a step S807.

If the total density value Ct is greater than the threshold Table1[Mt] in the step S802, a value Out_TableA[Ct] corresponding to the total density value Ct is read out from an output quantized value table Out_TableA, and the read value Out_TableA[Ct] is set to the output quantized value Cout in a step S803. Then, in a step S804, an error value corresponding to the output quantized value Cout is read out from a diffusion error table Error_TableA, and the error is diffused to peripheral pixels. The process then proceeds to the step S807.

In the step S807, a threshold Table2[Ct] corresponding to the total density value Ct of the cyan component is read out from a magenta component binarization threshold table Table2, and the read out threshold Table2[Ct] and the total density value Mt of the magenta component are compared with each other. If the total density value Mt is greater than the threshold Table2[Ct], a value Out_TableD[Mt] corresponding to the total density value Mt is read out from an output quantized value table Out_TableD and the read out value Out_TableD[Mt] is set to an output quantized value Mout in a step S810. Then, in a step S811, an error value corresponding to the output quantized value Mout is read out from a diffusion error table Error-TableD, and the error is diffused to peripheral pixels. The present process is then terminated.

If the total density value Mt is not greater than the threshold Table2[Ct] in the step S807, a value Out_TableC [Mt] corresponding to the total density value Mt is read out from an output quantized value table Out_TableC, and the read out value Out_TableC[Mt] is set to the output quantized value Mout in a step S808. Then, in a step S809, an error value corresponding to the output quantized value Mout is read out from a diffusion error table Error_TableC, and the error is diffused to the peripheral pixels. The present process is then terminated.

Referring next to FIGS. 7A to 7C, a description will be given of the relationship between the threshold tables, the output quantized value tables, and the diffusion error tables, which are used in the present embodiment. FIG. 7A is a view showing the relationship between the total density value Ct as the sum of an input density value and an accumulated error value of a cyan component, the total density value Mt as the sum of an input density value and an accumulated error value of a magenta component, and the output values of the cyan and magenta components in an error diffusing process comprised of a combination of processes of two or more colors, FIG. 7B is a view showing the output quantized value table Out_TableA and the diffusion error table Error_TableA, and FIG. 7C shows the output quantized value table Out_TableB and the diffusion error table Error_TableB.

A thick curved line 902 in FIG. 7A represents cyan binarization thresholds, and a horizontal line 901 in FIGS. 7A-7C represents the total density values Ct of a cyan component. The horizontal line 901 representing the density value intersects the threshold curve 902 at two points (904 and 905), and the output quantized value is 1 within a hatched region 903 (Mt1≦Mt<Mt2) whereas the output quantized value is 0 in other regions (Mt<Mt1, Mt2≦Mt).

As shown in FIG. 7B, the output quantized value table Out_TableA (CoutA) is correlated with the diffusion error table Error_TableA, and the diffusion error table Error_TableA contains errors (ErrorA) based on the quantized values CoutA and diffusion values (A0, A1, A2, and A3) based on the errors (ErrorA). Similarly, as shown in FIG. 7C, the output quantized value table Out_TableB (CoutB) and the diffusion error table Error_TableB are correlated with each other.

In the steps S802 and S807 shown in FIG. 6, if the density value is greater than the threshold, the table shown in FIG. 7C is used, and if the density value is not greater than the threshold, the table shown in FIG. 7B is used.

Tables 5-8 show detailed examples of the tables used for quantization of the cyan component. Description of detailed examples of the tables used for quantization of the magenta component is omitted.

TABLE 5

| Ct | CoutA | ErrorA | ExW0A | ExW1A | ExW2A | ExW3A | Ct | CoutB | ErrorB | ExW0B | ExW1B | ExW2B | ExW3B |
|---|---|---|---|---|---|---|---|---|---|---|---|---|---|
| 0 | 0 | 0 | 0.00 | 0.00 | 0.00 | 0.00 | 0 | 1 | −255 | −111.56 | −79.69 | −47.81 | −15.94 |
| 1 | 0 | 1 | 0.44 | 0.31 | 0.19 | 0.06 | 1 | 1 | −254 | −111.13 | −79.38 | −47.63 | −15.88 |
| 2 | 0 | 2 | 0.88 | 0.63 | 0.38 | 0.13 | 2 | 1 | −253 | −110.69 | −79.06 | −47.44 | −15.81 |
| 3 | 0 | 3 | 1.31 | 0.94 | 0.56 | 0.19 | 3 | 1 | −252 | −110.25 | −78.75 | −47.25 | −15.75 |
| 4 | 0 | 4 | 1.75 | 1.25 | 0.75 | 0.25 | 4 | 1 | −251 | −109.81 | −78.44 | −47.06 | −15.69 |
| 5 | 0 | 5 | 2.19 | 1.56 | 0.94 | 0.31 | 5 | 1 | −250 | −109.38 | −78.13 | −46.88 | −15.63 |
| 6 | 0 | 6 | 2.63 | 1.88 | 1.13 | 0.38 | 6 | 1 | −249 | −108.94 | −77.81 | −46.69 | −15.56 |
| 7 | 0 | 7 | 3.06 | 2.19 | 1.31 | 0.44 | 7 | 1 | −248 | −108.50 | −77.50 | −46.50 | −15.50 |
| 8 | 0 | 8 | 3.50 | 2.50 | 1.50 | 0.50 | 8 | 1 | −247 | −108.06 | −77.19 | −46.31 | −15.44 |
| 9 | 0 | 9 | 3.94 | 2.81 | 1.69 | 0.56 | 9 | 1 | −246 | −107.63 | −76.88 | −46.13 | −15.38 |
| 10 | 0 | 10 | 4.38 | 3.13 | 1.88 | 0.63 | 10 | 1 | −245 | −107.19 | −76.56 | −45.94 | −15.31 |
| 11 | 0 | 11 | 4.81 | 3.44 | 2.06 | 0.69 | 11 | 1 | −244 | −106.75 | −76.25 | −45.75 | −15.25 |
| 12 | 0 | 12 | 5.25 | 3.75 | 2.25 | 0.75 | 12 | 1 | −243 | −106.31 | −75.94 | −45.56 | −15.19 |
| 13 | 0 | 13 | 5.69 | 4.06 | 2.44 | 0.81 | 13 | 1 | −242 | −105.88 | −75.63 | −45.38 | −15.13 |
| 14 | 0 | 14 | 6.13 | 4.38 | 2.63 | 0.88 | 14 | 1 | −241 | −105.44 | −75.31 | −45.19 | −15.06 |
| 15 | 0 | 15 | 6.56 | 4.69 | 2.81 | 0.94 | 15 | 1 | −240 | −105.00 | −75.00 | −45.00 | −15.00 |
| 16 | 0 | 16 | 7.00 | 5.00 | 3.00 | 1.00 | 16 | 1 | −239 | −104.56 | −74.69 | −44.81 | −14.94 |
| 17 | 0 | 17 | 7.44 | 5.31 | 3.19 | 1.06 | 17 | 1 | −238 | −104.13 | −74.38 | −44.63 | −14.88 |
| 18 | 0 | 18 | 7.88 | 5.63 | 3.38 | 1.13 | 18 | 1 | −237 | −103.69 | −74.06 | −44.44 | −14.81 |
| 19 | 0 | 19 | 8.31 | 5.94 | 3.56 | 1.19 | 19 | 1 | −236 | −103.25 | −73.75 | −44.25 | −14.75 |
| 20 | 0 | 20 | 8.75 | 6.25 | 3.75 | 1.25 | 20 | 1 | −235 | −102.81 | −73.44 | −44.06 | −14.69 |
| 21 | 0 | 21 | 9.19 | 6.56 | 3.94 | 1.31 | 21 | 1 | −234 | −102.38 | −73.13 | −43.88 | −14.63 |
| 22 | 0 | 22 | 9.63 | 6.88 | 4.13 | 1.38 | 22 | 1 | −233 | −101.94 | −72.81 | −43.69 | −14.56 |
| 23 | 0 | 23 | 10.06 | 7.19 | 4.31 | 1.44 | 23 | 1 | −232 | −101.50 | −72.50 | −43.50 | −14.50 |
| 24 | 0 | 24 | 10.50 | 7.50 | 4.50 | 1.50 | 24 | 1 | −231 | −101.06 | −72.19 | −43.31 | −14.44 |
| 25 | 0 | 25 | 10.94 | 7.81 | 4.69 | 1.56 | 25 | 1 | −230 | −100.63 | −71.88 | −43.13 | −14.38 |
| 26 | 0 | 26 | 11.38 | 8.13 | 4.88 | 1.63 | 26 | 1 | −229 | −100.19 | −71.56 | −42.94 | −14.31 |
| 27 | 0 | 27 | 11.81 | 8.44 | 5.06 | 1.69 | 27 | 1 | −228 | −99.75 | −71.25 | −42.75 | −14.25 |
| 28 | 0 | 28 | 12.25 | 8.75 | 5.25 | 1.75 | 28 | 1 | −227 | −99.31 | −70.94 | −42.56 | −14.19 |
| 29 | 0 | 29 | 12.69 | 9.06 | 5.44 | 1.81 | 29 | 1 | −226 | −98.88 | −70.63 | −42.38 | −14.13 |
| 30 | 0 | 30 | 13.13 | 9.38 | 5.63 | 1.88 | 30 | 1 | −225 | −98.44 | −70.31 | −42.19 | −14.06 |
| 31 | 0 | 31 | 13.56 | 9.69 | 5.81 | 1.94 | 31 | 1 | −224 | −98.00 | −70.00 | −42.00 | −14.00 |
| 32 | 0 | 32 | 14.00 | 10.00 | 6.00 | 2.00 | 32 | 1 | −223 | −97.56 | −69.69 | −41.81 | −13.94 |
| 33 | 0 | 33 | 14.44 | 10.31 | 6.19 | 2.06 | 33 | 1 | −222 | −97.13 | −69.38 | −41.63 | −13.88 |
| 34 | 0 | 34 | 14.88 | 10.63 | 6.38 | 2.13 | 34 | 1 | −221 | −96.69 | −69.06 | −41.44 | −13.81 |
| 35 | 0 | 35 | 15.31 | 10.94 | 6.56 | 2.19 | 35 | 1 | −220 | −96.25 | −68.75 | −41.25 | −13.75 |
| 36 | 0 | 36 | 15.75 | 11.25 | 6.75 | 2.25 | 36 | 1 | −219 | −95.81 | −68.44 | −41.06 | −13.69 |
| 37 | 0 | 37 | 16.19 | 11.56 | 6.94 | 2.31 | 37 | 1 | −218 | −95.38 | −68.13 | −40.88 | −13.63 |
| 38 | 0 | 38 | 16.63 | 11.88 | 7.13 | 2.38 | 38 | 1 | −217 | −94.94 | −67.81 | −40.69 | −13.56 |
| 39 | 0 | 39 | 17.06 | 12.19 | 7.31 | 2.44 | 39 | 1 | −216 | −94.50 | −67.50 | −40.50 | −13.50 |
| 40 | 0 | 40 | 17.50 | 12.50 | 7.50 | 2.50 | 40 | 1 | −215 | −94.06 | −67.19 | −40.31 | −13.44 |

TABLE 5-continued

| Ct | CoutA | ErrorA | ExW0A | ExW1A | ExW2A | ExW3A | Ct | CoutB | ErrorB | ExW0B | ExW1B | ExW2B | ExW3B |
|---|---|---|---|---|---|---|---|---|---|---|---|---|---|
| 41 | 0 | 41 | 17.94 | 12.81 | 7.69 | 2.56 | 41 | 1 | −214 | −93.63 | −66.88 | −40.13 | −13.38 |
| 42 | 0 | 42 | 18.38 | 13.13 | 7.88 | 2.63 | 42 | 1 | −213 | −93.19 | −66.56 | −39.94 | −13.31 |
| 43 | 0 | 43 | 18.81 | 13.44 | 8.06 | 2.69 | 43 | 1 | −212 | −92.75 | −66.25 | −39.75 | −13.25 |
| 44 | 0 | 44 | 19.25 | 13.75 | 8.25 | 2.75 | 44 | 1 | −211 | −92.31 | −65.94 | −39.56 | −13.19 |
| 45 | 0 | 45 | 19.69 | 14.06 | 8.44 | 2.81 | 45 | 1 | −210 | −91.88 | −65.63 | −39.38 | −13.13 |
| 46 | 0 | 46 | 20.13 | 14.38 | 8.63 | 2.88 | 46 | 1 | −209 | −91.44 | −65.31 | −39.19 | −13.06 |
| 47 | 0 | 47 | 20.56 | 14.69 | 8.81 | 2.94 | 47 | 1 | −208 | −91.00 | −65.00 | −39.00 | −13.00 |
| 48 | 0 | 48 | 21.00 | 15.00 | 9.00 | 3.00 | 48 | 1 | −207 | −90.56 | −64.69 | −38.81 | −12.94 |
| 49 | 0 | 49 | 21.44 | 15.31 | 9.19 | 3.06 | 49 | 1 | −206 | −90.13 | −64.38 | −38.63 | −12.88 |
| 50 | 0 | 50 | 21.88 | 15.63 | 9.38 | 3.13 | 50 | 1 | −205 | −89.69 | −64.06 | −38.44 | −12.81 |
| 51 | 0 | 51 | 22.31 | 15.94 | 9.56 | 3.19 | 51 | 1 | −204 | −89.25 | −63.75 | −38.25 | −12.75 |
| 52 | 0 | 52 | 22.75 | 16.25 | 9.75 | 3.25 | 52 | 1 | −203 | −88.81 | −63.44 | −38.06 | −12.69 |
| 53 | 0 | 53 | 23.19 | 16.56 | 9.94 | 3.31 | 53 | 1 | −202 | −88.38 | −63.13 | −37.88 | −12.63 |
| 54 | 0 | 54 | 23.63 | 16.88 | 10.13 | 3.38 | 54 | 1 | −201 | −87.94 | −62.81 | −37.69 | −12.56 |
| 55 | 0 | 55 | 24.06 | 17.19 | 10.31 | 3.44 | 55 | 1 | −200 | −87.50 | −62.50 | −37.50 | −12.50 |
| 56 | 0 | 56 | 24.50 | 17.50 | 10.50 | 3.50 | 56 | 1 | −199 | −87.06 | −62.19 | −37.31 | −12.44 |
| 57 | 0 | 57 | 24.94 | 17.81 | 10.69 | 3.56 | 57 | 1 | −198 | −86.63 | −61.88 | −37.13 | −12.38 |
| 58 | 0 | 58 | 25.38 | 18.13 | 10.88 | 3.63 | 58 | 1 | −197 | −86.19 | −61.56 | −36.94 | −12.31 |
| 59 | 0 | 59 | 25.81 | 18.44 | 11.06 | 3.69 | 59 | 1 | −196 | −85.75 | −61.25 | −36.75 | −12.25 |
| 60 | 0 | 60 | 26.25 | 18.75 | 11.25 | 3.75 | 60 | 1 | −195 | −85.31 | −60.94 | −36.56 | −12.19 |
| 61 | 0 | 61 | 26.69 | 19.06 | 11.44 | 3.81 | 61 | 1 | −194 | −84.88 | −60.63 | −36.38 | −12.13 |
| 62 | 0 | 62 | 27.13 | 19.38 | 11.63 | 3.88 | 62 | 1 | −193 | −84.44 | −60.31 | −36.19 | −12.06 |
| 63 | 0 | 63 | 27.56 | 19.69 | 11.81 | 3.94 | 63 | 1 | −192 | −84.00 | −60.00 | −36.00 | −12.00 |

TABLE 6

| Ct | CoutA | ErrorA | ExW0A | ExW1A | ExW2A | ExW3A | Ct | CoutB | ErrorB | ExW0B | ExW1B | ExW2B | ExW3B |
|---|---|---|---|---|---|---|---|---|---|---|---|---|---|
| 64 | 0 | 64 | 28.00 | 20.00 | 12.00 | 4.00 | 64 | 1 | −191 | −83.56 | −59.69 | −35.81 | −11.94 |
| 65 | 0 | 65 | 28.44 | 20.31 | 12.19 | 4.06 | 65 | 1 | −190 | −83.13 | −59.38 | −35.63 | −11.88 |
| 66 | 0 | 66 | 28.88 | 20.63 | 12.38 | 4.13 | 66 | 1 | −189 | −82.69 | −59.06 | −35.44 | −11.81 |
| 67 | 0 | 67 | 29.31 | 20.94 | 12.56 | 4.19 | 67 | 1 | −188 | −82.25 | −58.75 | −35.25 | −11.75 |
| 68 | 0 | 68 | 29.75 | 21.25 | 12.75 | 4.25 | 68 | 1 | −187 | −81.81 | −58.44 | −35.06 | −11.69 |
| 69 | 0 | 69 | 30.19 | 21.56 | 12.94 | 4.31 | 69 | 1 | −186 | −81.38 | −58.13 | −34.88 | −11.63 |
| 70 | 0 | 70 | 30.63 | 21.88 | 13.13 | 4.38 | 70 | 1 | −185 | −80.94 | −57.81 | −34.69 | −11.56 |
| 71 | 0 | 71 | 31.06 | 22.19 | 13.31 | 4.44 | 71 | 1 | −184 | −80.50 | −57.50 | −34.50 | −11.50 |
| 72 | 0 | 72 | 31.50 | 22.50 | 13.50 | 4.50 | 72 | 1 | −183 | −80.06 | −57.19 | −34.31 | −11.44 |
| 73 | 0 | 73 | 31.94 | 22.81 | 13.69 | 4.56 | 73 | 1 | −182 | −79.63 | −56.88 | −34.13 | −11.38 |
| 74 | 0 | 74 | 32.38 | 23.13 | 13.88 | 4.63 | 74 | 1 | −181 | −79.19 | −56.56 | −33.94 | −11.31 |
| 75 | 0 | 75 | 32.81 | 23.44 | 14.06 | 4.69 | 75 | 1 | −180 | −78.75 | −56.25 | −33.75 | −11.25 |
| 76 | 0 | 76 | 33.25 | 23.75 | 14.25 | 4.75 | 76 | 1 | −179 | −78.31 | −55.94 | −33.56 | −11.19 |
| 77 | 0 | 77 | 33.69 | 24.06 | 14.44 | 4.81 | 77 | 1 | −178 | −77.88 | −55.63 | −33.38 | −11.13 |
| 78 | 0 | 78 | 34.13 | 24.38 | 14.63 | 4.88 | 78 | 1 | −177 | −77.44 | −55.31 | −33.19 | −11.06 |
| 79 | 0 | 79 | 34.56 | 24.69 | 14.81 | 4.94 | 79 | 1 | −176 | −77.00 | −55.00 | −33.00 | −11.00 |
| 80 | 0 | 80 | 35.00 | 25.00 | 15.00 | 5.00 | 80 | 1 | −175 | −76.56 | −54.69 | −32.81 | −10.94 |
| 81 | 0 | 81 | 35.44 | 25.31 | 15.19 | 5.06 | 81 | 1 | −174 | −76.13 | −54.38 | −32.63 | −10.88 |
| 82 | 0 | 82 | 35.88 | 25.63 | 15.38 | 5.13 | 82 | 1 | −173 | −75.69 | −54.06 | −32.44 | −10.81 |
| 83 | 0 | 83 | 36.31 | 25.94 | 15.56 | 5.19 | 83 | 1 | −172 | −75.25 | −53.75 | −32.25 | −10.75 |
| 84 | 0 | 84 | 36.75 | 26.25 | 15.75 | 5.25 | 84 | 1 | −171 | −74.81 | −53.44 | −32.06 | −10.69 |
| 85 | 0 | 85 | 37.19 | 26.56 | 15.94 | 5.31 | 85 | 1 | −170 | −74.38 | −53.13 | −31.88 | −10.63 |
| 86 | 0 | 86 | 37.63 | 26.88 | 16.13 | 5.38 | 86 | 1 | −169 | −73.94 | −52.81 | −31.69 | −10.56 |
| 87 | 0 | 87 | 38.06 | 27.19 | 16.31 | 5.44 | 87 | 1 | −168 | −73.50 | −52.50 | −31.50 | −10.50 |
| 88 | 0 | 88 | 38.50 | 27.50 | 16.50 | 5.50 | 88 | 1 | −167 | −73.06 | −52.19 | −31.31 | −10.44 |
| 89 | 0 | 89 | 38.94 | 27.81 | 16.69 | 5.56 | 89 | 1 | −166 | −72.63 | −51.88 | −31.13 | −10.38 |
| 90 | 0 | 90 | 39.38 | 28.13 | 16.88 | 5.63 | 90 | 1 | −165 | −72.19 | −51.56 | −30.94 | −10.31 |
| 91 | 0 | 91 | 39.81 | 28.44 | 17.06 | 5.69 | 91 | 1 | −164 | −71.75 | −51.25 | −30.75 | −10.25 |
| 92 | 0 | 92 | 40.25 | 28.75 | 17.25 | 5.75 | 92 | 1 | −163 | −71.31 | −50.94 | −30.56 | −10.19 |
| 93 | 0 | 93 | 40.69 | 29.06 | 17.44 | 5.81 | 93 | 1 | −162 | −70.88 | −50.63 | −30.38 | −10.13 |
| 94 | 0 | 94 | 41.13 | 29.38 | 17.63 | 5.88 | 94 | 1 | −161 | −70.44 | −50.31 | −30.19 | −10.06 |
| 95 | 0 | 95 | 41.56 | 29.69 | 17.81 | 5.94 | 95 | 1 | −160 | −70.00 | −50.00 | −30.00 | −10.00 |
| 96 | 0 | 96 | 42.00 | 30.00 | 18.00 | 6.00 | 96 | 1 | −159 | −69.56 | −49.69 | −29.81 | −9.94 |
| 97 | 0 | 97 | 42.44 | 30.31 | 18.19 | 6.06 | 97 | 1 | −158 | −69.13 | −49.38 | −29.63 | −9.88 |
| 98 | 0 | 98 | 42.88 | 30.63 | 18.38 | 6.13 | 98 | 1 | −157 | −68.69 | −49.06 | −29.44 | −9.81 |
| 99 | 0 | 99 | 43.31 | 30.94 | 18.56 | 6.19 | 99 | 1 | −156 | −68.25 | −48.75 | −29.25 | −9.75 |
| 100 | 0 | 100 | 43.75 | 31.25 | 18.75 | 6.25 | 100 | 1 | −155 | −67.81 | −48.44 | −29.06 | −9.69 |
| 101 | 0 | 101 | 44.19 | 31.56 | 18.94 | 6.31 | 101 | 1 | −154 | −67.38 | −48.13 | −28.88 | −9.63 |
| 102 | 0 | 102 | 44.63 | 31.88 | 19.13 | 6.38 | 102 | 1 | −153 | −66.94 | −47.81 | −28.69 | −9.56 |
| 103 | 0 | 103 | 45.06 | 32.19 | 19.31 | 6.44 | 103 | 1 | −152 | −66.50 | −47.50 | −28.50 | −9.50 |
| 104 | 0 | 104 | 45.50 | 32.50 | 19.50 | 6.50 | 104 | 1 | −151 | −66.06 | −47.19 | −28.31 | −9.44 |
| 105 | 0 | 105 | 45.94 | 32.81 | 19.69 | 6.56 | 105 | 1 | −150 | −65.63 | −46.88 | −28.13 | −9.38 |
| 106 | 0 | 106 | 46.38 | 33.13 | 19.88 | 6.63 | 106 | 1 | −149 | −65.19 | −46.56 | −27.94 | −9.31 |
| 107 | 0 | 107 | 46.81 | 33.44 | 20.06 | 6.69 | 107 | 1 | −148 | −64.75 | −46.25 | −27.75 | −9.25 |
| 108 | 0 | 108 | 47.25 | 33.75 | 20.25 | 6.75 | 108 | 1 | −147 | −64.31 | −45.94 | −27.56 | −9.19 |
| 109 | 0 | 109 | 47.69 | 34.06 | 20.44 | 6.81 | 109 | 1 | −146 | −63.88 | −45.63 | −27.38 | −9.13 |

TABLE 6-continued

| Ct | CoutA | ErrorA | ExW0A | ExW1A | ExW2A | ExW3A | Ct | CoutB | ErrorB | ExW0B | ExW1B | ExW2B | ExW3B |
|---|---|---|---|---|---|---|---|---|---|---|---|---|---|
| 110 | 0 | 110 | 48.13 | 34.38 | 20.63 | 6.88 | 110 | 1 | −145 | −63.44 | −45.31 | −27.19 | −9.06 |
| 111 | 0 | 111 | 48.56 | 34.69 | 20.81 | 6.94 | 111 | 1 | −144 | −63.00 | −45.00 | −27.00 | −9.00 |
| 112 | 0 | 112 | 49.00 | 35.00 | 21.00 | 7.00 | 112 | 1 | −143 | −62.56 | −44.69 | −26.81 | −8.94 |
| 113 | 0 | 113 | 49.44 | 35.31 | 21.19 | 7.06 | 113 | 1 | −142 | −62.13 | −44.38 | −26.63 | −8.88 |
| 114 | 0 | 114 | 49.88 | 35.63 | 21.38 | 7.13 | 114 | 1 | −141 | −61.69 | −44.06 | −26.44 | −8.81 |
| 115 | 0 | 115 | 50.31 | 35.94 | 21.56 | 7.19 | 115 | 1 | −140 | −61.25 | −43.75 | −26.25 | −8.75 |
| 116 | 0 | 116 | 50.75 | 36.25 | 21.75 | 7.25 | 116 | 1 | −139 | −60.81 | −43.44 | −26.06 | −8.69 |
| 117 | 0 | 117 | 51.19 | 36.56 | 21.94 | 7.31 | 117 | 1 | −138 | −60.38 | −43.13 | −25.88 | −8.63 |
| 118 | 0 | 118 | 51.63 | 36.88 | 22.13 | 7.38 | 118 | 1 | −137 | −59.94 | −42.81 | −25.69 | −8.56 |
| 119 | 0 | 119 | 52.06 | 37.19 | 22.31 | 7.44 | 119 | 1 | −136 | −59.50 | −42.50 | −25.50 | −8.50 |
| 120 | 0 | 120 | 52.50 | 37.50 | 22.50 | 7.50 | 120 | 1 | −135 | −59.06 | −42.19 | −25.31 | −8.44 |
| 121 | 0 | 121 | 52.94 | 37.81 | 22.69 | 7.56 | 121 | 1 | −134 | −58.63 | −41.88 | −25.13 | −8.38 |
| 122 | 0 | 122 | 53.38 | 38.13 | 22.88 | 7.63 | 122 | 1 | −133 | −58.19 | −41.56 | −24.94 | −8.31 |
| 123 | 0 | 123 | 53.81 | 38.44 | 23.06 | 7.69 | 123 | 1 | −132 | −57.75 | −41.25 | −24.75 | −8.25 |
| 124 | 0 | 124 | 54.25 | 38.75 | 23.25 | 7.75 | 124 | 1 | −131 | −57.31 | −40.94 | −24.56 | −8.19 |
| 125 | 0 | 125 | 54.69 | 39.06 | 23.44 | 7.81 | 125 | 1 | −130 | −56.88 | −40.63 | −24.38 | −8.13 |
| 126 | 0 | 126 | 55.13 | 39.38 | 23.63 | 7.88 | 126 | 1 | −129 | −56.44 | −40.31 | −24.19 | −8.06 |
| 127 | 0 | 127 | 55.56 | 39.69 | 23.81 | 7.94 | 127 | 1 | −128 | −56.00 | −40.00 | −24.00 | −8.00 |

TABLE 7

| Ct | CoutA | ErrorA | ExW0A | ExW1A | ExW2A | ExW3A | Ct | CoutB | ErrorB | ExW0B | ExW1B | ExW2B | ExW3B |
|---|---|---|---|---|---|---|---|---|---|---|---|---|---|
| 128 | 0 | 128 | 56.00 | 40.00 | 24.00 | 8.00 | 128 | 1 | −127 | −55.56 | −39.69 | −23.81 | −7.94 |
| 129 | 0 | 129 | 56.44 | 40.31 | 24.19 | 8.06 | 129 | 1 | −126 | −55.13 | −39.38 | −23.63 | −7.88 |
| 130 | 0 | 130 | 56.88 | 40.63 | 24.38 | 8.13 | 130 | 1 | −125 | −54.69 | −39.06 | −23.44 | −7.81 |
| 131 | 0 | 131 | 57.31 | 40.94 | 24.56 | 8.19 | 131 | 1 | −124 | −54.25 | −38.75 | −23.25 | −7.75 |
| 132 | 0 | 132 | 57.75 | 41.25 | 24.75 | 8.25 | 132 | 1 | −123 | −53.81 | −38.44 | −23.06 | −7.69 |
| 133 | 0 | 133 | 58.19 | 41.56 | 24.94 | 8.31 | 133 | 1 | −122 | −53.38 | −38.13 | −22.88 | −7.63 |
| 134 | 0 | 134 | 58.63 | 41.88 | 25.13 | 8.38 | 134 | 1 | −121 | −52.94 | −37.81 | −22.69 | −7.56 |
| 135 | 0 | 135 | 59.06 | 42.19 | 25.31 | 8.44 | 135 | 1 | −120 | −52.50 | −37.50 | −22.50 | −7.50 |
| 136 | 0 | 136 | 59.50 | 42.50 | 25.50 | 8.50 | 136 | 1 | −119 | −52.06 | −37.19 | −22.31 | −7.44 |
| 137 | 0 | 137 | 59.94 | 42.81 | 25.69 | 8.56 | 137 | 1 | −118 | −51.63 | −36.88 | −22.13 | −7.38 |
| 138 | 0 | 138 | 60.38 | 43.13 | 25.88 | 8.63 | 138 | 1 | −117 | −51.19 | −36.56 | −21.94 | −7.31 |
| 139 | 0 | 139 | 60.81 | 43.44 | 26.06 | 8.69 | 139 | 1 | −116 | −50.75 | −36.25 | −21.75 | −7.25 |
| 140 | 0 | 140 | 61.25 | 43.75 | 26.25 | 8.75 | 140 | 1 | −115 | −50.31 | −35.94 | −21.56 | −7.19 |
| 141 | 0 | 141 | 61.69 | 44.06 | 26.44 | 8.81 | 141 | 1 | −114 | −49.88 | −35.63 | −21.38 | −7.13 |
| 142 | 0 | 142 | 62.13 | 44.38 | 26.63 | 8.88 | 142 | 1 | −113 | −49.44 | −35.31 | −21.19 | −7.06 |
| 143 | 0 | 143 | 62.56 | 44.69 | 26.81 | 8.94 | 143 | 1 | −112 | −49.00 | −35.00 | −21.00 | −7.00 |
| 144 | 0 | 144 | 63.00 | 45.00 | 27.00 | 9.00 | 144 | 1 | −111 | −48.56 | −34.69 | −20.81 | −6.94 |
| 145 | 0 | 145 | 63.44 | 45.31 | 27.19 | 9.06 | 145 | 1 | −110 | −48.13 | −34.38 | −20.63 | −6.88 |
| 146 | 0 | 146 | 63.88 | 45.63 | 27.38 | 9.13 | 146 | 1 | −109 | −47.69 | −34.06 | −20.44 | −6.81 |
| 147 | 0 | 147 | 64.31 | 45.94 | 27.56 | 9.19 | 147 | 1 | −108 | −47.25 | −33.75 | −20.25 | −6.75 |
| 148 | 0 | 148 | 64.75 | 46.25 | 27.75 | 9.25 | 148 | 1 | −107 | −46.81 | −33.44 | −20.06 | −6.69 |
| 149 | 0 | 149 | 65.19 | 46.56 | 27.94 | 9.31 | 149 | 1 | −106 | −46.38 | −33.13 | −19.88 | −6.63 |
| 150 | 0 | 150 | 65.63 | 46.88 | 28.13 | 9.38 | 150 | 1 | −105 | −45.94 | −32.81 | −19.69 | −6.56 |
| 151 | 0 | 151 | 66.06 | 47.19 | 28.31 | 9.44 | 151 | 1 | −104 | −45.50 | −32.50 | −19.50 | −6.50 |
| 152 | 0 | 152 | 66.50 | 47.50 | 28.50 | 9.50 | 152 | 1 | −103 | −45.06 | −32.19 | −19.31 | −6.44 |
| 153 | 0 | 153 | 66.94 | 47.81 | 28.69 | 9.56 | 153 | 1 | −102 | −44.63 | −31.88 | −19.13 | −6.38 |
| 154 | 0 | 154 | 67.38 | 48.13 | 28.88 | 9.63 | 154 | 1 | −101 | −44.19 | −31.56 | −18.94 | −6.31 |
| 155 | 0 | 155 | 67.81 | 48.44 | 29.06 | 9.69 | 155 | 1 | −100 | −43.75 | −31.25 | −18.75 | −6.25 |
| 156 | 0 | 156 | 68.25 | 48.75 | 29.25 | 9.75 | 156 | 1 | −99 | −43.31 | −30.94 | −18.56 | −6.19 |
| 157 | 0 | 157 | 68.69 | 49.06 | 29.44 | 9.81 | 157 | 1 | −98 | −42.88 | −30.63 | −18.38 | −6.13 |
| 158 | 0 | 158 | 69.13 | 49.38 | 29.63 | 9.88 | 158 | 1 | −97 | −42.44 | −30.31 | −18.19 | −6.06 |
| 159 | 0 | 159 | 69.56 | 49.69 | 29.81 | 9.94 | 159 | 1 | −96 | −42.00 | −30.00 | −18.00 | −6.00 |
| 160 | 0 | 160 | 70.00 | 50.00 | 30.00 | 10.00 | 160 | 1 | −95 | −41.56 | −29.69 | −17.81 | −5.94 |
| 161 | 0 | 161 | 70.44 | 50.31 | 30.19 | 10.06 | 161 | 1 | −94 | −41.13 | −29.38 | −17.63 | −5.88 |
| 162 | 0 | 162 | 70.88 | 50.63 | 30.38 | 10.13 | 162 | 1 | −93 | −40.69 | −29.06 | −17.44 | −5.81 |
| 163 | 0 | 163 | 71.31 | 50.94 | 30.56 | 10.19 | 163 | 1 | −92 | −40.25 | −28.75 | −17.25 | −5.75 |
| 164 | 0 | 164 | 71.75 | 51.25 | 30.75 | 10.25 | 164 | 1 | −91 | −39.81 | −28.44 | −17.06 | −5.69 |
| 165 | 0 | 165 | 72.19 | 51.56 | 30.94 | 10.31 | 165 | 1 | −90 | −39.38 | −28.13 | −16.88 | −5.63 |
| 166 | 0 | 166 | 72.63 | 51.88 | 31.13 | 10.38 | 166 | 1 | −89 | −38.94 | −27.81 | −16.69 | −5.56 |
| 167 | 0 | 167 | 73.06 | 52.19 | 31.31 | 10.44 | 167 | 1 | −88 | −38.50 | −27.50 | −16.50 | −5.50 |
| 168 | 0 | 168 | 73.50 | 52.50 | 31.50 | 10.50 | 168 | 1 | −87 | −38.06 | −27.19 | −16.31 | −5.44 |
| 169 | 0 | 169 | 73.94 | 52.81 | 31.69 | 10.56 | 169 | 1 | −86 | −37.63 | −26.88 | −16.13 | −5.38 |
| 170 | 0 | 170 | 74.38 | 53.13 | 31.88 | 10.63 | 170 | 1 | −85 | −37.19 | −26.56 | −15.94 | −5.31 |
| 171 | 0 | 171 | 74.81 | 53.44 | 32.06 | 10.69 | 171 | 1 | −84 | −36.75 | −26.25 | −15.75 | −5.25 |
| 172 | 0 | 172 | 75.25 | 53.75 | 32.25 | 10.75 | 172 | 1 | −83 | −36.31 | −25.94 | −15.56 | −5.19 |
| 173 | 0 | 173 | 75.69 | 54.06 | 32.44 | 10.81 | 173 | 1 | −82 | −35.88 | −25.63 | −15.38 | −5.13 |
| 174 | 0 | 174 | 76.13 | 54.38 | 32.63 | 10.88 | 174 | 1 | −81 | −35.44 | −25.31 | −15.19 | −5.06 |
| 175 | 0 | 175 | 76.56 | 54.69 | 32.81 | 10.94 | 175 | 1 | −80 | −35.00 | −25.00 | −15.00 | −5.00 |
| 176 | 0 | 176 | 77.00 | 55.00 | 33.00 | 11.00 | 176 | 1 | −79 | −34.56 | −24.69 | −14.81 | −4.94 |
| 177 | 0 | 177 | 77.44 | 55.31 | 33.19 | 11.06 | 177 | 1 | −78 | −34.13 | −24.38 | −14.63 | −4.88 |
| 178 | 0 | 178 | 77.88 | 55.63 | 33.38 | 11.13 | 178 | 1 | −77 | −33.69 | −24.06 | −14.44 | −4.81 |

TABLE 7-continued

| Ct | CoutA | ErrorA | ExW0A | ExW1A | ExW2A | ExW3A | Ct | CoutB | ErrorB | ExW0B | ExW1B | ExW2B | ExW3B |
|---|---|---|---|---|---|---|---|---|---|---|---|---|---|
| 179 | 0 | 179 | 78.31 | 55.94 | 33.56 | 11.19 | 179 | 1 | −76 | −33.25 | −23.75 | −14.25 | −4.75 |
| 180 | 0 | 180 | 78.75 | 56.25 | 33.75 | 11.25 | 180 | 1 | −75 | −32.81 | −23.44 | −14.06 | −4.69 |
| 181 | 0 | 181 | 79.19 | 56.56 | 33.94 | 11.31 | 181 | 1 | −74 | −32.38 | −23.13 | −13.88 | −4.63 |
| 182 | 0 | 182 | 79.63 | 56.88 | 34.13 | 11.38 | 182 | 1 | −73 | −31.94 | −22.81 | −13.69 | −4.56 |
| 183 | 0 | 183 | 80.06 | 57.19 | 34.31 | 11.44 | 183 | 1 | −72 | −31.50 | −22.50 | −13.50 | −4.50 |
| 184 | 0 | 184 | 80.50 | 57.50 | 34.50 | 11.50 | 184 | 1 | −71 | −31.06 | −22.19 | −13.31 | −4.44 |
| 185 | 0 | 185 | 80.94 | 57.81 | 34.69 | 11.56 | 185 | 1 | −70 | −30.63 | −21.88 | −13.13 | −4.38 |
| 186 | 0 | 186 | 81.38 | 58.13 | 34.88 | 11.63 | 186 | 1 | −69 | −30.19 | −21.56 | −12.94 | −4.31 |
| 187 | 0 | 187 | 81.81 | 58.44 | 35.06 | 11.69 | 187 | 1 | −68 | −29.75 | −21.25 | −12.75 | −4.25 |
| 188 | 0 | 188 | 82.25 | 58.75 | 35.25 | 11.75 | 188 | 1 | −67 | −29.31 | −20.94 | −12.56 | −4.19 |
| 189 | 0 | 189 | 82.69 | 59.06 | 35.44 | 11.81 | 189 | 1 | −66 | −28.88 | −20.63 | −12.38 | −4.13 |
| 190 | 0 | 190 | 83.13 | 59.38 | 35.63 | 11.88 | 190 | 1 | −65 | −28.44 | −20.31 | −12.19 | −4.06 |
| 191 | 0 | 191 | 83.56 | 59.69 | 35.81 | 11.94 | 191 | 1 | −64 | −28.00 | −20.00 | −12.00 | −4.00 |

TABLE 8

| Ct | CoutA | ErrorA | ExW0A | ExW1A | ExW2A | ExW3A | Ct | CoutB | ErrorB | ExW0B | ExW1B | ExW2B | ExW3B |
|---|---|---|---|---|---|---|---|---|---|---|---|---|---|
| 192 | 0 | 192 | 84.00 | 60.00 | 36.00 | 12.00 | 192 | 1 | −63 | −27.56 | −19.69 | −11.81 | −3.94 |
| 193 | 0 | 193 | 84.44 | 60.31 | 36.19 | 12.06 | 193 | 1 | −62 | −27.13 | −19.38 | −11.63 | −3.88 |
| 194 | 0 | 194 | 84.88 | 60.63 | 36.38 | 12.13 | 194 | 1 | −61 | −26.69 | −19.06 | −11.44 | −3.81 |
| 195 | 0 | 195 | 85.31 | 60.94 | 36.56 | 12.19 | 195 | 1 | −60 | −26.25 | −18.75 | −11.25 | −3.75 |
| 196 | 0 | 196 | 85.75 | 61.25 | 36.75 | 12.25 | 196 | 1 | −59 | −25.81 | −18.44 | −11.06 | −3.69 |
| 197 | 0 | 197 | 86.19 | 61.56 | 36.94 | 12.31 | 197 | 1 | −58 | −25.38 | −18.13 | −10.88 | −3.63 |
| 198 | 0 | 198 | 86.63 | 61.88 | 37.13 | 12.38 | 198 | 1 | −57 | −24.94 | −17.81 | −10.69 | −3.56 |
| 199 | 0 | 199 | 87.06 | 62.19 | 37.31 | 12.44 | 199 | 1 | −56 | −24.50 | −17.50 | −10.50 | −3.50 |
| 200 | 0 | 200 | 87.50 | 62.50 | 37.50 | 12.50 | 200 | 1 | −55 | −24.06 | −17.19 | −10.31 | −3.44 |
| 201 | 0 | 201 | 87.94 | 62.81 | 37.69 | 12.56 | 201 | 1 | −54 | −23.63 | −16.88 | −10.13 | −3.38 |
| 202 | 0 | 202 | 88.38 | 63.13 | 37.88 | 12.63 | 202 | 1 | −53 | −23.19 | −16.56 | −9.94 | −3.31 |
| 203 | 0 | 203 | 88.81 | 63.44 | 38.06 | 12.69 | 203 | 1 | −52 | −22.75 | −16.25 | −9.75 | −3.25 |
| 204 | 0 | 204 | 89.25 | 63.75 | 38.25 | 12.75 | 204 | 1 | −51 | −22.31 | −15.94 | −9.56 | −3.19 |
| 205 | 0 | 205 | 89.69 | 64.06 | 38.44 | 12.81 | 205 | 1 | −50 | −21.88 | −15.63 | −9.38 | −3.13 |
| 206 | 0 | 206 | 90.13 | 64.38 | 38.63 | 12.88 | 206 | 1 | −49 | −21.44 | −15.31 | −9.19 | −3.06 |
| 207 | 0 | 207 | 90.56 | 64.69 | 38.81 | 12.94 | 207 | 1 | −48 | −21.00 | −15.00 | −9.00 | −3.00 |
| 208 | 0 | 208 | 91.00 | 65.00 | 39.00 | 13.00 | 208 | 1 | −47 | −20.56 | −14.69 | −8.81 | −2.94 |
| 209 | 0 | 209 | 91.44 | 65.31 | 39.19 | 13.06 | 209 | 1 | −46 | −20.13 | −14.38 | −8.63 | −2.88 |
| 210 | 0 | 210 | 91.88 | 65.63 | 39.38 | 13.13 | 210 | 1 | −45 | −19.69 | −14.06 | −8.44 | −2.81 |
| 211 | 0 | 211 | 92.31 | 65.94 | 39.56 | 13.19 | 211 | 1 | −44 | −19.25 | −13.75 | −8.25 | −2.75 |
| 212 | 0 | 212 | 92.75 | 66.25 | 39.75 | 13.25 | 212 | 1 | −43 | −18.81 | −13.44 | −8.06 | −2.69 |
| 213 | 0 | 213 | 93.19 | 66.56 | 39.94 | 13.31 | 213 | 1 | −42 | −18.38 | −13.13 | −7.88 | −2.63 |
| 214 | 0 | 214 | 93.63 | 66.88 | 40.13 | 13.38 | 214 | 1 | −41 | −17.94 | −12.81 | −7.69 | −2.56 |
| 215 | 0 | 215 | 94.06 | 67.19 | 40.31 | 13.44 | 215 | 1 | −40 | −17.50 | −12.50 | −7.50 | −2.50 |
| 216 | 0 | 216 | 94.50 | 67.50 | 40.50 | 13.50 | 216 | 1 | −39 | −17.06 | −12.19 | −7.31 | −2.44 |
| 217 | 0 | 217 | 94.94 | 67.81 | 40.69 | 13.56 | 217 | 1 | −38 | −16.63 | −11.88 | −7.13 | −2.38 |
| 218 | 0 | 218 | 95.38 | 68.13 | 40.88 | 13.63 | 218 | 1 | −37 | −16.19 | −11.56 | −6.94 | −2.31 |
| 219 | 0 | 219 | 95.81 | 68.44 | 41.06 | 13.69 | 219 | 1 | −36 | −15.75 | −11.25 | −6.75 | −2.25 |
| 220 | 0 | 220 | 96.25 | 68.75 | 41.25 | 13.75 | 220 | 1 | −35 | −15.31 | −10.94 | −6.56 | −2.19 |
| 221 | 0 | 221 | 96.69 | 69.06 | 41.44 | 13.81 | 221 | 1 | −34 | −14.88 | −10.63 | −6.38 | −2.13 |
| 222 | 0 | 222 | 97.13 | 69.38 | 41.63 | 13.88 | 222 | 1 | −33 | −14.44 | −10.31 | −6.19 | −2.06 |
| 223 | 0 | 223 | 97.56 | 69.69 | 41.81 | 13.94 | 223 | 1 | −32 | −14.00 | −10.00 | −6.00 | −2.00 |
| 224 | 0 | 224 | 98.00 | 70.00 | 42.00 | 14.00 | 224 | 1 | −31 | −13.56 | −9.69 | −5.81 | −1.94 |
| 225 | 0 | 225 | 98.44 | 70.31 | 42.19 | 14.06 | 225 | 1 | −30 | −13.13 | −9.38 | −5.63 | −1.88 |
| 226 | 0 | 226 | 98.88 | 70.63 | 42.38 | 14.13 | 226 | 1 | −29 | −12.69 | −9.06 | −5.44 | −1.81 |
| 227 | 0 | 227 | 99.31 | 70.94 | 42.56 | 14.19 | 227 | 1 | −28 | −12.25 | −8.75 | −5.25 | −1.75 |
| 228 | 0 | 228 | 99.75 | 71.25 | 42.75 | 14.25 | 228 | 1 | −27 | −11.81 | −8.44 | −5.06 | −1.69 |
| 229 | 0 | 229 | 100.19 | 71.56 | 42.94 | 14.31 | 229 | 1 | −26 | −11.38 | −8.13 | −4.88 | −1.63 |
| 230 | 0 | 230 | 100.63 | 71.88 | 43.13 | 14.38 | 230 | 1 | −25 | −10.94 | −7.81 | −4.69 | −1.56 |
| 231 | 0 | 231 | 101.06 | 72.19 | 43.31 | 14.44 | 231 | 1 | −24 | −10.50 | −7.50 | −4.50 | −1.50 |
| 232 | 0 | 232 | 101.50 | 72.50 | 43.50 | 14.50 | 232 | 1 | −23 | −10.06 | −7.19 | −4.31 | −1.44 |
| 233 | 0 | 233 | 101.94 | 72.81 | 43.69 | 14.56 | 233 | 1 | −22 | −9.63 | −6.88 | −4.13 | −1.38 |
| 234 | 0 | 234 | 102.38 | 73.13 | 43.88 | 14.63 | 234 | 1 | −21 | −9.19 | −6.56 | −3.94 | −1.31 |
| 235 | 0 | 235 | 102.81 | 73.44 | 44.06 | 14.69 | 235 | 1 | −20 | −8.75 | −6.25 | −3.75 | −1.25 |
| 236 | 0 | 236 | 103.25 | 73.75 | 44.25 | 14.75 | 236 | 1 | −19 | −8.31 | −5.94 | −3.56 | −1.19 |
| 237 | 0 | 237 | 103.69 | 74.06 | 44.44 | 14.81 | 237 | 1 | −18 | −7.88 | −5.63 | −3.38 | −1.13 |
| 238 | 0 | 238 | 104.13 | 74.38 | 44.63 | 14.88 | 238 | 1 | −17 | −7.44 | −5.31 | −3.19 | −1.06 |
| 239 | 0 | 239 | 104.56 | 74.69 | 44.81 | 14.94 | 239 | 1 | −16 | −7.00 | −5.00 | −3.00 | −1.00 |
| 240 | 0 | 240 | 105.00 | 75.00 | 45.00 | 15.00 | 240 | 1 | −15 | −6.56 | −4.69 | −2.81 | −0.94 |
| 241 | 0 | 241 | 105.44 | 75.31 | 45.19 | 15.06 | 241 | 1 | −14 | −6.13 | −4.38 | −2.63 | −0.88 |
| 242 | 0 | 242 | 105.88 | 75.63 | 45.38 | 15.13 | 242 | 1 | −13 | −5.69 | −4.06 | −2.44 | −0.81 |
| 243 | 0 | 243 | 106.31 | 75.94 | 45.56 | 15.19 | 243 | 1 | −12 | −5.25 | −3.75 | −2.25 | −0.75 |
| 244 | 0 | 244 | 106.75 | 76.25 | 45.75 | 15.25 | 244 | 1 | −11 | −4.81 | −3.44 | −2.06 | −0.69 |
| 245 | 0 | 245 | 107.19 | 76.56 | 45.94 | 15.31 | 245 | 1 | −10 | −4.38 | −3.13 | −1.88 | −0.63 |
| 246 | 0 | 246 | 107.63 | 76.88 | 46.13 | 15.38 | 246 | 1 | −9 | −3.94 | −2.81 | −1.69 | −0.56 |
| 247 | 0 | 247 | 108.06 | 77.19 | 46.31 | 15.44 | 247 | 1 | −8 | −3.50 | −2.50 | −1.50 | −0.50 |

TABLE 8-continued

| Ct | CoutA | ErrorA | ExW0A | ExW1A | ExW2A | ExW3A | Ct | CoutB | ErrorB | ExW0B | ExW1B | ExW2B | ExW3B |
|---|---|---|---|---|---|---|---|---|---|---|---|---|---|
| 248 | 0 | 248 | 108.50 | 77.50 | 46.50 | 15.50 | 248 | 1 | −7 | −3.06 | −2.19 | −1.31 | −0.44 |
| 249 | 0 | 249 | 108.94 | 77.81 | 46.69 | 15.56 | 249 | 1 | −6 | −2.63 | −1.88 | −1.13 | −0.38 |
| 250 | 0 | 250 | 109.38 | 78.13 | 46.88 | 15.63 | 250 | 1 | −5 | −2.19 | −1.56 | −0.94 | −0.31 |
| 251 | 0 | 251 | 109.81 | 78.44 | 47.06 | 15.69 | 251 | 1 | −4 | −1.75 | −1.25 | −0.75 | −0.25 |
| 252 | 0 | 252 | 110.25 | 78.75 | 47.25 | 15.75 | 252 | 1 | −3 | −1.31 | −0.94 | −0.56 | −0.19 |
| 253 | 0 | 253 | 110.69 | 79.06 | 47.44 | 15.81 | 253 | 1 | −2 | −0.88 | −0.63 | −0.38 | −0.13 |
| 254 | 0 | 254 | 111.13 | 79.38 | 47.63 | 15.88 | 254 | 1 | −1 | −0.44 | −0.31 | −0.19 | −0.06 |
| 255 | 0 | 255 | 111.56 | 79.69 | 47.81 | 15.94 | 255 | 1 | 0 | 0.00 | 0.00 | 0.00 | 0.00 |

A detailed description will now be given of the tables shown in Tables 5-8.

In the tables used in the case where the total density value Ct is not greater than the threshold (the left sides in Tables 5-8), all of values represented by the quantized value table Out_TableA (CoutA in Tables 5-8) are 0 since the output quantized value is 0 when the total density value Ct is not greater than the threshold. Thus, values (ExW0A, ExW1A, ExW2A, and ExW3A in Tables 5-8) calculated in advance correspondingly to the quantized value of 0 are stored in the diffusion error table Error_TableA.

In the tables used in the case where the total density value Ct is greater than the threshold (the right sides in Tables 5-8), all of values represented by the quantized value table Out_TableB (CoutB in Tables 5-8) are 1 since the output quantized value is 1 when the total density value Ct is greater than the threshold. Thus, values (ExW0B, ExW1B, ExW2B, and ExW3B in Tables 5-8) calculated in advance correspondingly to the quantized value of 1 are stored as the diffusion error table Error_TableB.

As a result, in either of the case where the total density values Ct and Mt are greater than thresholds and the case where the total density values Ct and Mt are not greater than the thresholds, it is possible to refer to tables containing correct calculation results by selecting quantized value tables and error diffusion tables according to the comparison results.

As described above, according to the present embodiment, even in the error diffusing process comprised of a combination of processes of two or more colors, it is possible to use calculation results stored in tables prepared in advance in the actual error diffusion, thus realizing high-speed processing with simplified multiplications and divisions.

A description will now be given of a second embodiment of the present invention. The construction of the second embodiment is identical with that of the first embodiment, and therefore description thereof is omitted.

Although image data is binarized according to the first embodiment, image data is converted into multivalued data such as ternary or more data according to the present embodiment. The following description refers to the case where image data is converted into quinary data (Cout, Mout=0 to 4).

$Ct=C+Cerr$ $Mt=M+Merr$

If(Tbl1[Mt]≧Ct) [Cout=OutTblA[Ct], Diffuse ErrTblA [Ct]]

If (Tbl2[Mt]≧Ct>Tbl1[Mt]) [Cout=OutTblB[Ct], Diffuse ErrTblB[Ct]]

If (Tbl3[Mt]≧Ct>Tbl2[Mt]) [Cout=OutTblC[Ct], Diffuse ErrTblC [Ct]]

If(Tbl4[Mt]≧Ct>Tbl3[Mt]) [Cout=OutTblD[Ct], Diffuse ErrTblD[Ct]]

If(Ct>Tbl4[Mt]) [Cout=OutTblE[Ct], Diffuse ErrTblE [Ct]]

If(Tbl5[Ct]≧Mt) [Mout=OutTblF[Mt], Diffuse ErrTblF [Mt]]

If (Tbl6[Ct]≧Mt>Tbl5[Ct]) [Mout=OutTblG[Mt], Diffuse ErrTblG[Mt]]

If(Tbl7[Ct]≧Mt>Tbl6[Ct]) [Mout=OutTblH[Mt], Diffuse ErrTblH[Mt]]

If(Tbl8[Ct]≧Mt>Tbl7[Ct]) [Mout=OutTblI[Mt], Diffuse ErrTblI[Mt]]

If(Mt>Tbl8[Ct]) [Mout=OutTblJ[Mt], Diffuse ErrTblJ [Mt]]

Here, OutTblA to OutTblJ represent output quantization tables, and ErrTbleA to ErrTbleJ represent diffusion error tables. The output quantization table OutTblA and the diffusion error table ErrTbleA have contents (numerical values) suitable for the case where the total density value Ct is equal to or greater than a threshold read out from a threshold table Tbl1 based on the total density value Mt. The output quantized value table OutTblB and the diffusion error table ErrTbleB have contents (numerical values) suitable for the case where the total density value Ct is greater than a threshold read out from the threshold table Tbl1 based on the total density value Mt and is equal to or less than a threshold read out from a threshold table Tbl2 based on the total density value Mt. The output quantized value table OutTblC and the diffusion error table ErrTbleC have contents (numerical values) suitable for the case where the total density value Ct is greater than a threshold read out from the threshold table Tbl2 based on the total density value Mt and is equal to or less than a threshold read out from a threshold table Tbl3 based on the total density value Mt are described. The output quantized value table OutTblD and the diffusion error table ErrTbleD have contents (numerical values) suitable for the case where the total density value Ct is greater than a threshold read out from the threshold table Tbl3 based on the total density value Mt and is equal to or less than a threshold read out from a threshold table Tbl4 based on the total density value Mt. The output quantized value table OutTblE and the diffusion error table ErrTbleE have contents (numerical values) suitable for the case where the total density value Ct is greater than a threshold read out from the threshold table Tbl4 based on the total density value Mt.

The output quantized value table OutTblF and the diffusion error table ErrTbleF have contents (numerical values) suitable for the case where the total density value Mt is equal to or less than a threshold read out from a threshold table Tbl5 based on the total density value Ct. The output quantized value table OutTblG and the diffusion error table ErrTbleG have contents (numerical values) suitable for the case where the total density value Mt is greater than a threshold read out from the threshold table Tbl5 based on the total density value Ct and is equal to or less than a threshold read out from a threshold table Tbl6 based on the total density value Ct. The output quantized value table OutTblH and the diffusion error table ErrTbleH have contents (numerical values) suitable for the case where the total density value Mt is greater than a threshold read out from a threshold table Tbl6 based on the total density value Ct and is equal to or less than a threshold read out from a threshold table Tbl7 based on the total density value Ct. The output quantized value table OutTblI and the diffusion error table ErrTbleI have contents (numerical values) suitable for the case where the total density value Mt is greater than a threshold read out from the threshold table Tbl7 based on the total density value Ct and is equal to or less than a threshold read out from a threshold table Tbl8 based on the total density value Ct. The output quantized value table OutTblJ and the diffusion error table ErrTbleJ have contents (numerical values) suitable for the case where the total density value Mt is greater than a threshold read out from the threshold table Tbl8 based on the total density value Ct.

As described above, according to the present invention, even in the case where error diffusion is performed on multi-valued data which is ternary or more comprised of a combination of processes of two or more colors, it is possible to use calculation results stored in advance in tables when actually performing error diffusion, thus realizing high-speed processing with simplified multiplications and divisions.

Figure 8A:
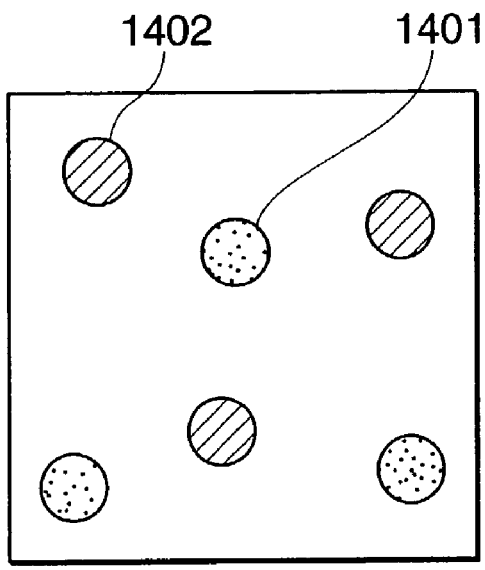
FIGS. 8A and 8B are views showing examples of output results on a printer output sheet outputted from an image processing apparatus according to a third embodiment of the present invention in the case where two-color simultaneous error diffusion is performed on a highlighted part by the image processing apparatus according to the third embodiment.
Figure 8B:
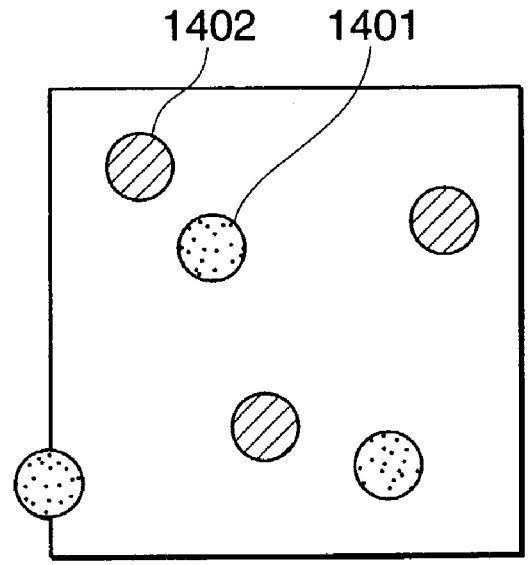
Figure 9A:
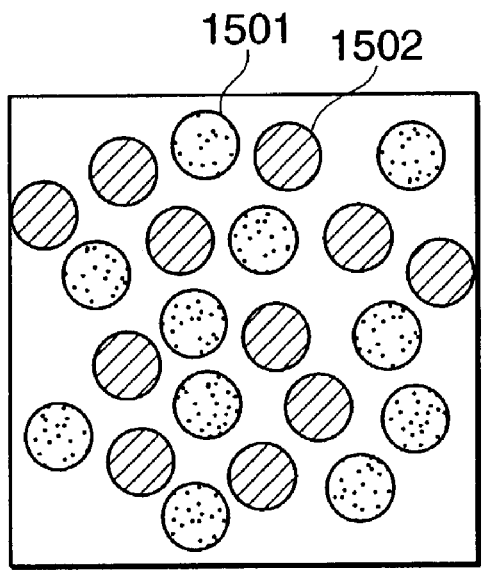
FIGS. 9A and 9B are views showing examples of output results on a printer output sheet outputted from an image processing apparatus according to the third embodiment in the case where two-color simultaneous error diffusion is performed on a half-tone part by the image processing apparatus according to the third embodiment.
Figure 9B:
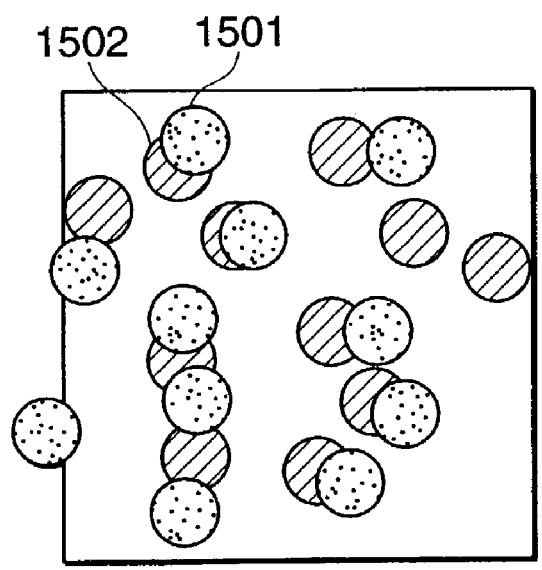
Figure 10A:
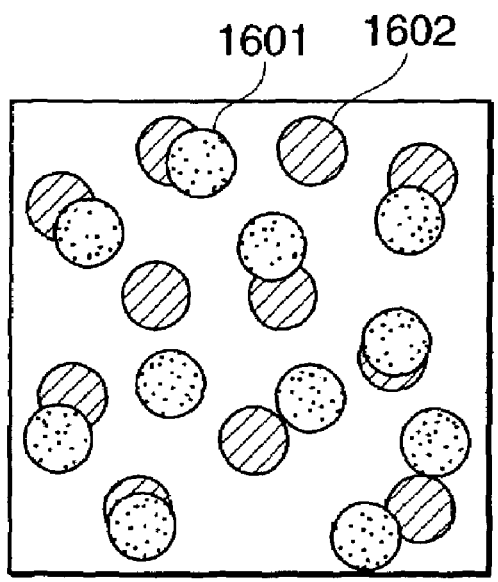
FIGS. 10A and 10B are views showing examples of output results on a printer output sheet outputted from an image processing apparatus according to the third embodiment in the case where individual color independent error diffusion is performed on a half-tone part by the image processing apparatus according to the third embodiment.
Figure 10B:
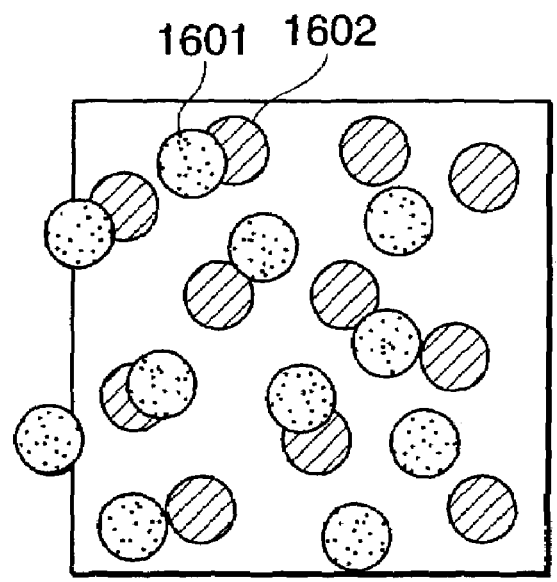

A description will now be given of a third embodiment of the present invention with reference to FIGS. 8A to 11C. FIGS. 8A and 8B are views showing examples of results on a printer output sheet in the case where two-color simultaneous error diffusion is performed on a highlighted part by an image processing apparatus according to the third embodiment. FIGS. 9A and 9B are views showing examples of results on a printer output sheet in the case where two-color simultaneous error diffusion is performed on a half-tone part by the image processing apparatus according to the third embodiment. FIGS. 10A and 10B are views showing examples of results on a printer output sheet in the case where individual color independent error diffusion is performed on a half-tone part by the image processing apparatus according to the third embodiment. FIGS. 11A to 11C are views showing the relationship between threshold tables, output quantized value tables, and error diffusion tables used in the error diffusion performed by the image processing apparatus according to the third embodiment. The construction of the present embodiment is identical with that of the first embodiment, and thus description thereof is omitted.

In the above described second embodiment, the reference table is selected according to the result of comparison between the total density value and the corresponding threshold, but there is the problem that more tables are required as the quantization bit rate increases. To solve this problem, the present embodiment provides a method that prevents an increase in the number of tables and reduces the overlapping of a plurality of colors even if the quantization bit rate is increased in error diffusion performed on multi-valued data such as ternary or more data composed of two or more colors.

The error diffusion method employed in the present embodiment is intended mainly to reduce the overlapping of a plurality of inks especially in a highlighted part without reducing the overlapping of inks in a half-tone part, to thereby form an appropriate image even if the positions of inks on a sheet have shifted.

FIG. 8A illustrates an example of results on a printer output sheet in the case where two-color simultaneous error diffusion is performed on a highlighted part. In FIG. 8A, dotted circles (dots) 1401 represent cyan ink dots, and hatched circles (dots) 1402 represent magenta ink dots. In the example shown in FIG. 8A, the image is considered as a preferable image since the cyan ink dots 1401 and the magenta ink dots 1402 are evenly distributed on the sheet substantially. FIG. 8B shows an example in which the positions of all of the cyan ink dots have shifted to the left side by substantially the same amount as the ink diameter. Although the arrangement of the cyan ink dots 1401 and the magenta ink dots 1402 on the sheet differs only slightly from that of FIG. 8A, there is no variation in area factor, i.e., the ratio of coverage of inks on the sheet.

FIG. 9A illustrates an example of results on a printer output sheet in the case where two-color simultaneous error diffusion is performed on a half-tone part. In FIG. 9A, dotted circles (dots) 1501 represent cyan ink dots, and hatched circles (dots) 1502 represent magenta ink dots. In this example, the image is considered as an appropriate image since the cyan ink dots 1501 and the magenta ink dots 1502 are substantially evenly distributed on the sheet. FIG. 9B shows an example in which the positions of all of the cyan ink dots have shifted to the left side by substantially the same amount as the ink diameter. In this case, as is distinct from the shift from the positions in FIG. 8A to the positions in FIG. 8B, the cyan ink dots 1501 and the magenta ink dots 1502 overlap each other at a high ratio. Thus, the area factor as the ratio of coverage of inks on the sheet has greatly varied.

On the contrary, FIG. 10A illustrates an example of results on a printer output sheet in the case where individual color independent error diffusion is performed on a half-tone part. In FIG. 10A, dotted circles (dots) 1601 represent cyan ink dots, and hatched circles (dots) 1602 represent magenta ink dots. FIG. 10B shows the case where the entire group of the cyan ink dots has shifted to the left side by substantially the same amount as the ink diameter. In the case of the individual color independent error diffusion in which cyan and magenta are not correlated with each other, there is no great variation in area factor between the output example shown in FIG. 10A and the output example shown in 10B.

A variation in the area factor appears to be great to human eyes. Further, examples of factors causing the shift of cyan ink dots and magenta ink dots in a main scanning direction include vibration of a carriage motor, a warp of a medium as an output object, the expansion/aging change of the medium resulting from absorption of inks by the medium as an output object, and a difference in discharge speed between color inks in the main scanning direction, and examples of factors causing the shift of cyan ink dots and magenta ink dots in a sub-scanning direction include uneven sheet feeding resulting from deviation of sheet feed rollers and gears, and instability of behaviors of the upper and lower ends of a sheet in the sub-scanning direction.

Many of these factors depend on the position of a medium as an output object. Thus, in the case where the area factor varies according to the position of the medium, the variation is likely to appear as great image unevenness to human eyes.

A description will now be given of the error diffusion method according to the present embodiment.

$Ct = C + Cerr$ $Mt = M + Merr$

```
if(Ct<=Threshold_table[Mt])
  [Cout=Out_TableA(Ct), Diffuse Error_TableA[Ct]]
else [Cout=Out_TableB(Ct), Diffuse Error_TableB[Ct]]
if(Mt<=Threshold_table[Ct]
  [Mout=Out_TableC(Mt), Diffuse Error_TableC[Ct]]
else [Mout=Out_TableD(Mt), Diffuse Error_TableD[Ct]]
```

Referring next to FIGS. 11A to 11C, a description will now be given of the relationship between threshold tables, output quantized value tables, and error diffusing tables, which are used in the present embodiment. FIG. 11A is a view showing the relationship between the total density value Ct as the sum of an input density value and an accumulated error value of a cyan component, the total density value M as the sum of an input density value and an accumulated error value of a magenta component, and output values of the cyan and magenta components, FIG. 11B is a view showing an output quantized value table Out_TableA and an error diffusion table Error_TableA, and FIG. 11C shows an output quantized value table Out_TableB and an error diffusion table Error_TableB.

A thick curved line 1002 in FIG. 11A represents cyan binarization thresholds, and a horizontal line 1001 in FIGS. 11A to 11C represents the total density value Ct of a cyan component. At two points, the line 1001 representing the total density value Ct intersects the curved line 1002 representing the thresholds. The output quantized value is 1 inside a hatched region 1003 (Mt1≦Mt<Mt2), whereas the output quantized value is 0 outside the region 1003 (Mt<Mt1, Mt2 ≦Mt).

As shown in FIG. 11B, the output quantized value table Out_TableA (CoutA) is correlated with the diffusion error table Error_TableA, and the diffusion error table Error_TableA contains errors (ErrorA) based on the quantized values CoutA and diffusion values (A0, A1, A2, and A3) based on the errors (ErrorA). Similarly, as shown in FIG. 11C, the output quantized value table Out_TableB (CoutB) and the diffusion error table Error_TableB are correlated with each other.

In the steps S802 and S807 shown in FIG. 6, if the density value is greater than the threshold, the table shown in FIG. 11C is used, and if the density value is greater than the threshold, the table shown in FIG. 11B is used.

Tables 9 to 12 show detailed examples of the tables used for quantization of cyan components. Description of detailed examples of the tables used for quantization of magenta components is omitted.

TABLE 9

| Ct | CoutA | ErrorA | ExW0A | ExW1A | ExW2A | ExW3A | Ct | CoutB | ErrorB | ExW0B | ExW1B | ExW2B | ExW3B |
|---|---|---|---|---|---|---|---|---|---|---|---|---|---|
| 0 | 0 | 0 | 0.00 | 0.00 | 0.00 | 0.00 | 0 | 1 | −64 | −28.00 | −20.00 | −12.00 | −4.00 |
| 1 | 0 | 1 | 0.44 | 0.31 | 0.19 | 0.06 | 1 | 1 | −63 | −27.56 | −19.69 | −11.81 | −3.94 |
| 2 | 0 | 2 | 0.88 | 0.63 | 0.38 | 0.13 | 2 | 1 | −62 | −27.13 | −19.38 | −11.63 | −3.88 |
| 3 | 0 | 3 | 1.31 | 0.94 | 0.56 | 0.19 | 3 | 1 | −61 | −26.69 | −19.06 | −11.44 | −3.81 |
| 4 | 0 | 4 | 1.75 | 1.25 | 0.75 | 0.25 | 4 | 1 | −60 | −26.25 | −18.75 | −11.25 | −3.75 |
| 5 | 0 | 5 | 2.19 | 1.56 | 0.94 | 0.31 | 5 | 1 | −59 | −25.81 | −18.44 | −11.06 | −3.69 |
| 6 | 0 | 6 | 2.63 | 1.88 | 1.13 | 0.38 | 6 | 1 | −58 | −25.38 | −18.13 | −10.88 | −3.63 |
| 7 | 0 | 7 | 3.06 | 2.19 | 1.31 | 0.44 | 7 | 1 | −57 | −24.94 | −17.81 | −10.69 | −3.56 |
| 8 | 0 | 8 | 3.50 | 2.50 | 1.50 | 0.50 | 8 | 1 | −56 | −24.50 | −17.50 | −10.50 | −3.50 |
| 9 | 0 | 9 | 3.94 | 2.81 | 1.69 | 0.56 | 9 | 1 | −55 | −24.06 | −17.19 | −10.31 | −3.44 |
| 10 | 0 | 10 | 4.38 | 3.13 | 1.88 | 0.63 | 10 | 1 | −54 | −23.63 | −16.88 | −10.13 | −3.38 |
| 11 | 0 | 11 | 4.81 | 3.44 | 2.06 | 0.69 | 11 | 1 | −53 | −23.19 | −16.56 | −9.94 | −3.31 |
| 12 | 0 | 12 | 5.25 | 3.75 | 2.25 | 0.75 | 12 | 1 | −52 | −22.75 | −16.25 | −9.75 | −3.25 |
| 13 | 0 | 13 | 5.69 | 4.06 | 2.44 | 0.81 | 13 | 1 | −51 | −22.31 | −15.94 | −9.56 | −3.19 |
| 14 | 0 | 14 | 6.13 | 4.38 | 2.63 | 0.88 | 14 | 1 | −50 | −21.88 | −15.63 | −9.38 | −3.13 |
| 15 | 0 | 15 | 6.56 | 4.69 | 2.81 | 0.94 | 15 | 1 | −49 | −21.44 | −15.31 | −9.19 | −3.06 |
| 16 | 0 | 16 | 7.00 | 5.00 | 3.00 | 1.00 | 16 | 1 | −48 | −21.00 | −15.00 | −9.00 | −3.00 |
| 17 | 0 | 17 | 7.44 | 5.31 | 3.19 | 1.06 | 17 | 1 | −47 | −20.56 | −14.69 | −8.81 | −2.94 |
| 18 | 0 | 18 | 7.88 | 5.63 | 3.38 | 1.13 | 18 | 1 | −46 | −20.13 | −14.38 | −8.63 | −2.88 |
| 19 | 0 | 19 | 8.31 | 5.94 | 3.56 | 1.19 | 19 | 1 | −45 | −19.69 | −14.06 | −8.44 | −2.81 |
| 20 | 0 | 20 | 8.75 | 6.25 | 3.75 | 1.25 | 20 | 1 | −44 | −19.25 | −13.75 | −8.25 | −2.75 |
| 21 | 0 | 21 | 9.19 | 6.56 | 3.94 | 1.31 | 21 | 1 | −43 | −18.81 | −13.44 | −8.06 | −2.69 |
| 22 | 0 | 22 | 9.63 | 6.88 | 4.13 | 1.38 | 22 | 1 | −42 | −18.38 | −13.13 | −7.88 | −2.63 |
| 23 | 0 | 23 | 10.06 | 7.19 | 4.31 | 1.44 | 23 | 1 | −41 | −17.94 | −12.81 | −7.69 | −2.56 |
| 24 | 0 | 24 | 10.50 | 7.50 | 4.50 | 1.50 | 24 | 1 | −40 | −17.50 | −12.50 | −7.50 | −2.50 |
| 25 | 0 | 25 | 10.94 | 7.81 | 4.69 | 1.56 | 25 | 1 | −39 | −17.06 | −12.19 | −7.31 | −2.44 |
| 26 | 0 | 26 | 11.38 | 8.13 | 4.88 | 1.63 | 26 | 1 | −38 | −16.63 | −11.88 | −7.13 | −2.38 |
| 27 | 0 | 27 | 11.81 | 8.44 | 5.06 | 1.69 | 27 | 1 | −37 | −16.19 | −11.56 | −6.94 | −2.31 |
| 28 | 0 | 28 | 12.25 | 8.75 | 5.25 | 1.75 | 28 | 1 | −36 | −15.75 | −11.25 | −6.75 | −2.25 |
| 29 | 0 | 29 | 12.69 | 9.06 | 5.44 | 1.81 | 29 | 1 | −35 | −15.31 | −10.94 | −6.56 | −2.19 |
| 30 | 0 | 30 | 13.13 | 9.38 | 5.63 | 1.88 | 30 | 1 | −34 | −14.88 | −10.63 | −6.38 | −2.13 |
| 31 | 0 | 31 | 13.56 | 9.69 | 5.81 | 1.94 | 31 | 1 | −33 | −14.44 | −10.31 | −6.19 | −2.06 |
| 32 | 0 | 32 | 14.00 | 10.00 | 6.00 | 2.00 | 32 | 1 | −32 | −14.00 | −10.00 | −6.00 | −2.00 |
| 33 | 0 | 33 | 14.44 | 10.31 | 6.19 | 2.06 | 33 | 1 | −31 | −13.56 | −9.69 | −5.81 | −1.94 |
| 34 | 0 | 34 | 14.88 | 10.63 | 6.38 | 2.13 | 34 | 1 | −30 | −13.13 | −9.38 | −5.63 | −1.88 |
| 35 | 0 | 35 | 15.31 | 10.94 | 6.56 | 2.19 | 35 | 1 | −29 | −12.69 | −9.06 | −5.44 | −1.81 |
| 36 | 0 | 36 | 15.75 | 11.25 | 6.75 | 2.25 | 36 | 1 | −28 | −12.25 | −8.75 | −5.25 | −1.75 |
| 37 | 0 | 37 | 16.19 | 11.56 | 6.94 | 2.31 | 37 | 1 | −27 | −11.81 | −8.44 | −5.06 | −1.69 |
| 38 | 0 | 38 | 16.63 | 11.88 | 7.13 | 2.38 | 38 | 1 | −26 | −11.38 | −8.13 | −4.88 | −1.63 |
| 39 | 0 | 39 | 17.06 | 12.19 | 7.31 | 2.44 | 39 | 1 | −25 | −10.94 | −7.81 | −4.69 | −1.56 |
| 40 | 0 | 40 | 17.50 | 12.50 | 7.50 | 2.50 | 40 | 1 | −24 | −10.50 | −7.50 | −4.50 | −1.50 |
| 41 | 0 | 41 | 17.94 | 12.81 | 7.69 | 2.56 | 41 | 1 | −23 | −10.06 | −7.19 | −4.31 | −1.44 |
| 42 | 0 | 42 | 18.38 | 13.13 | 7.88 | 2.63 | 42 | 1 | −22 | −9.63 | −6.88 | −4.13 | −1.38 |
| 43 | 0 | 43 | 18.81 | 13.44 | 8.06 | 2.69 | 43 | 1 | −21 | −9.19 | −6.56 | −3.94 | −1.31 |
| 44 | 0 | 44 | 19.25 | 13.75 | 8.25 | 2.75 | 44 | 1 | −20 | −8.75 | −6.25 | −3.75 | −1.25 |
| 45 | 0 | 45 | 19.69 | 14.06 | 8.44 | 2.81 | 45 | 1 | −19 | −8.31 | −5.94 | −3.56 | −1.19 |
| 46 | 0 | 46 | 20.13 | 14.38 | 8.63 | 2.88 | 46 | 1 | −18 | −7.88 | −5.63 | −3.38 | −1.13 |

TABLE 9-continued

| Ct | CoutA | ErrorA | ExW0A | ExW1A | ExW2A | ExW3A | Ct | CoutB | ErrorB | ExW0B | ExW1B | ExW2B | ExW3B |
|---|---|---|---|---|---|---|---|---|---|---|---|---|---|
| 47 | 0 | 47 | 20.56 | 14.69 | 8.81 | 2.94 | 47 | 1 | −17 | −7.44 | −5.31 | −3.19 | −1.06 |
| 48 | 0 | 48 | 21.00 | 15.00 | 9.00 | 3.00 | 48 | 1 | −16 | −7.00 | −5.00 | −3.00 | −1.00 |
| 49 | 0 | 49 | 21.44 | 15.31 | 9.19 | 3.06 | 49 | 1 | −15 | −6.56 | −4.69 | −2.81 | −0.94 |
| 50 | 0 | 50 | 21.88 | 15.63 | 9.38 | 3.13 | 50 | 1 | −14 | −6.13 | −4.38 | −2.63 | −0.88 |
| 51 | 0 | 51 | 22.31 | 15.94 | 9.56 | 3.19 | 51 | 1 | −13 | −5.69 | −4.06 | −2.44 | −0.81 |
| 52 | 0 | 52 | 22.75 | 16.25 | 9.75 | 3.25 | 52 | 1 | −12 | −5.25 | −3.75 | −2.25 | −0.75 |
| 53 | 0 | 53 | 23.19 | 16.56 | 9.94 | 3.31 | 53 | 1 | −11 | −4.81 | −3.44 | −2.06 | −0.69 |
| 54 | 0 | 54 | 23.63 | 16.88 | 10.13 | 3.38 | 54 | 1 | −10 | −4.38 | −3.13 | −1.88 | −0.63 |
| 55 | 0 | 55 | 24.06 | 17.19 | 10.31 | 3.44 | 55 | 1 | −9 | −3.94 | −2.81 | −1.69 | −0.56 |
| 56 | 0 | 56 | 24.50 | 17.50 | 10.50 | 3.50 | 56 | 1 | −8 | −3.50 | −2.50 | −1.50 | −0.50 |
| 57 | 0 | 57 | 24.94 | 17.81 | 10.69 | 3.56 | 57 | 1 | −7 | −3.06 | −2.19 | −1.31 | −0.44 |
| 58 | 0 | 58 | 25.38 | 18.13 | 10.88 | 3.63 | 58 | 1 | −6 | −2.63 | −1.88 | −1.13 | −0.38 |
| 59 | 0 | 59 | 25.81 | 18.44 | 11.06 | 3.69 | 59 | 1 | −5 | −2.19 | −1.56 | −0.94 | −0.31 |
| 60 | 0 | 60 | 26.25 | 18.75 | 11.25 | 3.75 | 60 | 1 | −4 | −1.75 | −1.25 | −0.75 | −0.25 |
| 61 | 0 | 61 | 26.69 | 19.06 | 11.44 | 3.81 | 61 | 1 | −3 | −1.31 | −0.94 | −0.56 | −0.19 |
| 62 | 0 | 62 | 27.13 | 19.38 | 11.63 | 3.88 | 62 | 1 | −2 | −0.88 | −0.63 | −0.38 | −0.13 |
| 63 | 0 | 63 | 27.56 | 19.69 | 11.81 | 3.94 | 63 | 1 | −1 | −0.44 | −0.31 | −0.19 | −0.06 |

TABLE 10

| Ct | CoutA | ErrorA | ExW0A | ExW1A | ExW2A | ExW3A | Ct | CoutB | ErrorB | ExW0B | ExW1B | ExW2B | ExW3B |
|---|---|---|---|---|---|---|---|---|---|---|---|---|---|
| 64 | 0 | 64 | 28.00 | 20.00 | 12.00 | 4.00 | 64 | 1 | 0 | 0.00 | 0.00 | 0.00 | 0.00 |
| 65 | 0 | 65 | 28.44 | 20.31 | 12.19 | 4.06 | 65 | 1 | 1 | 0.44 | 0.31 | 0.19 | 0.06 |
| 66 | 0 | 66 | 28.88 | 20.63 | 12.38 | 4.13 | 66 | 1 | 2 | 0.88 | 0.63 | 0.38 | 0.13 |
| 67 | 0 | 67 | 29.31 | 20.94 | 12.56 | 4.19 | 67 | 1 | 3 | 1.31 | 0.94 | 0.56 | 0.19 |
| 68 | 0 | 68 | 29.75 | 21.25 | 12.75 | 4.25 | 68 | 1 | 4 | 1.75 | 1.25 | 0.75 | 0.25 |
| 69 | 0 | 69 | 30.19 | 21.56 | 12.94 | 4.31 | 69 | 1 | 5 | 2.19 | 1.56 | 0.94 | 0.31 |
| 70 | 0 | 70 | 30.63 | 21.88 | 13.13 | 4.38 | 70 | 1 | 6 | 2.63 | 1.88 | 1.13 | 0.38 |
| 71 | 0 | 71 | 31.06 | 22.19 | 13.31 | 4.44 | 71 | 1 | 7 | 3.06 | 2.19 | 1.31 | 0.44 |
| 72 | 0 | 72 | 31.50 | 22.50 | 13.50 | 4.50 | 72 | 1 | 8 | 3.50 | 2.50 | 1.50 | 0.50 |
| 73 | 0 | 73 | 31.94 | 22.81 | 13.69 | 4.56 | 73 | 1 | 9 | 3.94 | 2.81 | 1.69 | 0.56 |
| 74 | 0 | 74 | 32.38 | 23.13 | 13.88 | 4.63 | 74 | 1 | 10 | 4.38 | 3.13 | 1.88 | 0.63 |
| 75 | 0 | 75 | 32.81 | 23.44 | 14.06 | 4.69 | 75 | 1 | 11 | 4.81 | 3.44 | 2.06 | 0.69 |
| 76 | 0 | 76 | 33.25 | 23.75 | 14.25 | 4.75 | 76 | 1 | 12 | 5.25 | 3.75 | 2.25 | 0.75 |
| 77 | 0 | 77 | 33.69 | 24.06 | 14.44 | 4.81 | 77 | 1 | 13 | 5.69 | 4.06 | 2.44 | 0.81 |
| 78 | 0 | 78 | 34.13 | 24.38 | 14.63 | 4.88 | 78 | 1 | 14 | 6.13 | 4.38 | 2.63 | 0.88 |
| 79 | 0 | 79 | 34.56 | 24.69 | 14.81 | 4.94 | 79 | 1 | 15 | 6.56 | 4.69 | 2.81 | 0.94 |
| 80 | 0 | 80 | 35.00 | 25.00 | 15.00 | 5.00 | 80 | 1 | 16 | 7.00 | 5.00 | 3.00 | 1.00 |
| 81 | 0 | 81 | 35.44 | 25.31 | 15.19 | 5.06 | 81 | 1 | 17 | 7.44 | 5.31 | 3.19 | 1.06 |
| 82 | 0 | 82 | 35.88 | 25.63 | 15.38 | 5.13 | 82 | 1 | 18 | 7.88 | 5.63 | 3.38 | 1.13 |
| 83 | 0 | 83 | 36.31 | 25.94 | 15.56 | 5.19 | 83 | 1 | 19 | 8.31 | 5.94 | 3.56 | 1.19 |
| 84 | 0 | 84 | 36.75 | 26.25 | 15.75 | 5.25 | 84 | 1 | 20 | 8.75 | 6.25 | 3.75 | 1.25 |
| 85 | 0 | 85 | 37.19 | 26.56 | 15.94 | 5.31 | 85 | 1 | 21 | 9.19 | 6.56 | 3.94 | 1.31 |
| 86 | 0 | 86 | 37.63 | 26.88 | 16.13 | 5.38 | 86 | 1 | 22 | 9.63 | 6.88 | 4.13 | 1.38 |
| 87 | 0 | 87 | 38.06 | 27.19 | 16.31 | 5.44 | 87 | 1 | 23 | 10.06 | 7.19 | 4.31 | 1.44 |
| 88 | 0 | 88 | 38.50 | 27.50 | 16.50 | 5.50 | 88 | 1 | 24 | 10.50 | 7.50 | 4.50 | 1.50 |
| 89 | 0 | 89 | 38.94 | 27.81 | 16.69 | 5.56 | 89 | 1 | 25 | 10.94 | 7.81 | 4.69 | 1.56 |
| 90 | 0 | 90 | 39.38 | 28.13 | 16.88 | 5.63 | 90 | 1 | 26 | 11.38 | 8.13 | 4.88 | 1.63 |
| 91 | 0 | 91 | 39.81 | 28.44 | 17.06 | 5.69 | 91 | 1 | 27 | 11.81 | 8.44 | 5.06 | 1.69 |
| 92 | 0 | 92 | 40.25 | 28.75 | 17.25 | 5.75 | 92 | 1 | 28 | 12.25 | 8.75 | 5.25 | 1.75 |
| 93 | 0 | 93 | 40.69 | 29.06 | 17.44 | 5.81 | 93 | 1 | 29 | 12.69 | 9.06 | 5.44 | 1.81 |
| 94 | 0 | 94 | 41.13 | 29.38 | 17.63 | 5.88 | 94 | 1 | 30 | 13.13 | 9.38 | 5.63 | 1.88 |
| 95 | 0 | 95 | 41.56 | 29.69 | 17.81 | 5.94 | 95 | 1 | 31 | 13.56 | 9.69 | 5.81 | 1.94 |
| 96 | 0 | 96 | 42.00 | 30.00 | 18.00 | 6.00 | 96 | 2 | −32 | −14.00 | −10.00 | −6.00 | −2.00 |
| 97 | 0 | 97 | 42.44 | 30.31 | 18.19 | 6.06 | 97 | 2 | −31 | −13.56 | −9.69 | −5.81 | −1.94 |
| 98 | 0 | 98 | 42.88 | 30.63 | 18.38 | 6.13 | 98 | 2 | −30 | −13.13 | −9.38 | −5.63 | −1.88 |
| 99 | 0 | 99 | 43.31 | 30.94 | 18.56 | 6.19 | 99 | 2 | −29 | −12.69 | −9.06 | −5.44 | −1.81 |
| 100 | 0 | 100 | 43.75 | 31.25 | 18.75 | 6.25 | 100 | 2 | −28 | −12.25 | −8.75 | −5.25 | −1.75 |
| 101 | 0 | 101 | 44.19 | 31.56 | 18.94 | 6.31 | 101 | 2 | −27 | −11.81 | −8.44 | −5.06 | −1.69 |
| 102 | 0 | 102 | 44.63 | 31.88 | 19.13 | 6.38 | 102 | 2 | −26 | −11.38 | −8.13 | −4.88 | −1.63 |
| 103 | 0 | 103 | 45.06 | 32.19 | 19.13 | 6.44 | 103 | 2 | −25 | −10.94 | −7.81 | −4.69 | −1.56 |
| 104 | 0 | 104 | 45.50 | 32.50 | 19.50 | 6.50 | 104 | 2 | −24 | −10.50 | −7.50 | −4.50 | −1.50 |
| 105 | 0 | 105 | 45.94 | 32.81 | 19.69 | 6.56 | 105 | 2 | −23 | −10.06 | −7.19 | −4.31 | −1.44 |
| 106 | 0 | 106 | 46.38 | 33.13 | 19.88 | 6.63 | 106 | 2 | −22 | −9.63 | −6.88 | −4.13 | −1.38 |
| 107 | 0 | 107 | 46.81 | 33.44 | 20.06 | 6.69 | 107 | 2 | −21 | −9.19 | −6.56 | −3.94 | −1.31 |
| 108 | 0 | 108 | 47.25 | 33.75 | 20.25 | 6.75 | 108 | 2 | −20 | −8.75 | −6.25 | −3.75 | −1.25 |
| 109 | 0 | 109 | 47.69 | 34.06 | 20.44 | 6.81 | 109 | 2 | −19 | −8.31 | −5.94 | −3.56 | −1.19 |
| 110 | 0 | 110 | 48.13 | 34.38 | 20.63 | 6.88 | 110 | 2 | −18 | −7.88 | −5.63 | −3.38 | −1.13 |
| 111 | 0 | 111 | 48.56 | 34.69 | 20.81 | 6.94 | 111 | 2 | −17 | −7.44 | −5.31 | −3.19 | −1.06 |
| 112 | 0 | 112 | 49.00 | 35.00 | 21.00 | 7.00 | 112 | 2 | −16 | −7.00 | −5.00 | −3.00 | −1.00 |
| 113 | 0 | 113 | 49.44 | 35.31 | 21.19 | 7.06 | 113 | 2 | −15 | −6.56 | −4.69 | −2.81 | −0.94 |
| 114 | 0 | 114 | 49.88 | 35.63 | 21.38 | 7.13 | 114 | 2 | −14 | −6.13 | −4.38 | −2.63 | −0.88 |
| 115 | 0 | 115 | 50.31 | 35.94 | 21.56 | 7.19 | 115 | 2 | −13 | −5.69 | −4.06 | −2.44 | −0.81 |

TABLE 10-continued

| Ct | CoutA | ErrorA | ExW0A | ExW1A | ExW2A | ExW3A | Ct | CoutB | ErrorB | ExW0B | ExW1B | ExW2B | ExW3B |
|---|---|---|---|---|---|---|---|---|---|---|---|---|---|
| 116 | 0 | 116 | 50.75 | 36.25 | 21.75 | 7.25 | 116 | 2 | −12 | −5.25 | −3.75 | −2.25 | −0.75 |
| 117 | 0 | 117 | 51.19 | 36.56 | 21.94 | 7.31 | 117 | 2 | −11 | −4.81 | −3.44 | −2.06 | −0.69 |
| 118 | 0 | 118 | 51.63 | 36.88 | 22.13 | 7.38 | 118 | 2 | −10 | −4.38 | −3.13 | −1.88 | −0.63 |
| 119 | 0 | 119 | 52.06 | 37.19 | 22.31 | 7.44 | 119 | 2 | −9 | −3.94 | −2.81 | −1.69 | −0.56 |
| 120 | 0 | 120 | 52.50 | 37.50 | 22.50 | 7.50 | 120 | 2 | −8 | −3.50 | −2.50 | −1.50 | −0.50 |
| 121 | 0 | 121 | 52.94 | 37.81 | 22.69 | 7.56 | 121 | 2 | −7 | −3.06 | −2.19 | −1.31 | −0.44 |
| 122 | 0 | 122 | 53.38 | 38.13 | 22.88 | 7.63 | 122 | 2 | −6 | −2.63 | −1.88 | −1.13 | −0.38 |
| 123 | 0 | 123 | 53.81 | 38.44 | 23.06 | 7.69 | 123 | 2 | −5 | −2.19 | −1.56 | −0.94 | −0.31 |
| 124 | 0 | 124 | 54.25 | 38.75 | 23.25 | 7.75 | 124 | 2 | −4 | −1.75 | −1.25 | −0.75 | −0.25 |
| 125 | 0 | 125 | 54.69 | 39.06 | 23.44 | 7.81 | 125 | 2 | −3 | −1.31 | −0.94 | −0.56 | −0.19 |
| 126 | 0 | 126 | 55.13 | 39.38 | 23.63 | 7.88 | 126 | 2 | −2 | −0.88 | −0.63 | −0.38 | −0.13 |
| 127 | 0 | 127 | 55.56 | 39.69 | 23.81 | 7.94 | 127 | 2 | −1 | −0.44 | −0.31 | −0.19 | −0.06 |

TABLE 11

| Ct | CoutA | ErrorA | ExW0A | ExW1A | ExW2A | ExW3A | Ct | CoutB | ErrorB | ExW0B | ExW1B | ExW2B | ExW3B |
|---|---|---|---|---|---|---|---|---|---|---|---|---|---|
| 128 | 0 | 128 | 56.00 | 40.00 | 24.00 | 8.00 | 128 | 2 | 0 | 0.00 | 0.00 | 0.00 | 0.00 |
| 129 | 0 | 129 | 56.44 | 40.31 | 24.19 | 8.06 | 129 | 2 | 1 | 0.44 | 0.31 | 0.19 | 0.06 |
| 130 | 0 | 130 | 56.88 | 40.63 | 24.38 | 8.13 | 130 | 2 | 2 | 0.88 | 0.63 | 0.38 | 0.13 |
| 131 | 0 | 131 | 57.31 | 40.94 | 24.56 | 8.19 | 131 | 2 | 3 | 1.31 | 0.94 | 0.56 | 0.19 |
| 132 | 0 | 132 | 57.75 | 41.25 | 24.75 | 8.25 | 132 | 2 | 4 | 1.75 | 1.25 | 0.75 | 0.25 |
| 133 | 0 | 133 | 58.19 | 41.56 | 24.94 | 8.31 | 133 | 2 | 5 | 2.19 | 1.56 | 0.94 | 0.31 |
| 134 | 0 | 134 | 58.63 | 41.88 | 25.13 | 8.38 | 134 | 2 | 6 | 2.63 | 1.88 | 1.13 | 0.38 |
| 135 | 0 | 135 | 59.06 | 42.19 | 25.31 | 8.44 | 135 | 2 | 7 | 3.06 | 2.19 | 1.31 | 0.44 |
| 136 | 0 | 136 | 59.50 | 42.50 | 25.50 | 8.50 | 136 | 2 | 8 | 3.50 | 2.50 | 1.50 | 0.50 |
| 137 | 0 | 137 | 59.94 | 42.81 | 25.69 | 8.56 | 137 | 2 | 9 | 3.94 | 2.81 | 1.69 | 0.56 |
| 138 | 0 | 138 | 60.38 | 43.13 | 25.88 | 8.63 | 138 | 2 | 10 | 4.38 | 3.13 | 1.88 | 0.63 |
| 139 | 0 | 139 | 60.81 | 43.44 | 26.06 | 8.69 | 139 | 2 | 11 | 4.81 | 3.44 | 2.06 | 0.69 |
| 140 | 0 | 140 | 61.25 | 43.75 | 26.25 | 8.75 | 140 | 2 | 12 | 5.25 | 3.75 | 2.25 | 0.75 |
| 141 | 0 | 141 | 61.69 | 44.06 | 26.44 | 8.81 | 141 | 2 | 13 | 5.69 | 4.06 | 2.44 | 0.81 |
| 142 | 0 | 142 | 62.13 | 44.38 | 26.63 | 8.88 | 142 | 2 | 14 | 6.13 | 4.38 | 2.63 | 0.88 |
| 143 | 0 | 143 | 62.56 | 44.69 | 26.81 | 8.94 | 143 | 2 | 15 | 6.56 | 4.69 | 2.81 | 0.94 |
| 144 | 0 | 144 | 63.00 | 45.00 | 27.00 | 9.00 | 144 | 2 | 16 | 7.00 | 5.00 | 3.00 | 1.00 |
| 145 | 0 | 145 | 63.44 | 45.31 | 27.19 | 9.06 | 145 | 2 | 17 | 7.44 | 5.31 | 3.19 | 1.06 |
| 146 | 0 | 146 | 63.88 | 45.63 | 27.38 | 9.13 | 146 | 2 | 18 | 7.88 | 5.63 | 3.38 | 1.13 |
| 147 | 0 | 147 | 64.31 | 45.94 | 27.56 | 9.19 | 147 | 2 | 19 | 8.31 | 5.94 | 3.56 | 1.19 |
| 148 | 0 | 148 | 64.75 | 46.25 | 27.75 | 9.25 | 148 | 2 | 20 | 8.75 | 6.25 | 3.75 | 1.25 |
| 149 | 0 | 149 | 65.19 | 46.56 | 27.94 | 9.31 | 149 | 2 | 21 | 9.19 | 6.56 | 3.94 | 1.31 |
| 150 | 0 | 150 | 65.63 | 46.88 | 28.13 | 9.38 | 150 | 2 | 22 | 9.63 | 6.88 | 4.13 | 1.38 |
| 151 | 0 | 151 | 66.06 | 47.19 | 28.31 | 9.44 | 151 | 2 | 23 | 10.06 | 7.19 | 4.31 | 1.44 |
| 152 | 0 | 152 | 66.50 | 47.50 | 28.50 | 9.50 | 152 | 2 | 24 | 10.50 | 7.50 | 4.50 | 1.50 |
| 153 | 0 | 153 | 66.94 | 47.81 | 28.69 | 9.56 | 153 | 2 | 25 | 10.94 | 7.81 | 4.69 | 1.56 |
| 154 | 0 | 154 | 67.38 | 48.13 | 28.88 | 9.63 | 154 | 2 | 26 | 11.38 | 8.13 | 4.88 | 1.63 |
| 155 | 0 | 155 | 67.81 | 48.44 | 29.06 | 9.69 | 155 | 2 | 27 | 11.81 | 8.44 | 5.06 | 1.69 |
| 156 | 0 | 156 | 68.25 | 48.75 | 29.25 | 9.75 | 156 | 2 | 28 | 12.25 | 8.75 | 5.25 | 1.75 |
| 157 | 0 | 157 | 68.69 | 49.06 | 29.44 | 9.81 | 157 | 2 | 29 | 12.69 | 9.06 | 5.44 | 1.81 |
| 158 | 0 | 158 | 69.13 | 49.38 | 29.63 | 9.88 | 158 | 2 | 30 | 13.13 | 9.38 | 5.63 | 1.88 |
| 159 | 0 | 159 | 69.56 | 49.69 | 29.81 | 9.94 | 159 | 2 | 31 | 13.56 | 9.69 | 5.81 | 1.94 |
| 160 | 0 | 160 | 70.00 | 50.00 | 30.00 | 10.00 | 160 | 3 | −32 | −14.00 | −10.00 | −6.00 | −2.00 |
| 161 | 0 | 161 | 70.44 | 50.31 | 30.19 | 10.06 | 161 | 3 | −31 | −13.56 | −9.69 | −5.81 | −1.94 |
| 162 | 0 | 162 | 70.88 | 50.63 | 30.38 | 10.13 | 162 | 3 | −30 | −13.13 | −9.38 | −5.63 | −1.88 |
| 163 | 0 | 163 | 71.31 | 50.94 | 30.56 | 10.19 | 163 | 3 | −29 | −12.69 | −9.06 | −5.44 | −1.81 |
| 164 | 0 | 164 | 71.75 | 51.25 | 30.75 | 10.25 | 164 | 3 | −28 | −12.25 | −8.75 | −5.25 | −1.75 |
| 165 | 0 | 165 | 72.19 | 51.56 | 30.94 | 10.31 | 165 | 3 | −27 | −11.81 | −8.44 | −5.06 | −1.69 |
| 166 | 0 | 166 | 72.63 | 51.88 | 31.13 | 10.38 | 166 | 3 | −26 | −11.38 | −8.13 | −4.88 | −1.63 |
| 167 | 0 | 167 | 73.06 | 52.19 | 31.31 | 10.44 | 167 | 3 | −25 | −10.94 | −7.81 | −4.69 | −1.56 |
| 168 | 0 | 168 | 73.50 | 52.50 | 31.50 | 10.50 | 168 | 3 | −24 | −10.50 | −7.50 | −4.50 | −1.50 |
| 169 | 0 | 169 | 73.94 | 52.81 | 31.69 | 10.56 | 169 | 3 | −23 | −10.06 | −7.19 | −4.31 | −1.44 |
| 170 | 0 | 170 | 74.38 | 53.13 | 31.88 | 10.63 | 170 | 3 | −22 | −9.63 | −6.88 | −4.13 | −1.38 |
| 171 | 0 | 171 | 74.81 | 53.44 | 32.06 | 10.69 | 171 | 3 | −21 | −9.19 | −6.56 | −3.94 | −1.31 |
| 172 | 0 | 172 | 75.25 | 53.75 | 32.25 | 10.75 | 172 | 3 | −20 | −8.75 | −6.25 | −3.75 | −1.25 |
| 173 | 0 | 173 | 75.69 | 54.06 | 32.44 | 10.81 | 173 | 3 | −19 | −8.31 | −5.94 | −3.56 | −1.19 |
| 174 | 0 | 174 | 76.13 | 54.38 | 32.63 | 10.88 | 174 | 3 | −18 | −7.88 | −5.63 | −3.38 | −1.13 |
| 175 | 0 | 175 | 76.56 | 54.69 | 32.81 | 10.94 | 175 | 3 | −17 | −7.44 | −5.31 | −3.19 | −1.06 |
| 176 | 0 | 176 | 77.00 | 55.00 | 33.00 | 11.00 | 176 | 3 | −16 | −7.00 | −5.00 | −3.00 | −1.00 |
| 177 | 0 | 177 | 77.44 | 55.31 | 33.19 | 11.06 | 177 | 3 | −15 | −6.56 | −4.69 | −2.81 | −0.94 |
| 178 | 0 | 178 | 77.88 | 55.63 | 33.38 | 11.13 | 178 | 3 | −14 | −6.13 | −4.38 | −2.63 | −0.88 |
| 179 | 0 | 179 | 78.31 | 55.94 | 33.56 | 11.19 | 179 | 3 | −13 | −5.69 | −4.06 | −2.44 | −0.81 |
| 180 | 0 | 180 | 78.75 | 56.25 | 33.75 | 11.25 | 180 | 3 | −12 | −5.25 | −3.75 | −2.25 | −0.75 |
| 181 | 0 | 181 | 79.19 | 56.56 | 33.94 | 11.31 | 181 | 3 | −11 | −4.81 | −3.44 | −2.06 | −0.69 |
| 182 | 0 | 182 | 79.63 | 56.88 | 34.13 | 11.38 | 182 | 3 | −10 | −4.38 | −3.13 | −1.88 | −0.63 |
| 183 | 0 | 183 | 80.06 | 57.19 | 34.31 | 11.44 | 183 | 3 | −9 | −3.94 | −2.81 | −1.69 | −0.56 |
| 184 | 0 | 184 | 80.50 | 57.50 | 34.50 | 11.50 | 184 | 3 | −8 | −3.50 | −2.50 | −1.50 | −0.50 |

TABLE 11-continued

| Ct | CoutA | ErrorA | ExW0A | ExW1A | ExW2A | ExW3A | Ct | CoutB | ErrorB | ExW0B | ExW1B | ExW2B | ExW3B |
|---|---|---|---|---|---|---|---|---|---|---|---|---|---|
| 185 | 0 | 185 | 80.94 | 57.81 | 34.69 | 11.56 | 185 | 3 | −7 | −3.06 | −2.19 | −1.31 | −0.44 |
| 186 | 0 | 186 | 81.38 | 58.13 | 34.88 | 11.63 | 186 | 3 | −6 | −2.63 | −1.88 | −1.13 | −0.38 |
| 187 | 0 | 187 | 81.81 | 58.44 | 35.06 | 11.69 | 187 | 3 | −5 | −2.19 | −1.56 | −0.94 | −0.31 |
| 188 | 0 | 188 | 82.25 | 58.75 | 35.25 | 11.75 | 188 | 3 | −4 | −1.75 | −1.25 | −0.75 | −0.25 |
| 189 | 0 | 189 | 82.69 | 59.06 | 35.44 | 11.81 | 189 | 3 | −3 | −1.31 | −0.94 | −0.56 | −0.19 |
| 190 | 0 | 190 | 83.13 | 59.38 | 35.63 | 11.88 | 190 | 3 | −2 | −0.88 | −0.63 | −0.38 | −0.13 |
| 191 | 0 | 191 | 83.56 | 59.69 | 35.81 | 11.94 | 191 | 3 | −1 | −0.44 | −0.31 | −0.19 | −0.06 |

TABLE 12

| Ct | CoutA | ErrorA | ExW0A | ExW1A | ExW2A | ExW3A | Ct | CoutB | ErrorB | ExW0B | ExW1B | ExW2B | ExW3B |
|---|---|---|---|---|---|---|---|---|---|---|---|---|---|
| 192 | 0 | 192 | 84.00 | 60.00 | 36.00 | 12.00 | 192 | 3 | 0 | 0.00 | 0.00 | 0.00 | 0.00 |
| 193 | 0 | 193 | 84.44 | 60.31 | 36.19 | 12.06 | 193 | 3 | 1 | 0.44 | 0.31 | 0.19 | 0.06 |
| 194 | 0 | 194 | 84.88 | 60.63 | 36.38 | 12.13 | 194 | 3 | 2 | 0.88 | 0.63 | 0.38 | 0.13 |
| 195 | 0 | 195 | 85.31 | 60.94 | 36.56 | 12.19 | 195 | 3 | 3 | 1.31 | 0.94 | 0.56 | 0.19 |
| 196 | 0 | 196 | 85.75 | 61.25 | 36.75 | 12.25 | 196 | 3 | 4 | 1.75 | 1.25 | 0.75 | 0.25 |
| 197 | 0 | 197 | 86.19 | 61.56 | 36.94 | 12.31 | 197 | 3 | 5 | 2.19 | 1.56 | 0.94 | 0.31 |
| 198 | 0 | 198 | 86.63 | 61.88 | 37.13 | 12.38 | 198 | 3 | 6 | 2.63 | 1.88 | 1.13 | 0.38 |
| 199 | 0 | 199 | 87.06 | 62.19 | 37.31 | 12.44 | 199 | 3 | 7 | 3.06 | 2.19 | 1.31 | 0.44 |
| 200 | 0 | 200 | 87.50 | 62.50 | 37.50 | 12.50 | 200 | 3 | 8 | 3.50 | 2.50 | 1.50 | 0.50 |
| 201 | 0 | 201 | 87.94 | 62.81 | 37.69 | 12.56 | 201 | 3 | 9 | 3.94 | 2.81 | 1.69 | 0.56 |
| 202 | 0 | 202 | 88.38 | 63.13 | 37.88 | 12.63 | 202 | 3 | 10 | 4.38 | 3.13 | 1.88 | 0.63 |
| 203 | 0 | 203 | 88.81 | 63.44 | 38.06 | 12.69 | 203 | 3 | 11 | 4.81 | 3.44 | 2.06 | 0.69 |
| 204 | 0 | 204 | 89.25 | 63.75 | 38.25 | 12.75 | 204 | 3 | 12 | 5.25 | 3.75 | 2.25 | 0.75 |
| 205 | 0 | 205 | 89.69 | 64.06 | 38.44 | 12.81 | 205 | 3 | 13 | 5.69 | 4.06 | 2.44 | 0.81 |
| 206 | 0 | 206 | 90.13 | 64.38 | 38.63 | 12.88 | 206 | 3 | 14 | 6.13 | 4.38 | 2.63 | 0.88 |
| 207 | 0 | 207 | 90.56 | 64.69 | 38.81 | 12.94 | 207 | 3 | 15 | 6.56 | 4.69 | 2.81 | 0.94 |
| 208 | 0 | 208 | 91.00 | 65.00 | 39.00 | 13.00 | 208 | 3 | 16 | 7.00 | 5.00 | 3.00 | 1.00 |
| 209 | 0 | 209 | 91.44 | 65.31 | 39.19 | 13.06 | 209 | 3 | 17 | 7.44 | 5.31 | 3.19 | 1.06 |
| 210 | 0 | 210 | 91.88 | 65.63 | 39.38 | 13.13 | 210 | 3 | 18 | 7.88 | 5.63 | 3.38 | 1.13 |
| 211 | 0 | 211 | 92.31 | 65.94 | 39.56 | 13.19 | 211 | 3 | 19 | 8.31 | 5.94 | 3.56 | 1.19 |
| 212 | 0 | 212 | 92.75 | 66.25 | 39.75 | 13.25 | 212 | 3 | 20 | 8.75 | 6.25 | 3.75 | 1.25 |
| 213 | 0 | 213 | 93.19 | 66.56 | 39.94 | 13.31 | 213 | 3 | 21 | 9.19 | 6.56 | 3.94 | 1.31 |
| 214 | 0 | 214 | 93.63 | 66.88 | 40.13 | 13.38 | 214 | 3 | 22 | 9.63 | 6.88 | 4.13 | 1.38 |
| 215 | 0 | 215 | 94.06 | 67.19 | 40.31 | 13.44 | 215 | 3 | 23 | 10.06 | 7.19 | 4.31 | 1.44 |
| 216 | 0 | 216 | 94.50 | 67.50 | 40.50 | 13.50 | 216 | 3 | 24 | 10.50 | 7.50 | 4.50 | 1.50 |
| 217 | 0 | 217 | 94.94 | 67.81 | 40.69 | 13.56 | 217 | 3 | 25 | 10.94 | 7.81 | 4.69 | 1.56 |
| 218 | 0 | 218 | 95.38 | 68.13 | 40.88 | 13.63 | 218 | 3 | 26 | 11.38 | 8.13 | 4.88 | 1.63 |
| 219 | 0 | 219 | 95.81 | 68.44 | 41.06 | 13.69 | 219 | 3 | 27 | 11.81 | 8.44 | 5.06 | 1.69 |
| 220 | 0 | 220 | 96.25 | 68.75 | 41.25 | 13.75 | 220 | 3 | 28 | 12.25 | 8.75 | 5.25 | 1.75 |
| 221 | 0 | 221 | 96.69 | 69.06 | 41.44 | 13.81 | 221 | 3 | 29 | 12.69 | 9.06 | 5.44 | 1.81 |
| 222 | 0 | 222 | 97.13 | 69.38 | 41.63 | 13.88 | 222 | 3 | 30 | 13.13 | 9.38 | 5.63 | 1.88 |
| 223 | 0 | 223 | 97.56 | 69.69 | 41.81 | 13.94 | 223 | 3 | 31 | 13.56 | 9.69 | 5.81 | 1.94 |
| 224 | 0 | 224 | 98.00 | 70.00 | 42.00 | 14.00 | 224 | 4 | −31 | −13.56 | −9.69 | −5.81 | −1.94 |
| 225 | 0 | 225 | 98.44 | 70.31 | 42.19 | 14.06 | 225 | 4 | −30 | −13.13 | −9.38 | −5.63 | −1.88 |
| 226 | 0 | 226 | 98.88 | 70.63 | 42.38 | 14.13 | 226 | 4 | −29 | −12.69 | −9.06 | −5.44 | −1.81 |
| 227 | 0 | 227 | 99.31 | 70.94 | 42.56 | 14.19 | 227 | 4 | −28 | −12.25 | −8.75 | −5.25 | −1.75 |
| 228 | 0 | 228 | 99.75 | 71.25 | 42.75 | 14.25 | 228 | 4 | −27 | −11.81 | −8.44 | −5.06 | −1.69 |
| 229 | 0 | 229 | 100.19 | 71.56 | 42.94 | 14.31 | 229 | 4 | −26 | −11.38 | −8.13 | −4.88 | −1.63 |
| 230 | 0 | 230 | 100.63 | 71.88 | 43.13 | 14.38 | 230 | 4 | −25 | −10.94 | −7.81 | −4.69 | −1.56 |
| 231 | 0 | 231 | 101.06 | 72.19 | 43.31 | 14.44 | 231 | 4 | −24 | −10.50 | −7.50 | −4.50 | −1.50 |
| 232 | 0 | 232 | 101.50 | 72.50 | 43.50 | 14.50 | 232 | 4 | −23 | −10.06 | −7.19 | −4.31 | −1.44 |
| 233 | 0 | 233 | 101.94 | 72.81 | 43.69 | 14.56 | 233 | 4 | −22 | −9.63 | −6.88 | −4.13 | −1.38 |
| 234 | 0 | 234 | 102.38 | 73.13 | 43.88 | 14.63 | 234 | 4 | −21 | −9.19 | −6.56 | −3.94 | −1.31 |
| 235 | 0 | 235 | 102.81 | 73.44 | 44.06 | 14.69 | 235 | 4 | −20 | −8.75 | −6.25 | −3.75 | −1.25 |
| 236 | 0 | 236 | 103.25 | 73.75 | 44.25 | 14.75 | 236 | 4 | −19 | −8.31 | −5.94 | −3.56 | −1.19 |
| 237 | 0 | 237 | 103.69 | 74.06 | 44.44 | 14.81 | 237 | 4 | −18 | −7.88 | −5.63 | −3.38 | −1.13 |
| 238 | 0 | 238 | 104.13 | 74.38 | 44.63 | 14.88 | 238 | 4 | −17 | −7.44 | −5.31 | −3.19 | −1.06 |
| 239 | 0 | 239 | 104.56 | 74.69 | 44.81 | 14.94 | 239 | 4 | −16 | −7.00 | −5.00 | −3.00 | −1.00 |
| 240 | 0 | 240 | 105.00 | 75.00 | 45.00 | 15.00 | 240 | 4 | −15 | −6.56 | −4.69 | −2.81 | −0.94 |
| 241 | 0 | 241 | 105.44 | 75.31 | 45.19 | 15.06 | 241 | 4 | −14 | −6.13 | −4.38 | −2.63 | −0.88 |
| 242 | 0 | 242 | 105.88 | 75.63 | 45.38 | 15.13 | 242 | 4 | −13 | −5.69 | −4.06 | −2.44 | −0.81 |
| 243 | 0 | 243 | 106.31 | 75.94 | 45.56 | 15.19 | 243 | 4 | −12 | −5.25 | −3.75 | −2.25 | −0.75 |
| 244 | 0 | 244 | 106.75 | 76.25 | 45.75 | 15.25 | 244 | 4 | −11 | −4.81 | −3.44 | −2.06 | −0.69 |
| 245 | 0 | 245 | 107.19 | 76.56 | 45.94 | 15.31 | 245 | 4 | −10 | −4.38 | −3.13 | −1.88 | −0.63 |
| 246 | 0 | 246 | 107.63 | 76.88 | 46.13 | 15.38 | 246 | 4 | −9 | −3.94 | −2.81 | −1.69 | −0.56 |
| 247 | 0 | 247 | 108.06 | 77.19 | 46.31 | 15.44 | 247 | 4 | −8 | −3.50 | −2.50 | −1.50 | −0.50 |
| 248 | 0 | 248 | 108.50 | 77.50 | 46.50 | 15.50 | 248 | 4 | −7 | −3.06 | −2.19 | −1.31 | −0.44 |
| 249 | 0 | 249 | 108.94 | 77.81 | 46.69 | 15.56 | 249 | 4 | −6 | −2.63 | −1.88 | −1.13 | −0.38 |
| 250 | 0 | 250 | 109.38 | 78.13 | 46.88 | 15.63 | 250 | 4 | −5 | −2.19 | −1.56 | −0.94 | −0.31 |
| 251 | 0 | 251 | 109.81 | 78.44 | 47.06 | 15.69 | 251 | 4 | −4 | −1.75 | −1.25 | −0.75 | −0.25 |
| 252 | 0 | 252 | 110.25 | 78.75 | 47.25 | 15.75 | 252 | 4 | −3 | −1.31 | −0.94 | −0.56 | −0.19 |
| 253 | 0 | 253 | 110.69 | 79.06 | 47.44 | 15.81 | 253 | 4 | −2 | −0.88 | −0.63 | −0.38 | −0.13 |

TABLE 12-continued

| Ct | CoutA | ErrorA | ExW0A | ExW1A | ExW2A | ExW3A | Ct | CoutB | ErrorB | ExW0B | ExW1B | ExW2B | ExW3B |
|---|---|---|---|---|---|---|---|---|---|---|---|---|---|
| 254 | 0 | 254 | 111.13 | 79.38 | 47.63 | 15.88 | 254 | 4 | −1 | −0.44 | −0.31 | −0.19 | −0.06 |
| 255 | 0 | 255 | 111.56 | 79.69 | 47.81 | 15.94 | 255 | 4 | 0 | 0.00 | 0.00 | 0.00 | 0.00 |

A detailed description will now be given of the tables shown in Tables 9-12.

In the tables used in the case where the total density value Ct is not greater than the threshold (the left sides in Tables 9-12), all of values represented by the quantization tables Out_TableA (CoutA in Tables 9-12) are 0 since the output quantized value is 0 if the total density value Ct is not greater than the threshold. Thus, values (ExW0A, ExW1A, ExW2A, and ExW3A in Tables 9-12) calculated in advance correspondingly to the quantization output value of 0 are stored as the diffusion error table Error_TableA.

In the tables used in the case where the total density value Ct is greater than the threshold (the right sides in Tables 9-12), all of values represented by the quantization table Out_TableB (CoutB in Tables 9-12) are equal to or greater than 1 since the output quantized value is equal to or greater than 1 if the total density value Ct is higher than the threshold. Thus, as is distinct from the first embodiment, quantized values converted into multivalued data according to the density value Ct under predetermined conditions are stored. However, the minimum value of the quantized values is equal to or greater than 1. The quantized values may be determined by the existing monochrome multivalued quantization method. Since image data are simply converted into quinary data in the present embodiment, the quantized value is 1 for density values of 0 to 95, the quantized value is 2 for density values of 96 to 159, the quantized value is 3 for density values of 160 to 223, and the quantized value is 4 for density values of 224 or greater. Values (ExW0B, ExW1B, ExW2B, and ExW3B) calculated in advance correspondingly to the quantized values are stored in the diffusion error table Error_TableB.

As a result, in either of the case where the total density values Ct and Mt are greater than the thresholds and the case where the total density values Ct and Mt are not greater than the thresholds, it is possible refer to tables containing correct calculation results by selecting quantization tables and diffusion error tables according to the comparison results.

As described above, according to the present embodiment, even in the case where error diffusion on multivalued data, which is ternary or more, comprised of a combination of processes of two or more colors is performed, it is possible to prevent an increase in the number of tables even if the quantization bit rate increases, and to use calculation results stored in tables prepared in advance when actually performing error diffusion, thus realizing high-speed processing with simplified multiplications and divisions.

Figure 12:
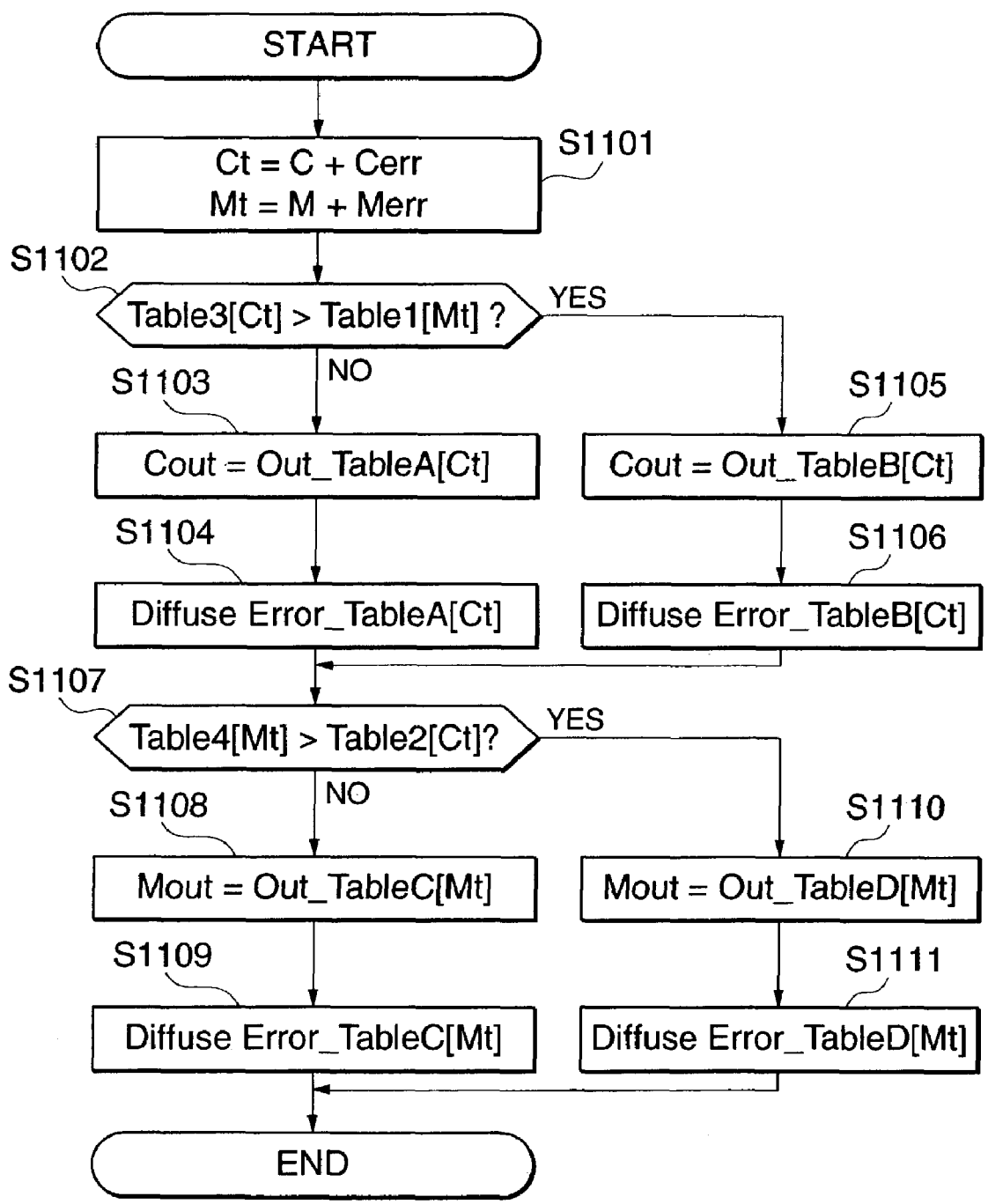
FIG. 12 is a flow chart showing the procedure for providing image formation control by an image processing apparatus according to a fourth embodiment of the present invention.
Figures 13A, 13B, 13C:
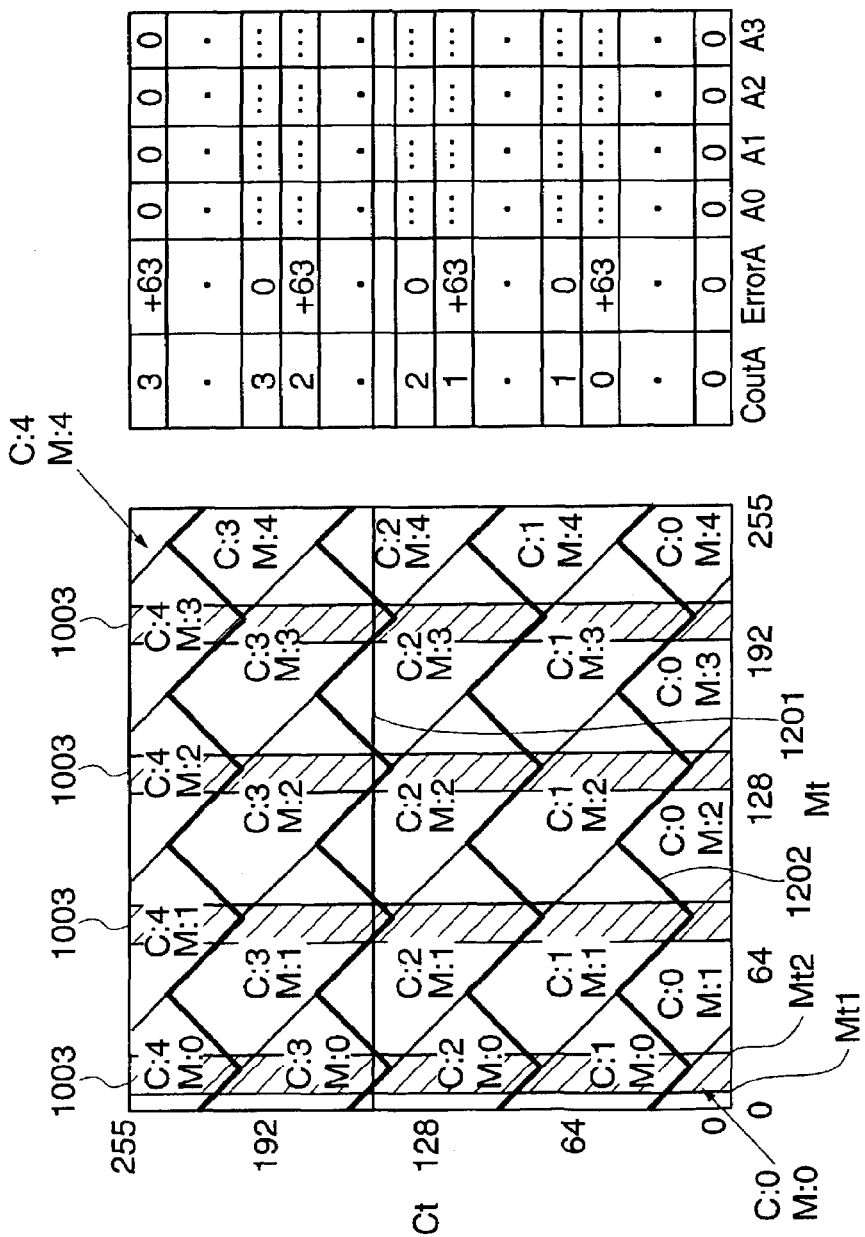
Figures 14A, 14B:
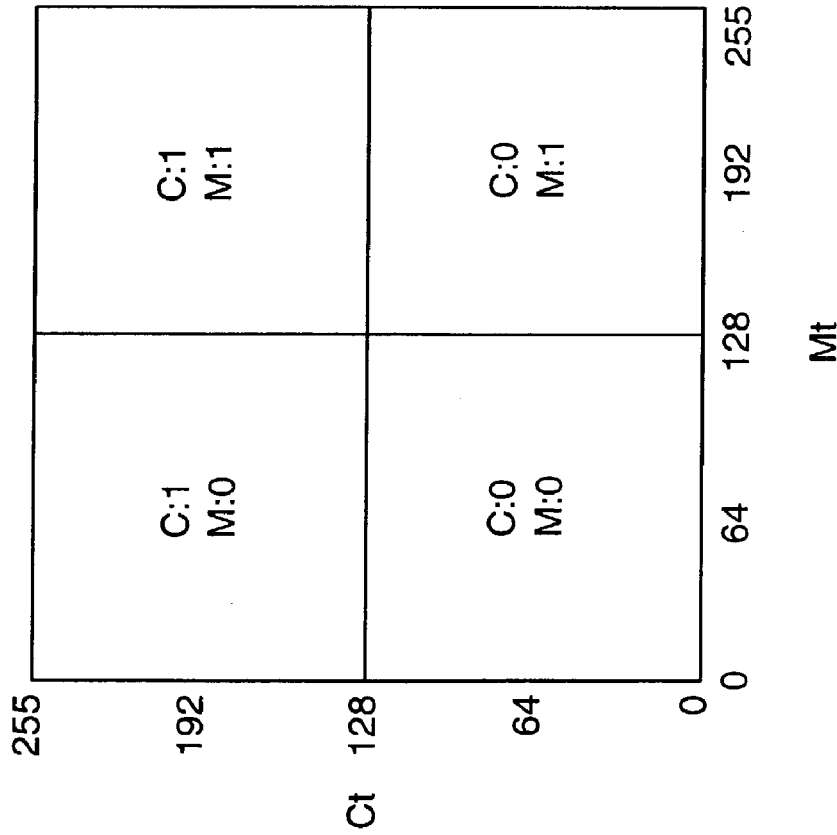
FIG. 14A is a view showing the relationship between density values of cyan and magenta components and output values thereof according to a conventional processing method.
FIG. 14B is a view showing an example of a table of total density values of cyan components and weighted diffusion error values for use in the conventional processing method.
Figure 15:
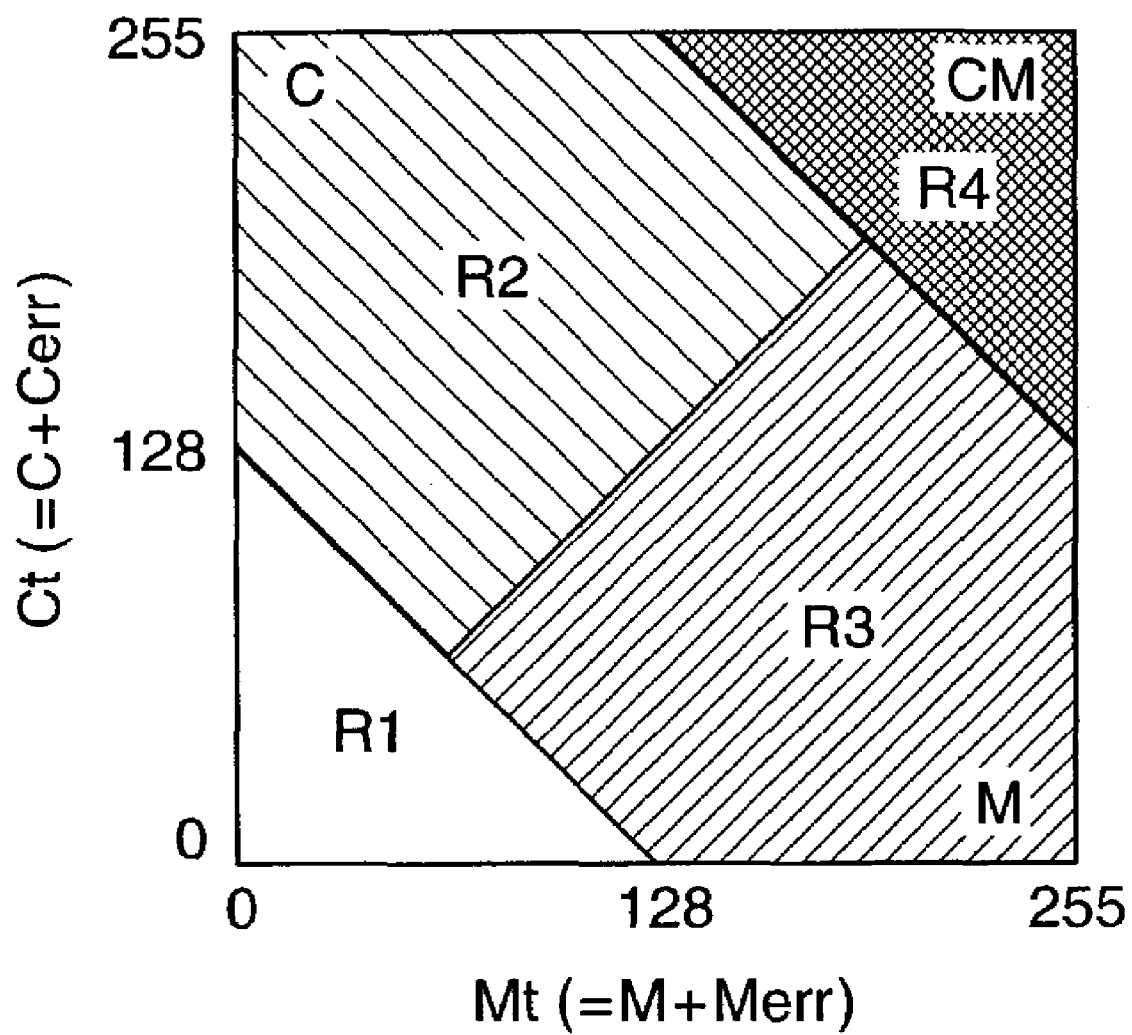
FIG. 15 is a view showing image formation control provided in accordance with a conventional ink-jet printing method.
Figure 16B:
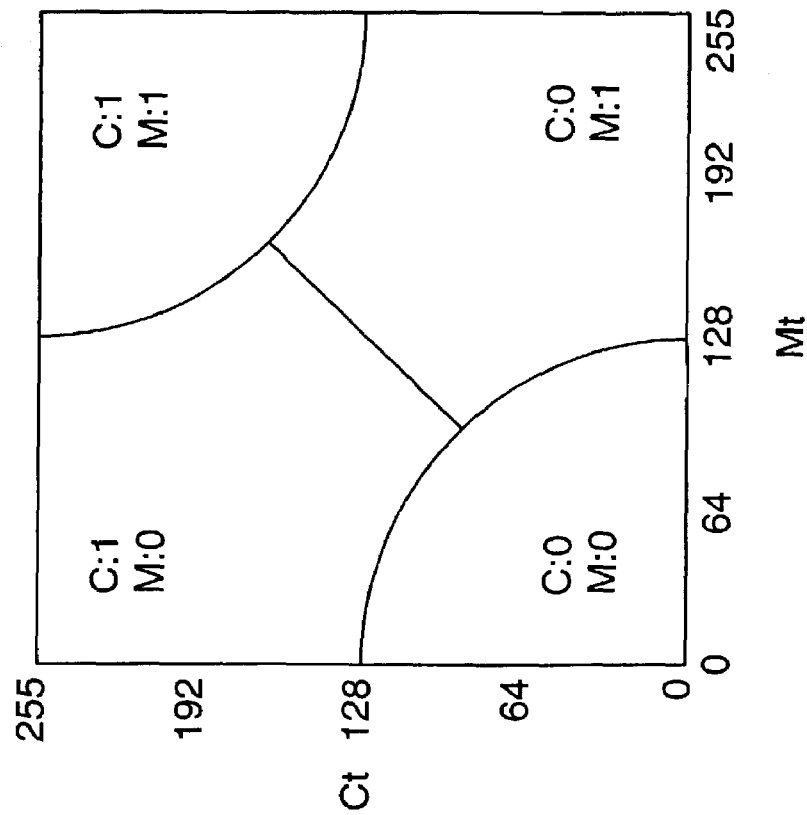
FIGS. 16A and 16B are views useful in explaining problems of the conventional method, which should be solved.
Figure 16A:
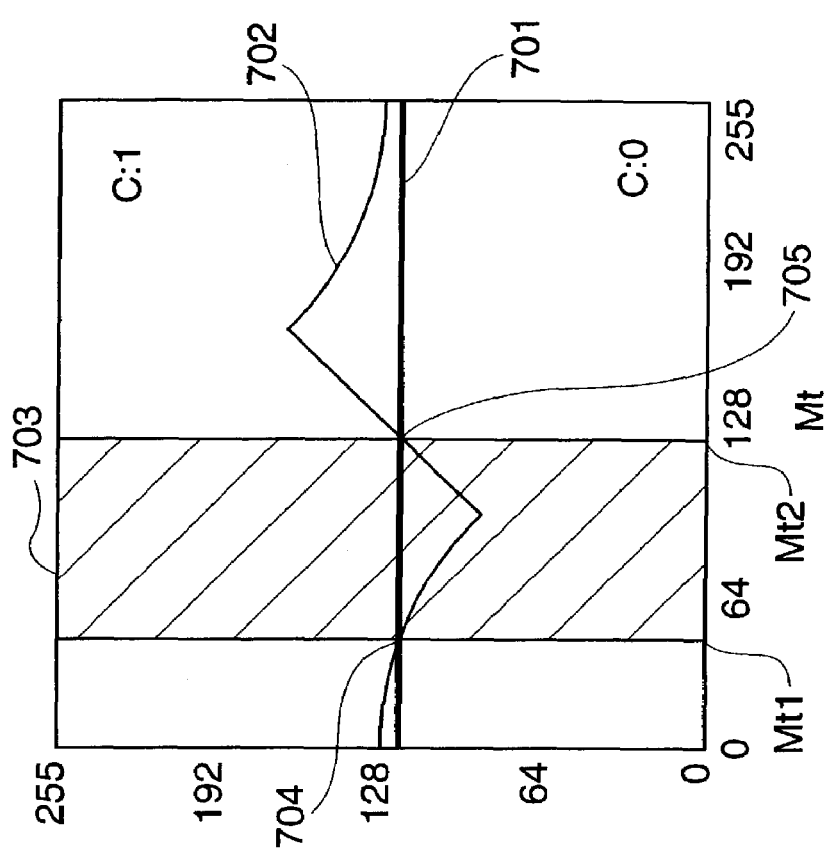

A description will now be given of a fourth embodiment of the present invention with reference to FIGS. 12 and 13A to 13C. FIG. 12 is a flow chart showing the procedure for providing image formation control by an image processing apparatus according to the fourth embodiment, and FIGS. 13A to 13C are views showing the relationship between threshold tables, output quantized value tables, and diffusion error tables. The construction of the present embodiment is identical with that of the first embodiment, and thus description thereof is omitted.

As is distinct from the third embodiment, the present embodiment provides a method of performing error diffusion on multivalued data, which is ternary or more, comprised of a combination of processes of two or more colors with a satisfactory ink positional accuracy in a half-tone part, and prevents an increase in the number of tables and reduces the overlapping of a plurality of colors in the entire density value region even if the quantization bit rate increases. A description will now be given of the method.

First, as shown in FIG. 12, total pixel density values Ct and Mt are acquired by adding accumulated error values Cerr and Merr from peripheral pixels to input pixel density values C and M of cyan and magenta components in a step S1101. In the next step S1102, a modulation value Table3[Ct] corresponding to the total density value Ct of the cyan component is read out from a modulation Table3, and a threshold Table1[Mt] corresponding to the total density value Mt of the magenta component is read out from a binarization threshold table Table1 for the cyan component. The modulation value Table3[Ct] and the threshold Table1[Mt] are then compared with each other. If the modulation value Table3[Ct] is greater than the threshold Table1[Mt], a value Out_TableB[Ct] corresponding to the total density value Ct is read out from an output quantized value table Out_TableB and the read out value Out_TableB[Ct] is set to the output quantized value Cout in a step S1105. Then, in a step S1106, an error value corresponding to the output quantized value Cout is read out from a diffusion error table Error_TableB, and the error is diffused to peripheral pixels. The process then proceeds to a step S1107.

If the modulation value Table3[Ct] is not greater than the threshold Table1[Mt] in the step S1103, a value Out_TableA[Ct] corresponding to the total density value Ct is read out from an output quantized value table Out_TableA, and the read value Out_TableA[Ct] is set to the output quantized value Cout in a step S1103. Then, in a step S1104, an error value corresponding to the output quantized value Cout is read out from a diffusion error table Error_TableA, and the error is diffused to peripheral pixels. The process then proceeds to the step S1107.

In the step S1107, a modulation value Table 4[Mt] corresponding to the total density value Mt of the magenta component is read out from a modulation table Table4, and a threshold Table2[Ct] corresponding to the total density value Ct of the cyan component is read out from a binarization threshold table Table2 for the magenta component. The modulation value Table4[Mt] and the threshold Table2 [Ct] are then compared with each other. If the modulation value Table4[Mt] is greater than the threshold Table2[Ct], a value Out_TableD[Mt] corresponding to the total density value Mt is read out from an output quantized value table Out_TableD and the read out value Out_TableD[Mt] is set to the output quantized value Mout in a step S1110. Then, in a step S1111, an error value corresponding to the output quantized value Mout is read out from a diffusion error table Error_TableD, and the error is diffused to peripheral pixels. The present process is then terminated.

If the modulation value Table4[Mt] is not greater than the threshold Table2[Ct] in the step S1107, a value Out_TableC[Mt] corresponding to the total density value Mt is read out from an output quantized value table Out_TableC and the read value value Out_TableC[Mt] is set to the output quantized value Mout in a step S1108. Then, in a step S1109, an error value corresponding to the output quantized value Mout is read out from a diffusion error table Error_TableC, and the error is diffused to peripheral pixels. The present process is then terminated.

The table Table1 from which the modulation value corresponding to the total density value Ct is acquired and the table Table3 from which the modulation value corresponding to the total density value Mt are set in the following manner.

Table1[x]=x−(the maximum value of quantized typical values equal to or less than x)
Table1[y]=y−(the maximum value of quantized typical values equal to or less than y)

FIG. 13A shows the relationship between the total density value Ct as the sum of an input density value and an accumulated error value of the cyan component, the total density value Mt as the sum of an input density value and an accumulated error value of the magenta component, and output values of the cyan and magenta components in the above described error diffusing process. In FIG. 13A, a thick curved line 1202 is a threshold curve representing thresholds for the quantized value of the cyan component being 1 or 0. In FIG. 13A, three curved lines similar in shape to the curved line 1202 are a threshold curve representing thresholds for the quantized value being 4 or 3, a threshold curve representing thresholds for the quantized value being 3 or 2, and a threshold curve representing thresholds for the quantized value being 2 or 1, respectively, from top to bottom. In the present embodiment, these four threshold curves are generically referred to as "the quantization threshold curve group".

A horizontal line 1201 in FIGS. 13A-13C represents the total density value Ct of the cyan component. The density value 1201 intersects the quantization threshold curve 1202 at eight points, and in hatched regions 1003, output quantized values are greater by 1 than output quantized values outside the regions 1003.

FIG. 13B shows the output quantized value table Out_TableA (CoutA) and the diffusion error table Error_TableA, and the output quantized value table Out_TableA (CoutA) is correlated with the diffusion error table Error_TableA, and the diffusion error table Error_TableA contains errors (ErrorA) based on the quantized values CoutA and diffusion values (A0, A1, A2, and A3) based on the errors (ErrorA). Similarly, FIG. 13C shows the output quantized value table Out_TableB and the diffusion error table Error_TableB, and the output quantized value table Out_TableB (CoutB) and the diffusion error table Error_TableB are correlated with each other.

In the steps S1102 and S1107 shown in FIG. 12, if the density modulation value is greater than the threshold, the table shown in FIG. 13C is used, and if the density modulation value is greater than the threshold, the table shown in FIG. 13B is used.

Tables 13 to 16 show detailed examples of the tables used for quantization of the cyan component. A description of detailed examples of the tables used for quantization of the magenta componentis omitted.

TABLE 13

| Ct | CoutA | ErrorA | ExW0A | ExW1A | ExW2A | ExW3A | Ct | CoutB | ErrorB | ExW0B | ExW1B | ExW2B | ExW3B |
|---|---|---|---|---|---|---|---|---|---|---|---|---|---|
| 0 | 0 | 0 | 0.00 | 0.00 | 0.00 | 0.00 | 0 | 1 | −64 | −28.00 | −20.00 | −12.00 | −4.00 |
| 1 | 0 | 1 | 0.44 | 0.31 | 0.19 | 0.06 | 1 | 1 | −63 | −27.56 | −19.69 | −11.81 | −3.94 |
| 2 | 0 | 2 | 0.88 | 0.63 | 0.38 | 0.13 | 2 | 1 | −62 | −27.13 | −19.38 | −11.63 | −3.88 |
| 3 | 0 | 3 | 1.31 | 0.94 | 0.56 | 0.19 | 3 | 1 | −61 | −26.69 | −19.06 | −11.44 | −3.81 |
| 4 | 0 | 4 | 1.75 | 1.25 | 0.75 | 0.25 | 4 | 1 | −60 | −26.25 | −18.75 | −11.25 | −3.75 |
| 5 | 0 | 5 | 2.19 | 1.56 | 0.94 | 0.31 | 5 | 1 | −59 | −25.81 | −18.44 | −11.06 | −3.69 |
| 6 | 0 | 6 | 2.63 | 1.88 | 1.13 | 0.38 | 6 | 1 | −58 | −25.38 | −18.13 | −10.88 | −3.63 |
| 7 | 0 | 7 | 3.06 | 2.19 | 1.31 | 0.44 | 7 | 1 | −57 | −24.94 | −17.81 | −10.69 | −3.56 |
| 8 | 0 | 8 | 3.50 | 2.50 | 1.50 | 0.50 | 8 | 1 | −56 | −24.50 | −17.50 | −10.50 | −3.50 |
| 9 | 0 | 9 | 3.94 | 2.81 | 1.69 | 0.56 | 9 | 1 | −55 | −24.06 | −17.19 | −10.31 | −3.44 |
| 10 | 0 | 10 | 4.38 | 3.13 | 1.88 | 0.63 | 10 | 1 | −54 | −23.63 | −16.88 | −10.13 | −3.38 |
| 11 | 0 | 11 | 4.81 | 3.44 | 2.06 | 0.69 | 11 | 1 | −53 | −23.19 | −16.56 | −9.94 | −3.31 |
| 12 | 0 | 12 | 5.25 | 3.75 | 2.25 | 0.75 | 12 | 1 | −52 | −22.75 | −16.25 | −9.75 | −3.25 |
| 13 | 0 | 13 | 5.69 | 4.06 | 2.44 | 0.81 | 13 | 1 | −51 | −22.31 | −15.94 | −9.56 | −3.19 |
| 14 | 0 | 14 | 6.13 | 4.38 | 2.63 | 0.88 | 14 | 1 | −50 | −21.88 | −15.63 | −9.38 | −3.13 |
| 15 | 0 | 15 | 6.56 | 4.69 | 2.81 | 0.94 | 15 | 1 | −49 | −21.44 | −15.31 | −9.19 | −3.06 |
| 16 | 0 | 16 | 7.00 | 5.00 | 3.00 | 1.00 | 16 | 1 | −48 | −21.00 | −15.00 | −9.00 | −3.00 |
| 17 | 0 | 17 | 7.44 | 5.31 | 3.19 | 1.06 | 17 | 1 | −47 | −20.56 | −14.69 | −8.81 | −2.94 |
| 18 | 0 | 18 | 7.88 | 5.63 | 3.38 | 1.13 | 18 | 1 | −46 | −20.13 | −14.38 | −8.63 | −2.88 |
| 19 | 0 | 19 | 8.31 | 5.94 | 3.56 | 1.19 | 19 | 1 | −45 | −19.69 | −14.06 | −8.44 | −2.81 |
| 20 | 0 | 20 | 8.75 | 6.25 | 3.75 | 1.25 | 20 | 1 | −44 | −19.25 | −13.75 | −8.25 | −2.75 |
| 21 | 0 | 21 | 9.19 | 6.56 | 3.94 | 1.31 | 21 | 1 | −43 | −18.81 | −13.44 | −8.06 | −2.69 |
| 22 | 0 | 22 | 9.63 | 6.88 | 4.13 | 1.38 | 22 | 1 | −42 | −18.38 | −13.13 | −7.88 | −2.63 |
| 23 | 0 | 23 | 10.06 | 7.19 | 4.31 | 1.44 | 23 | 1 | −41 | −17.94 | −12.81 | −7.69 | −2.56 |
| 24 | 0 | 24 | 10.50 | 7.50 | 4.50 | 1.50 | 24 | 1 | −40 | −17.50 | −12.50 | −7.50 | −2.50 |
| 25 | 0 | 25 | 10.94 | 7.81 | 4.69 | 1.56 | 25 | 1 | −39 | −17.06 | −12.19 | −7.31 | −2.44 |
| 26 | 0 | 26 | 11.38 | 8.13 | 4.88 | 1.63 | 26 | 1 | −38 | −16.63 | −11.88 | −7.13 | −2.38 |
| 27 | 0 | 27 | 11.81 | 8.44 | 5.06 | 1.69 | 27 | 1 | −37 | −16.19 | −11.56 | −6.94 | −2.31 |
| 28 | 0 | 28 | 12.25 | 8.75 | 5.25 | 1.75 | 28 | 1 | −36 | −15.75 | −11.25 | −6.75 | −2.25 |
| 29 | 0 | 29 | 12.69 | 9.06 | 5.44 | 1.81 | 29 | 1 | −35 | −15.31 | −10.94 | −6.56 | −2.19 |
| 30 | 0 | 30 | 13.13 | 9.38 | 5.63 | 1.88 | 30 | 1 | −34 | −14.88 | −10.63 | −6.38 | −2.13 |
| 31 | 0 | 31 | 13.56 | 9.69 | 5.81 | 1.94 | 31 | 1 | −33 | −14.44 | −10.31 | −6.19 | −2.06 |
| 32 | 0 | 32 | 14.00 | 10.00 | 6.00 | 2.00 | 32 | 1 | −32 | −14.00 | −10.00 | −6.00 | −2.00 |
| 33 | 0 | 33 | 14.44 | 10.31 | 6.19 | 2.06 | 33 | 1 | −31 | −13.56 | −9.69 | −5.81 | −1.94 |
| 34 | 0 | 34 | 14.88 | 10.63 | 6.38 | 2.13 | 34 | 1 | −30 | −13.13 | −9.38 | −5.63 | −1.88 |
| 35 | 0 | 35 | 15.31 | 10.94 | 6.56 | 2.19 | 35 | 1 | −29 | −12.69 | −9.06 | −5.44 | −1.81 |

TABLE 13-continued

| Ct | CoutA | ErrorA | ExW0A | ExW1A | ExW2A | ExW3A | Ct | CoutB | ErrorB | ExW0B | ExW1B | ExW2B | ExW3B |
|---|---|---|---|---|---|---|---|---|---|---|---|---|---|
| 36 | 0 | 36 | 15.75 | 11.25 | 6.75 | 2.25 | 36 | 1 | −28 | −12.25 | −8.75 | −5.25 | −1.75 |
| 37 | 0 | 37 | 16.19 | 11.56 | 6.94 | 2.31 | 37 | 1 | −27 | −11.81 | −8.44 | −5.06 | −1.69 |
| 38 | 0 | 38 | 16.63 | 11.88 | 7.13 | 2.38 | 38 | 1 | −26 | −11.38 | −8.13 | −4.88 | −1.63 |
| 39 | 0 | 39 | 17.06 | 12.19 | 7.31 | 2.44 | 39 | 1 | −25 | −10.94 | −7.81 | −4.69 | −1.56 |
| 40 | 0 | 40 | 17.50 | 12.50 | 7.50 | 2.50 | 40 | 1 | −24 | −10.50 | −7.50 | −4.50 | −1.50 |
| 41 | 0 | 41 | 17.94 | 12.81 | 7.69 | 2.56 | 41 | 1 | −23 | −10.06 | −7.19 | −4.31 | −1.44 |
| 42 | 0 | 42 | 18.38 | 13.13 | 7.88 | 2.63 | 42 | 1 | −22 | −9.63 | −6.88 | −4.13 | −1.38 |
| 43 | 0 | 43 | 18.81 | 13.44 | 8.06 | 2.69 | 43 | 1 | −21 | −9.19 | −6.56 | −3.94 | −1.31 |
| 44 | 0 | 44 | 19.25 | 13.75 | 8.25 | 2.75 | 44 | 1 | −20 | −8.75 | −6.25 | −3.75 | −1.25 |
| 45 | 0 | 45 | 19.69 | 14.06 | 8.44 | 2.81 | 45 | 1 | −19 | −8.31 | −5.94 | −3.56 | −1.19 |
| 46 | 0 | 46 | 20.13 | 14.38 | 8.63 | 2.88 | 46 | 1 | −18 | −7.88 | −5.63 | −3.38 | −1.13 |
| 47 | 0 | 47 | 20.56 | 14.69 | 8.81 | 2.94 | 47 | 1 | −17 | −7.44 | −5.31 | −3.19 | −1.06 |
| 48 | 0 | 48 | 21.00 | 15.00 | 9.00 | 3.00 | 48 | 1 | −16 | −7.00 | −5.00 | −3.00 | −1.00 |
| 49 | 0 | 49 | 21.44 | 15.31 | 9.19 | 3.06 | 49 | 1 | −15 | −6.56 | −4.69 | −2.81 | −0.94 |
| 50 | 0 | 50 | 21.88 | 15.63 | 9.38 | 3.13 | 50 | 1 | −14 | −6.13 | −4.38 | −2.63 | −0.88 |
| 51 | 0 | 51 | 22.31 | 15.94 | 9.56 | 3.19 | 51 | 1 | −13 | −5.69 | −4.06 | −2.44 | −0.81 |
| 52 | 0 | 52 | 22.75 | 16.25 | 9.75 | 3.25 | 52 | 1 | −12 | −5.25 | −3.75 | −2.25 | −0.75 |
| 53 | 0 | 53 | 23.19 | 16.56 | 9.94 | 3.31 | 53 | 1 | −11 | −4.81 | −3.44 | −2.06 | −0.69 |
| 54 | 0 | 54 | 23.63 | 16.88 | 10.13 | 3.38 | 54 | 1 | −10 | −4.38 | −3.13 | −1.88 | −0.63 |
| 55 | 0 | 55 | 24.06 | 17.19 | 10.31 | 3.44 | 55 | 1 | −9 | −3.94 | −2.81 | −1.69 | −0.56 |
| 56 | 0 | 56 | 24.50 | 17.50 | 10.50 | 3.50 | 56 | 1 | −8 | −3.50 | −2.50 | −1.50 | −0.50 |
| 57 | 0 | 57 | 24.94 | 17.81 | 10.69 | 3.56 | 57 | 1 | −7 | −3.06 | −2.19 | −1.31 | −0.44 |
| 58 | 0 | 58 | 25.38 | 18.13 | 10.88 | 3.63 | 58 | 1 | −6 | −2.63 | −1.88 | −1.13 | −0.38 |
| 59 | 0 | 59 | 25.81 | 18.44 | 11.06 | 3.69 | 59 | 1 | −5 | −2.19 | −1.56 | −0.94 | −0.31 |
| 60 | 0 | 60 | 26.25 | 18.75 | 11.25 | 3.75 | 60 | 1 | −4 | −1.75 | −1.25 | −0.75 | −0.25 |
| 61 | 0 | 61 | 26.69 | 19.06 | 11.44 | 3.81 | 61 | 1 | −3 | −1.31 | −0.94 | −0.56 | −0.19 |
| 62 | 0 | 62 | 27.13 | 19.38 | 11.63 | 3.88 | 62 | 1 | −2 | −0.88 | −0.63 | −0.38 | −0.13 |
| 63 | 0 | 63 | 27.56 | 19.69 | 11.81 | 3.94 | 63 | 1 | −1 | −0.44 | −0.31 | −0.19 | −0.06 |

TABLE 14

| Ct | CoutA | ErrorA | ExW0A | ExW1A | ExW2A | ExW3A | Ct | CoutB | ErrorB | ExW0B | ExW1B | ExW2B | ExW3B |
|---|---|---|---|---|---|---|---|---|---|---|---|---|---|
| 64 | 1 | 0 | 0.00 | 0.00 | 0.00 | 0.00 | 64 | 2 | −64 | −28.00 | −20.00 | −12.00 | −4.00 |
| 65 | 1 | 1 | 0.44 | 0.31 | 0.19 | 0.06 | 65 | 2 | −63 | −27.56 | −19.69 | −11.81 | −3.94 |
| 66 | 1 | 2 | 0.88 | 0.63 | 0.38 | 0.13 | 66 | 2 | −62 | −27.13 | −19.38 | −11.63 | −3.88 |
| 67 | 1 | 3 | 1.31 | 0.94 | 0.56 | 0.19 | 67 | 2 | −61 | −26.69 | −19.06 | −11.44 | −3.81 |
| 68 | 1 | 4 | 1.75 | 1.25 | 0.75 | 0.25 | 68 | 2 | −60 | −26.25 | −18.75 | −11.25 | −3.75 |
| 69 | 1 | 5 | 2.19 | 1.56 | 0.94 | 0.31 | 69 | 2 | −59 | −25.81 | −18.44 | −11.06 | −3.69 |
| 70 | 1 | 6 | 2.63 | 1.88 | 1.13 | 0.38 | 70 | 2 | −58 | −25.38 | −18.13 | −10.88 | −3.63 |
| 71 | 1 | 7 | 3.06 | 2.19 | 1.31 | 0.44 | 71 | 2 | −57 | −24.94 | −17.81 | −10.69 | −3.56 |
| 72 | 1 | 8 | 3.50 | 2.50 | 1.50 | 0.50 | 72 | 2 | −56 | −24.50 | −17.50 | −10.50 | −3.50 |
| 73 | 1 | 9 | 3.94 | 2.81 | 1.69 | 0.56 | 73 | 2 | −55 | −24.06 | −17.19 | −10.31 | −3.44 |
| 74 | 1 | 10 | 4.38 | 3.13 | 1.88 | 0.63 | 74 | 2 | −54 | −23.63 | −16.88 | −10.13 | −3.38 |
| 75 | 1 | 11 | 4.81 | 3.44 | 2.06 | 0.69 | 75 | 2 | −53 | −23.19 | −16.56 | −9.94 | −3.31 |
| 76 | 1 | 12 | 5.25 | 3.75 | 2.25 | 0.75 | 76 | 2 | −52 | −22.75 | −16.25 | −9.75 | −3.25 |
| 77 | 1 | 13 | 5.69 | 4.06 | 2.44 | 0.81 | 77 | 2 | −51 | −22.31 | −15.94 | −9.56 | −3.19 |
| 78 | 1 | 14 | 6.13 | 4.38 | 2.63 | 0.88 | 78 | 2 | −50 | −21.88 | −15.63 | −9.38 | −3.13 |
| 79 | 1 | 15 | 6.56 | 4.69 | 2.81 | 0.94 | 79 | 2 | −49 | −21.44 | −15.31 | −9.19 | −3.06 |
| 80 | 1 | 16 | 7.00 | 5.00 | 3.00 | 1.00 | 80 | 2 | −48 | −21.00 | −15.00 | −9.00 | −3.00 |
| 81 | 1 | 17 | 7.44 | 5.31 | 3.19 | 1.06 | 81 | 2 | −47 | −20.56 | −14.69 | −8.81 | −2.94 |
| 82 | 1 | 18 | 7.88 | 5.63 | 3.38 | 1.13 | 82 | 2 | −46 | −20.13 | −14.38 | −8.63 | −2.88 |
| 83 | 1 | 19 | 8.31 | 5.94 | 3.56 | 1.19 | 83 | 2 | −45 | −19.69 | −14.06 | −8.44 | −2.81 |
| 84 | 1 | 20 | 8.75 | 6.25 | 3.75 | 1.25 | 84 | 2 | −44 | −19.25 | −13.75 | −8.25 | −2.75 |
| 85 | 1 | 21 | 9.19 | 6.56 | 3.94 | 1.31 | 85 | 2 | −43 | −18.81 | −13.44 | −8.06 | −2.69 |
| 86 | 1 | 22 | 9.63 | 6.88 | 4.13 | 1.38 | 86 | 2 | −42 | −18.38 | −13.13 | −7.88 | −2.63 |
| 87 | 1 | 23 | 10.06 | 7.19 | 4.31 | 1.44 | 87 | 2 | −41 | −17.94 | −12.81 | −7.69 | −2.56 |
| 88 | 1 | 24 | 10.50 | 7.50 | 4.50 | 1.50 | 88 | 2 | −40 | −17.50 | −12.50 | −7.50 | −2.50 |
| 89 | 1 | 25 | 10.94 | 7.81 | 4.69 | 1.56 | 89 | 2 | −39 | −17.06 | −12.19 | −7.31 | −2.44 |
| 90 | 1 | 26 | 11.38 | 8.13 | 4.88 | 1.63 | 90 | 2 | −38 | −16.63 | −11.88 | −7.13 | −2.38 |
| 91 | 1 | 27 | 11.81 | 8.44 | 5.06 | 1.69 | 91 | 2 | −37 | −16.19 | −11.56 | −6.94 | −2.31 |
| 92 | 1 | 28 | 12.25 | 8.75 | 5.25 | 1.75 | 92 | 2 | −36 | −15.75 | −11.25 | −6.75 | −2.25 |
| 93 | 1 | 29 | 12.69 | 9.06 | 5.44 | 1.81 | 93 | 2 | −35 | −15.31 | −10.94 | −6.56 | −2.19 |
| 94 | 1 | 30 | 13.13 | 9.38 | 5.63 | 1.88 | 94 | 2 | −34 | −14.88 | −10.63 | −6.38 | −2.13 |
| 95 | 1 | 31 | 13.56 | 9.69 | 5.81 | 1.94 | 95 | 2 | −33 | −14.44 | −10.31 | −6.19 | −2.06 |
| 96 | 1 | 32 | 14.00 | 10.00 | 6.00 | 2.00 | 96 | 2 | −32 | −14.00 | −10.00 | −6.00 | −2.00 |
| 97 | 1 | 33 | 14.44 | 10.31 | 6.19 | 2.06 | 97 | 2 | −31 | −13.56 | −9.69 | −5.81 | −1.94 |
| 98 | 1 | 34 | 14.88 | 10.63 | 6.38 | 2.13 | 98 | 2 | −30 | −13.13 | −9.38 | −5.63 | −1.88 |
| 99 | 1 | 35 | 15.31 | 10.94 | 6.56 | 2.19 | 99 | 2 | −29 | −12.69 | −9.06 | −5.44 | −1.81 |
| 100 | 1 | 36 | 15.75 | 11.25 | 6.75 | 2.25 | 100 | 2 | −28 | −12.25 | −8.75 | −5.25 | −1.75 |
| 101 | 1 | 37 | 16.19 | 11.56 | 6.94 | 2.31 | 101 | 2 | −27 | −11.81 | −8.44 | −5.06 | −1.69 |
| 102 | 1 | 38 | 16.63 | 11.88 | 7.13 | 2.38 | 102 | 2 | −26 | −11.38 | −8.13 | −4.88 | −1.63 |
| 103 | 1 | 39 | 17.06 | 12.19 | 7.31 | 2.44 | 103 | 2 | −25 | −10.94 | −7.81 | −4.69 | −1.56 |
| 104 | 1 | 40 | 17.50 | 12.50 | 7.50 | 2.50 | 104 | 2 | −24 | −10.50 | −7.50 | −4.50 | −1.50 |

TABLE 14-continued

| Ct | CoutA | ErrorA | ExW0A | ExW1A | ExW2A | ExW3A | Ct | CoutB | ErrorB | ExW0B | ExW1B | ExW2B | ExW3B |
|---|---|---|---|---|---|---|---|---|---|---|---|---|---|
| 105 | 1 | 41 | 17.94 | 12.81 | 7.69 | 2.56 | 105 | 2 | −23 | −10.06 | −7.19 | −4.31 | −1.44 |
| 106 | 1 | 42 | 18.38 | 13.13 | 7.88 | 2.63 | 106 | 2 | −22 | −9.63 | −6.88 | −4.13 | −1.38 |
| 107 | 1 | 43 | 18.81 | 13.44 | 8.06 | 2.69 | 107 | 2 | −21 | −9.19 | −6.56 | −3.94 | −1.31 |
| 108 | 1 | 44 | 19.25 | 13.75 | 8.25 | 2.75 | 108 | 2 | −20 | −8.75 | −6.25 | −3.75 | −1.25 |
| 109 | 1 | 45 | 19.69 | 14.06 | 8.44 | 2.81 | 109 | 2 | −19 | −8.31 | −5.94 | −3.56 | −1.19 |
| 110 | 1 | 46 | 20.13 | 14.38 | 8.63 | 2.88 | 110 | 2 | −18 | −7.88 | −5.63 | −3.38 | −1.13 |
| 111 | 1 | 47 | 20.56 | 14.69 | 8.81 | 2.94 | 111 | 2 | −17 | −7.44 | −5.31 | −3.19 | −1.06 |
| 112 | 1 | 48 | 21.00 | 15.00 | 9.00 | 3.00 | 112 | 2 | −16 | −7.00 | −5.00 | −3.00 | −1.00 |
| 113 | 1 | 49 | 21.44 | 15.31 | 9.19 | 3.06 | 113 | 2 | −15 | −6.56 | −4.69 | −2.81 | −0.94 |
| 114 | 1 | 50 | 21.88 | 15.63 | 9.38 | 3.13 | 114 | 2 | −14 | −6.13 | −4.38 | −2.63 | −0.88 |
| 115 | 1 | 51 | 22.31 | 15.94 | 9.56 | 3.19 | 115 | 2 | −13 | −5.69 | −4.06 | −2.44 | −0.81 |
| 116 | 1 | 52 | 22.75 | 16.25 | 9.75 | 3.25 | 116 | 2 | −12 | −5.25 | −3.75 | −2.25 | −0.75 |
| 117 | 1 | 53 | 23.19 | 16.56 | 9.94 | 3.31 | 117 | 2 | −11 | −4.81 | −3.44 | −2.06 | −0.69 |
| 118 | 1 | 54 | 23.63 | 16.88 | 10.13 | 3.38 | 118 | 2 | −10 | −4.38 | −3.13 | −1.88 | −0.63 |
| 119 | 1 | 55 | 24.06 | 17.19 | 10.31 | 3.44 | 119 | 2 | −9 | −3.94 | −2.81 | −1.69 | −0.56 |
| 120 | 1 | 56 | 24.50 | 17.50 | 10.50 | 3.50 | 120 | 2 | −8 | −3.50 | −2.50 | −1.50 | −0.50 |
| 121 | 1 | 57 | 24.94 | 17.81 | 10.69 | 3.56 | 121 | 2 | −7 | −3.06 | −2.19 | −1.31 | −0.44 |
| 122 | 1 | 58 | 25.38 | 18.13 | 10.88 | 3.63 | 122 | 2 | −6 | −2.63 | −1.88 | −1.13 | −0.38 |
| 123 | 1 | 59 | 25.81 | 18.44 | 11.06 | 3.69 | 123 | 2 | −5 | −2.19 | −1.56 | −0.94 | −0.31 |
| 124 | 1 | 60 | 26.25 | 18.75 | 11.25 | 3.75 | 124 | 2 | −4 | −1.75 | −1.25 | −0.75 | −0.25 |
| 125 | 1 | 61 | 26.69 | 19.06 | 11.44 | 3.81 | 125 | 2 | −3 | −1.31 | −0.94 | −0.56 | −0.19 |
| 126 | 1 | 62 | 27.13 | 19.38 | 11.63 | 3.88 | 126 | 2 | −2 | −0.88 | −0.63 | −0.38 | −0.13 |
| 127 | 1 | 63 | 27.56 | 19.69 | 11.81 | 3.94 | 127 | 2 | −1 | −0.44 | −0.31 | −0.19 | −0.06 |

TABLE 15

| Ct | CoutA | ErrorA | ExW0A | ExW1A | ExW2A | ExW3A | Ct | CoutB | ErrorB | ExW0B | ExW1B | ExW2B | ExW3B |
|---|---|---|---|---|---|---|---|---|---|---|---|---|---|
| 128 | 2 | 0 | 0.00 | 0.00 | 0.00 | 0.00 | 128 | 3 | −64 | −28.00 | −20.00 | −12.00 | −4.00 |
| 129 | 2 | 1 | 0.44 | 0.31 | 0.19 | 0.06 | 129 | 3 | −63 | −27.56 | −19.69 | −11.81 | −3.94 |
| 130 | 2 | 2 | 0.88 | 0.63 | 0.38 | 0.13 | 130 | 3 | −62 | −27.13 | −19.38 | −11.63 | −3.88 |
| 131 | 2 | 3 | 1.31 | 0.94 | 0.56 | 0.19 | 131 | 3 | −61 | −26.69 | −19.06 | −11.44 | −3.81 |
| 132 | 2 | 4 | 1.75 | 1.25 | 0.75 | 0.25 | 132 | 3 | −60 | −26.25 | −18.75 | −11.25 | −3.75 |
| 133 | 2 | 5 | 2.19 | 1.56 | 0.94 | 0.31 | 133 | 3 | −59 | −25.81 | −18.44 | −11.06 | −3.69 |
| 134 | 2 | 6 | 2.63 | 1.88 | 1.13 | 0.38 | 134 | 3 | −58 | −25.38 | −18.13 | −10.88 | −3.63 |
| 135 | 2 | 7 | 3.06 | 2.19 | 1.31 | 0.44 | 135 | 3 | −57 | −24.94 | −17.81 | −10.69 | −3.56 |
| 136 | 2 | 8 | 3.50 | 2.50 | 1.50 | 0.50 | 136 | 3 | −56 | −24.50 | −17.50 | −10.50 | −3.50 |
| 137 | 2 | 9 | 3.94 | 2.81 | 1.69 | 0.56 | 137 | 3 | −55 | −24.06 | −17.19 | −10.31 | −3.44 |
| 138 | 2 | 10 | 4.38 | 3.13 | 1.88 | 0.63 | 138 | 3 | −54 | −23.63 | −16.88 | −10.13 | −3.38 |
| 139 | 2 | 11 | 4.81 | 3.44 | 2.06 | 0.69 | 139 | 3 | −53 | −23.19 | −16.56 | −9.94 | −3.31 |
| 140 | 2 | 12 | 5.25 | 3.75 | 2.25 | 0.75 | 140 | 3 | −52 | −22.75 | −16.25 | −9.75 | −3.25 |
| 141 | 2 | 13 | 5.69 | 4.06 | 2.44 | 0.81 | 141 | 3 | −51 | −22.31 | −15.94 | −9.56 | −3.19 |
| 142 | 2 | 14 | 6.13 | 4.38 | 2.63 | 0.88 | 142 | 3 | −50 | −21.88 | −15.63 | −9.38 | −3.13 |
| 143 | 2 | 15 | 6.56 | 4.69 | 2.81 | 0.94 | 143 | 3 | −49 | −21.44 | −15.31 | −9.19 | −3.06 |
| 144 | 2 | 16 | 7.00 | 5.00 | 3.00 | 1.00 | 144 | 3 | −48 | −21.00 | −15.00 | −9.00 | −3.00 |
| 145 | 2 | 17 | 7.44 | 5.31 | 3.19 | 1.06 | 145 | 3 | −47 | −20.56 | −14.69 | −8.81 | −2.94 |
| 146 | 2 | 18 | 7.88 | 5.63 | 3.38 | 1.13 | 146 | 3 | −46 | −20.13 | −14.38 | −8.63 | −2.88 |
| 147 | 2 | 19 | 8.31 | 5.94 | 3.56 | 1.19 | 147 | 3 | −45 | −19.69 | −14.06 | −8.44 | −2.81 |
| 148 | 2 | 20 | 8.75 | 6.25 | 3.75 | 1.25 | 148 | 3 | −44 | −19.25 | −13.75 | −8.25 | −2.75 |
| 149 | 2 | 21 | 9.19 | 6.56 | 3.94 | 1.31 | 149 | 3 | −43 | −18.81 | −13.44 | −8.06 | −2.69 |
| 150 | 2 | 22 | 9.63 | 6.88 | 4.13 | 1.38 | 150 | 3 | −42 | −18.38 | −13.13 | −7.88 | −2.63 |
| 151 | 2 | 23 | 10.06 | 7.19 | 4.31 | 1.44 | 151 | 3 | −41 | −17.94 | −12.81 | −7.69 | −2.56 |
| 152 | 2 | 24 | 10.50 | 7.50 | 4.50 | 1.50 | 152 | 3 | −40 | −17.50 | −12.50 | −7.50 | −2.50 |
| 153 | 2 | 25 | 10.94 | 7.81 | 4.69 | 1.56 | 153 | 3 | −39 | −17.06 | −12.19 | −7.31 | −2.44 |
| 154 | 2 | 26 | 11.38 | 8.13 | 4.88 | 1.63 | 154 | 3 | −38 | −16.63 | −11.88 | −7.13 | −2.38 |
| 155 | 2 | 27 | 11.81 | 8.44 | 5.06 | 1.69 | 155 | 3 | −37 | −16.19 | −11.56 | −6.94 | −2.31 |
| 156 | 2 | 28 | 12.25 | 8.75 | 5.25 | 1.75 | 156 | 3 | −36 | −15.75 | −11.25 | −6.75 | −2.25 |
| 157 | 2 | 29 | 12.69 | 9.06 | 5.44 | 1.81 | 157 | 3 | −35 | −15.31 | −10.94 | −6.56 | −2.19 |
| 158 | 2 | 30 | 13.13 | 9.38 | 5.63 | 1.88 | 158 | 3 | −34 | −14.88 | −10.63 | −6.38 | −2.13 |
| 159 | 2 | 31 | 13.56 | 9.69 | 5.81 | 1.94 | 159 | 3 | −33 | −14.44 | −10.31 | −6.19 | −2.06 |
| 160 | 2 | 32 | 14.00 | 10.00 | 6.00 | 2.00 | 160 | 3 | −32 | −14.00 | −10.00 | −6.00 | −2.00 |
| 161 | 2 | 33 | 14.44 | 10.31 | 6.19 | 2.06 | 161 | 3 | −31 | −13.56 | −9.69 | −5.81 | −1.94 |
| 162 | 2 | 34 | 14.88 | 10.63 | 6.38 | 2.13 | 162 | 3 | −30 | −13.13 | −9.38 | −5.63 | −1.88 |
| 163 | 2 | 35 | 15.31 | 10.94 | 6.56 | 2.19 | 163 | 3 | −29 | −12.69 | −9.06 | −5.44 | −1.81 |
| 164 | 2 | 36 | 15.75 | 11.25 | 6.75 | 2.25 | 164 | 3 | −28 | −12.25 | −8.75 | −5.25 | −1.75 |
| 165 | 2 | 37 | 16.19 | 11.56 | 6.94 | 2.31 | 165 | 3 | −27 | −11.81 | −8.44 | −5.06 | −1.69 |
| 166 | 2 | 38 | 16.63 | 11.88 | 7.13 | 2.38 | 166 | 3 | −26 | −11.38 | −8.13 | −4.88 | −1.63 |
| 167 | 2 | 39 | 17.06 | 12.19 | 7.31 | 2.44 | 167 | 3 | −25 | −10.94 | −7.81 | −4.69 | −1.56 |
| 168 | 2 | 40 | 17.50 | 12.50 | 7.50 | 2.50 | 168 | 3 | −24 | −10.50 | −7.50 | −4.50 | −1.50 |
| 169 | 2 | 41 | 17.94 | 12.81 | 7.69 | 2.56 | 169 | 3 | −23 | −10.06 | −7.19 | −4.31 | −1.44 |
| 170 | 2 | 42 | 18.38 | 13.13 | 7.88 | 2.63 | 170 | 3 | −22 | −9.63 | −6.88 | −4.13 | −1.38 |
| 171 | 2 | 43 | 18.81 | 13.44 | 8.06 | 2.69 | 171 | 3 | −21 | −9.19 | −6.56 | −3.94 | −1.31 |
| 172 | 2 | 44 | 19.25 | 13.75 | 8.25 | 2.75 | 172 | 3 | −20 | −8.75 | −6.25 | −3.75 | −1.25 |
| 173 | 2 | 45 | 19.69 | 14.06 | 8.44 | 2.81 | 173 | 3 | −19 | −8.31 | −5.94 | −3.56 | −1.19 |

TABLE 15-continued

| Ct | CoutA | ErrorA | ExW0A | ExW1A | ExW2A | ExW3A | Ct | CoutB | ErrorB | ExW0B | ExW1B | ExW2B | ExW3B |
|---|---|---|---|---|---|---|---|---|---|---|---|---|---|
| 174 | 2 | 46 | 20.13 | 14.38 | 8.63 | 2.88 | 174 | 3 | −18 | −7.88 | −5.63 | −3.38 | −1.13 |
| 175 | 2 | 47 | 20.56 | 14.69 | 8.81 | 2.94 | 175 | 3 | −17 | −7.44 | −5.31 | −3.19 | −1.06 |
| 176 | 2 | 48 | 21.00 | 15.00 | 9.00 | 3.00 | 176 | 3 | −16 | −7.00 | −5.00 | −3.00 | −1.00 |
| 177 | 2 | 49 | 21.44 | 15.31 | 9.19 | 3.06 | 177 | 3 | −15 | −6.56 | −4.69 | −2.81 | −0.94 |
| 178 | 2 | 50 | 21.88 | 15.63 | 9.38 | 3.13 | 178 | 3 | −14 | −6.13 | −4.38 | −2.63 | −0.88 |
| 179 | 2 | 51 | 22.31 | 15.94 | 9.56 | 3.19 | 179 | 3 | −13 | −5.69 | −4.06 | −2.44 | −0.81 |
| 180 | 2 | 52 | 22.75 | 16.25 | 9.75 | 3.25 | 180 | 3 | −12 | −5.25 | −3.75 | −2.25 | −0.75 |
| 181 | 2 | 53 | 23.19 | 16.56 | 9.94 | 3.31 | 181 | 3 | −11 | −4.81 | −3.44 | −2.06 | −0.69 |
| 182 | 2 | 54 | 23.63 | 16.88 | 10.13 | 3.38 | 182 | 3 | −10 | −4.38 | −3.13 | −1.88 | −0.63 |
| 183 | 2 | 55 | 24.06 | 17.19 | 10.31 | 3.44 | 183 | 3 | −9 | −3.94 | −2.81 | −1.69 | −0.56 |
| 184 | 2 | 56 | 24.50 | 17.50 | 10.50 | 3.50 | 184 | 3 | −8 | −3.50 | −2.50 | −1.50 | −0.50 |
| 185 | 2 | 57 | 24.94 | 17.81 | 10.69 | 3.56 | 185 | 3 | −7 | −3.06 | −2.19 | −1.31 | −0.44 |
| 186 | 2 | 58 | 25.38 | 18.13 | 10.88 | 3.63 | 186 | 3 | −6 | −2.63 | −1.88 | −1.13 | −0.38 |
| 187 | 2 | 59 | 25.81 | 18.44 | 11.06 | 3.69 | 187 | 3 | −5 | −2.19 | −1.56 | −0.94 | −0.31 |
| 188 | 2 | 60 | 26.25 | 18.75 | 11.25 | 3.75 | 188 | 3 | −4 | −1.75 | −1.25 | −0.75 | −0.25 |
| 189 | 2 | 61 | 26.69 | 19.06 | 11.44 | 3.81 | 189 | 3 | −3 | −1.31 | −0.94 | −0.56 | −0.19 |
| 190 | 2 | 62 | 27.13 | 19.38 | 11.63 | 3.88 | 190 | 3 | −2 | −0.88 | −0.63 | −0.38 | −0.13 |
| 191 | 2 | 63 | 27.56 | 19.69 | 11.81 | 3.94 | 191 | 3 | −1 | −0.44 | −0.31 | −0.19 | −0.06 |

TABLE 16

| Ct | CoutA | ErrorA | ExW0A | ExW1A | ExW2A | ExW3A | Ct | CoutB | ErrorB | ExW0B | ExW1B | ExW2B | ExW3B |
|---|---|---|---|---|---|---|---|---|---|---|---|---|---|
| 192 | 3 | 0 | 0.00 | 0.00 | 0.00 | 0.00 | 192 | 4 | −63 | −27.56 | −19.69 | −11.81 | −3.94 |
| 193 | 3 | 1 | 0.44 | 0.31 | 0.19 | 0.06 | 193 | 4 | −62 | −27.13 | −19.38 | −11.63 | −3.88 |
| 194 | 3 | 2 | 0.88 | 0.63 | 0.38 | 0.13 | 194 | 4 | −61 | −26.69 | −19.06 | −11.44 | −3.81 |
| 195 | 3 | 3 | 1.31 | 0.94 | 0.56 | 0.19 | 195 | 4 | −60 | −26.25 | −18.75 | −11.25 | −3.75 |
| 196 | 3 | 4 | 1.75 | 1.25 | 0.75 | 0.25 | 196 | 4 | −59 | −25.81 | −18.44 | −11.06 | −3.69 |
| 197 | 3 | 5 | 2.19 | 1.56 | 0.94 | 0.31 | 197 | 4 | −58 | −25.38 | −18.13 | −10.88 | −3.63 |
| 198 | 3 | 6 | 2.63 | 1.88 | 1.13 | 0.38 | 198 | 4 | −57 | −24.94 | −17.81 | −10.69 | −3.56 |
| 199 | 3 | 7 | 3.06 | 2.19 | 1.31 | 0.44 | 199 | 4 | −56 | −24.50 | −17.50 | −10.50 | −3.50 |
| 200 | 3 | 8 | 3.50 | 2.50 | 1.50 | 0.50 | 200 | 4 | −55 | −24.06 | −17.19 | −10.31 | −3.44 |
| 201 | 3 | 9 | 3.94 | 2.81 | 1.69 | 0.56 | 201 | 4 | −54 | −23.63 | −16.88 | −10.13 | −3.38 |
| 202 | 3 | 10 | 4.38 | 3.13 | 1.88 | 0.63 | 202 | 4 | −53 | −23.19 | −16.56 | −9.94 | −3.31 |
| 203 | 3 | 11 | 4.81 | 3.44 | 2.06 | 0.69 | 203 | 4 | −52 | −22.75 | −16.25 | −9.75 | −3.25 |
| 204 | 3 | 12 | 5.25 | 3.75 | 2.25 | 0.75 | 204 | 4 | −51 | −22.31 | −15.94 | −9.56 | −3.19 |
| 205 | 3 | 13 | 5.69 | 4.06 | 2.44 | 0.81 | 205 | 4 | −50 | −21.88 | −15.63 | −9.38 | −3.13 |
| 206 | 3 | 14 | 6.13 | 4.38 | 2.63 | 0.88 | 206 | 4 | −49 | −21.44 | −15.31 | −9.19 | −3.06 |
| 207 | 3 | 15 | 6.56 | 4.69 | 2.81 | 0.94 | 207 | 4 | −48 | −21.00 | −15.00 | −9.00 | −3.00 |
| 208 | 3 | 16 | 7.00 | 5.00 | 3.00 | 1.00 | 208 | 4 | −47 | −20.56 | −14.69 | −8.81 | −2.94 |
| 209 | 3 | 17 | 7.44 | 5.31 | 3.19 | 1.06 | 209 | 4 | −46 | −20.13 | −14.38 | −8.63 | −2.88 |
| 210 | 3 | 18 | 7.88 | 5.63 | 3.38 | 1.13 | 210 | 4 | −45 | −19.69 | −14.06 | −8.44 | −2.81 |
| 211 | 3 | 19 | 8.31 | 5.94 | 3.56 | 1.19 | 211 | 4 | −44 | −19.25 | −13.75 | −8.25 | −2.75 |
| 212 | 3 | 20 | 8.75 | 6.25 | 3.75 | 1.25 | 212 | 4 | −43 | −18.81 | −13.44 | −8.06 | −2.69 |
| 213 | 3 | 21 | 9.19 | 6.56 | 3.94 | 1.31 | 213 | 4 | −42 | −18.38 | −13.13 | −7.88 | −2.63 |
| 214 | 3 | 22 | 9.63 | 6.88 | 4.13 | 1.38 | 214 | 4 | −41 | −17.94 | −12.81 | −7.69 | −2.56 |
| 215 | 3 | 23 | 10.06 | 7.19 | 4.31 | 1.44 | 215 | 4 | −40 | −17.50 | −12.50 | −7.50 | −2.50 |
| 216 | 3 | 24 | 10.50 | 7.50 | 4.50 | 1.50 | 216 | 4 | −39 | −17.06 | −12.19 | −7.31 | −2.44 |
| 217 | 3 | 25 | 10.94 | 7.81 | 4.69 | 1.56 | 217 | 4 | −38 | −16.63 | −11.88 | −7.13 | −2.38 |
| 218 | 3 | 26 | 11.38 | 8.13 | 4.88 | 1.63 | 218 | 4 | −37 | −16.19 | −11.56 | −6.94 | −2.31 |
| 219 | 3 | 27 | 11.81 | 8.44 | 5.06 | 1.69 | 219 | 4 | −36 | −15.75 | −11.25 | −6.75 | −2.25 |
| 220 | 3 | 28 | 12.25 | 8.75 | 5.25 | 1.75 | 220 | 4 | −35 | −15.31 | −10.94 | −6.56 | −2.19 |
| 221 | 3 | 29 | 12.69 | 9.06 | 5.44 | 1.81 | 221 | 4 | −34 | −14.88 | −10.63 | −6.38 | −2.13 |
| 222 | 3 | 30 | 13.13 | 9.38 | 5.63 | 1.88 | 222 | 4 | −33 | −14.44 | −10.31 | −6.19 | −2.06 |
| 223 | 3 | 31 | 13.56 | 9.69 | 5.81 | 1.94 | 223 | 4 | −32 | −14.00 | −10.00 | −6.00 | −2.00 |
| 224 | 3 | 32 | 14.00 | 10.00 | 6.00 | 2.00 | 224 | 4 | −31 | −13.56 | −9.69 | −5.81 | −1.94 |
| 225 | 3 | 33 | 14.44 | 10.31 | 6.19 | 2.06 | 225 | 4 | −30 | −13.13 | −9.38 | −5.63 | −1.88 |
| 226 | 3 | 34 | 14.88 | 10.63 | 6.38 | 2.13 | 226 | 4 | −29 | −12.69 | −9.06 | −5.44 | −1.81 |
| 227 | 3 | 35 | 15.31 | 10.94 | 6.56 | 2.19 | 227 | 4 | −28 | −12.25 | −8.75 | −5.25 | −1.75 |
| 228 | 3 | 36 | 15.75 | 11.25 | 6.75 | 2.25 | 228 | 4 | −27 | −11.81 | −8.44 | −5.06 | −1.69 |
| 229 | 3 | 37 | 16.19 | 11.56 | 6.94 | 2.31 | 229 | 4 | −26 | −11.38 | −8.13 | −4.88 | −1.63 |
| 230 | 3 | 38 | 16.63 | 11.88 | 7.13 | 2.38 | 230 | 4 | −25 | −10.94 | −7.81 | −4.69 | −1.56 |
| 231 | 3 | 39 | 17.06 | 12.19 | 7.31 | 2.44 | 231 | 4 | −24 | −10.50 | −7.50 | −4.50 | −1.50 |
| 232 | 3 | 40 | 17.50 | 12.50 | 7.50 | 2.50 | 232 | 4 | −23 | −10.06 | −7.19 | −4.31 | −1.44 |
| 233 | 3 | 41 | 17.94 | 12.81 | 7.69 | 2.56 | 233 | 4 | −22 | −9.63 | −6.88 | −4.13 | −1.38 |
| 234 | 3 | 42 | 18.38 | 13.13 | 7.88 | 2.63 | 234 | 4 | −21 | −9.19 | −6.56 | −3.94 | −1.31 |
| 235 | 3 | 43 | 18.81 | 13.44 | 8.06 | 2.69 | 235 | 4 | −20 | −8.75 | −6.25 | −3.75 | −1.25 |
| 236 | 3 | 44 | 19.25 | 13.75 | 8.25 | 2.75 | 236 | 4 | −19 | −8.31 | −5.94 | −3.56 | −1.19 |
| 237 | 3 | 45 | 19.69 | 14.06 | 8.44 | 2.81 | 237 | 4 | −18 | −7.88 | −5.63 | −3.38 | −1.13 |
| 238 | 3 | 46 | 20.13 | 14.38 | 8.63 | 2.88 | 238 | 4 | −17 | −7.44 | −5.31 | −3.19 | −1.06 |
| 239 | 3 | 47 | 20.56 | 14.69 | 8.81 | 2.94 | 239 | 4 | −16 | −7.00 | −5.00 | −3.00 | −1.00 |
| 240 | 3 | 48 | 21.00 | 15.00 | 9.00 | 3.00 | 240 | 4 | −15 | −6.56 | −4.69 | −2.81 | −0.94 |
| 241 | 3 | 49 | 21.44 | 15.31 | 9.19 | 3.06 | 241 | 4 | −14 | −6.13 | −4.38 | −2.63 | −0.88 |
| 242 | 3 | 50 | 21.88 | 15.63 | 9.38 | 3.13 | 242 | 4 | −13 | −5.69 | −4.06 | −2.44 | −0.81 |

TABLE 16-continued

| Ct | CoutA | ErrorA | ExW0A | ExW1A | ExW2A | ExW3A | Ct | CoutB | ErrorB | ExW0B | ExW1B | ExW2B | ExW3B |
|---|---|---|---|---|---|---|---|---|---|---|---|---|---|
| 243 | 3 | 51 | 22.31 | 15.94 | 9.56 | 3.19 | 243 | 4 | −12 | −5.25 | −3.75 | −2.25 | −0.75 |
| 244 | 3 | 52 | 22.75 | 16.25 | 9.75 | 3.25 | 244 | 4 | −11 | −4.81 | −3.44 | −2.06 | −0.69 |
| 245 | 3 | 53 | 23.19 | 16.56 | 9.94 | 3.31 | 245 | 4 | −10 | −4.38 | −3.13 | −1.88 | −0.63 |
| 246 | 3 | 54 | 23.63 | 16.88 | 10.13 | 3.38 | 246 | 4 | −9 | −3.94 | −2.81 | −1.69 | −0.56 |
| 247 | 3 | 55 | 24.06 | 17.19 | 10.31 | 3.44 | 247 | 4 | −8 | −3.50 | −2.50 | −1.50 | −0.50 |
| 248 | 3 | 56 | 24.50 | 17.50 | 10.50 | 3.50 | 248 | 4 | −7 | −3.06 | −2.19 | −1.31 | −0.44 |
| 249 | 3 | 57 | 24.94 | 17.81 | 10.69 | 3.56 | 249 | 4 | −6 | −2.63 | −1.88 | −1.13 | −0.38 |
| 250 | 3 | 58 | 25.38 | 18.13 | 10.88 | 3.63 | 250 | 4 | −5 | −2.19 | −1.56 | −0.94 | −0.31 |
| 251 | 3 | 59 | 25.81 | 18.44 | 11.06 | 3.69 | 251 | 4 | −4 | −1.75 | −1.25 | −0.75 | −0.25 |
| 252 | 3 | 60 | 26.25 | 18.75 | 11.25 | 3.75 | 252 | 4 | −3 | −1.31 | −0.94 | −0.56 | −0.19 |
| 253 | 3 | 61 | 26.69 | 19.06 | 11.44 | 3.81 | 253 | 4 | −2 | −0.88 | −0.63 | −0.38 | −0.13 |
| 254 | 3 | 62 | 27.13 | 19.38 | 11.63 | 3.88 | 254 | 4 | −1 | −0.44 | −0.31 | −0.19 | −0.06 |
| 255 | 3 | 63 | 27.56 | 19.69 | 11.81 | 3.94 | 255 | 4 | 0 | 0.00 | 0.00 | 0.00 | 0.00 |

A detailed description will now be given of the tables shown in Tables 13-16.

In the tables used in the case where the modulation value for the total density value Ct is not greater than the threshold (the left sides in Tables 13-16), if the modulation value corresponding to the total density value Ct is not greater than the threshold, the maximum value of quantize typical values (0 in the case of Ct<0O) equal to or smaller than the total density value Ct is set to the output quantized value Cout. Diffusion values (ExW0A, ExW1A, ExW2A, and ExW3A in Tables 13 to 16) corresponding to the quantized values are stored as the error diffusion table Error_TableA.

In the tables used in the case where the modulation value for the total density value Ct is greater than the threshold (the right sides in Tables 13-16), if the modulation value corresponding to the total density value Ct is greater than the threshold, the maximum value of the quantized typical values equal to or smaller than the total density value Ct plus 1 is set to the output quantized value Cout. Diffusion values (ExW0B, ExW1B, ExW2B, and ExW3B in Tables 13-16) corresponding to the quantized values are stored as the diffusion error table Error_TableB.

As a result, in either of the case where the modulation values corresponding to the total density values Ct and Mt are greater than thresholds and the case where the modulation values corresponding to the total density values Ct and Mt are not greater than the thresholds, it is possible to refer to tables containing correct calculation results by selecting quantization tables and diffusion error tables according to the comparison results.

A description will now be given of a fifth embodiment of the present invention. The construction of the present embodiment is identical with that of the first embodiment, and thus description thereof is omitted.

As is distinct from the above described first to fourth embodiments in which only the density values of two colors of cyan and magenta are used, the density values of more colors are used according to the present embodiment. Specifically, the first embodiment is applied to provide a multivalued error diffusion method that reduces the dot overlapping of large droplet dark ink and large droplet light ink in cyan, small droplet dark ink and small droplet light ink in cyan, large droplet dark ink and large droplet light ink in magenta, and small droplet dark ink and small droplet light ink in magenta.

In the following description, Cl designates the density value of large droplet dark ink in cyan, Cs designates the density value of small droplet dark ink in cyan, cl designates the density value of large droplet light ink in cyan, cs designates the density value of small droplet light ink in cyan, Ml designates large droplet dark ink in magenta, Ms designates the density value of small droplet dark ink in magenta, ml designates the density value of large droplet light ink in magenta, and ms designates the density value of small droplet light ink in magenta, and accumulated error values for the respective density values are designated by postfixing "err" thereto.

Clt=Cl+Clerr
Cst=Cs+Cserr
clt=cl+clerr
cst=cs+cserr
Mlt=Ml+Mlerr
Mst=Ms+Mserr
mlt=ml+mlerr
mst=ms+mserr
Clout=d(Clt)
Csout=e(Cst)
clout=f(clt)
csout=g(cst)
Mlout=h(Mlt)
Msout=i(Mst)
mlout=j(mlt)
msout=k(mst)
if(Clt>Threshold_Table[Cst+clt+cst+Mlt+Mst+mlt+mst])
[Clout=1, Diffuse ErrTblA[Clt]]
else [Clout=0, Diffuse ErrTblB[Clt]]
if(Cst>Threshold_Table[Clt+clt+cst+Mlt+Mst+mlt+mst])
[Csout=1, Diffuse ErrTblC[Cst]]
else [Csout=0, Diffuse ErrTblD[Cst]]
if(clt>Threshold_Table[Clt+Cst+cst+Mlt+Mst+mlt+mst])
[clout=1, Diffuse ErrTblE[clt]]
else [clout=0, Diffuse ErrTblF[clt]]
if(cst>Threshold_Table[Clt+Cst+clt+Mlt+Mst+mlt+mst])
[csout=1, Diffuse ErrTblG[cst]]
else [csout=0, Diffuse ErrTblH[cst]]
if(Mlt>Threshold_Table[Clt+Cst+clt+cst+Mst+mlt+mst])
[Mlout=1, Diffuse ErrTblI[Mlt]]
else [Mlout=0, Diffuse ErrTblJ[Mlt]]
if(Mst>Threshold_Table[Clt+Cst+clt+cst+Mlt+mlt+mst])
[Msout=1, Diffuse ErrTblK[Mst]]
else [Msout=0, Diffuse ErrTblL[Mst]]
if(mlt>Threshold_Table[Clt+Cst+clt+cst+Mlt+Mst+mst])
[mlout=1, Diffuse ErrTblM[mlt]]
else [mlout=0, Diffuse ErrTblN[mlt]]
if(mst>Threshold_Table[Clt+Cst+clt+cst+Mlt+Mst+mlt])
[msout=1, Diffuse ErrTblO[mst]]
else [msout=0, Diffuse ErrTblP[mst]]

According to the above described method, it is possible to reduce the overlapping of ink groups in a plurality of colors of different densities and different discharge rates, and hence realize high-speed processing with simplified multiplications and divisions.

Similarly, the second to fourth embodiments may be applied to the fifth embodiment.

Although in the following description, processing is performed based on the sum of other density values, the present invention is not limited to this, but the same effects can be obtained by performing processing based on the maximum value, not the sum.

Further, although in the above described first to fifth embodiments, independent tables such as Table 1 for the cyan component and Table 2 for the magenta component as threshold tables and Table 3 for the cyan component and Table4 for the magenta component as modulation tables are used for respective colors, independent tables for respective colors should not necessarily be prepared, but the same table may be commonly used for different colors for the conveyance's sake. Actually, however, considering the possibility that if the same table is used for different colors, error diffusion tendencies of the respective colors are similar to each other, it is preferred that tables whose contents are different at least partially between the colors are used to improve the cyan and magenta distribution effect, thus realizing the image quality.

Further, in the case where the same table is used between the colors, using the inequality sign ($\geqq$) including the equality sign in either the comparison in the steps S802 and S1103 or in the comparison in the steps S807 and S1107 obtains a similar distribution effect.

Likewise, although in the above described first to fifth embodiments, independent tables such as the quantization tables Out_TableA, B and Out_TableC, D, and the diffusion error tables Error_TableA, B and Error_TableC, D are used for the respective colors, independent tables for respective colors should not necessarily be prepared, but for the conveyance's sake, the same table may be used as Out/Error_TableA and Out/Error_TableC and the same table may be used as Out/Error_TableB and Out/Error/TableD, for all the colors. Actually, however, considering the possibility that if the same table is used for different colors, e.g. cyan and magenta, the error diffusion tendencies of the respective colors, are similar to each other, it is preferred that tables whose contents are different at least partially between the colors are used to improve the cyan and magenta distribution effect, thus realizing the image quality.

Although in the above described embodiments, it is assumed that two ink colors consisting of cyan and magenta, two coloring densities consisting of a high density and a low density, and two discharge rates of a high rate and a low rate are used, the present invention is not limited to this, but the present invention may be applied to a larger number of ink colors, a larger number of quantization gradations, a larger number of coloring density gradations, and a larger number of discharge rate gradations.

Further, although in the above described embodiments, droplets discharged from the recording head are ink droplets and liquids stored in the ink tank are inks, what is stored in the ink tank is not limited to inks. For example, processing liquids or the like, which are discharged to a recording medium so as to improve fixability and water resistance of a recorded image or to improve the image quality, may be stored in the ink tank.

Further, particularly among a variety of ink-jet recording methods, high recording density and recording accuracy can be achieved by a method in which a means for generating thermal energy for use in discharge of inks (such as an electric thermal converter and laser beams) is provided to change the condition of inks by the thermal energy.

It is preferred that the typical arrangement and principle of the method are based upon a basic principle disclosed in U.S. Pat. Nos. 4,723,129 and 4,740,796. This method may be applied either to an on-demand printing process or to a continuous printing process, but is particularly effective if applied to the on-demand printing process because the application of at least one driving signal, which corresponds to recording information and causes such a rapid temperature increase as to exceed a nucleate boiling point, to an electric heat converter arranged correspondingly to a sheet and a liquid path holding a liquid (ink) to cause the electric heat converter to generate thermal energy and cause film boiling on a heat operatiing surface of a recording head, thus forming bubbles in a liquid (ink) in one-to-one correspondence with the driving signal. The growth and contraction of the bubbles cause the liquid (ink) to be discharged through a discharge port to form at least one droplet. More preferably, a pulse-shaped signal is used as the driving signal because it enables immediate and proper growth and contraction of the bubbles to discharge a liquid (ink) with high responsiveness.

Preferred examples of the pulse-shaped driving signal in pulse form are disclosed in U.S. Pat. Nos. 4,463,359 and 4,345,262. It should be noted that more excellent recording can be realized by adopting the conditions disclosed in U.S. Pat. No. 4,313,124 related to the temperature increase rate of the thermal operating surface.

The construction of the recording head according to the present invention encompasses those disclosed in U.S. Pat. Nos. 4,558,333 and 4,459,600 in which a recording head is arranged in a region where the heat operating surface is bent, in addition to the construction of the discharge port, liquid paths, and electric heat converters (linear liquid paths or right-angle liquid paths) as disclosed in the above-mentioned U.S. patent publications. In addition, the recording head may be constructed as disclosed in Japanese Laid-Open Patent Publication (Kokai) No. 59-123670, which discloses that a slot common to a plurality of electric heat converters is used as a discharge port of the electric heat converters, or Japanese Laid-Open Patent Publication (Kokai) No. 59-138461 which discloses that an opening for absorbing pressure waves of thermal energy is formed correspondingly to a discharge port.

Further, a full-line type recording head with a length corresponding to the maximum recording medium width with which data can be recorded by a recording apparatus may be constructed such that the required length is satisfied by a combination of a plurality of recording heads as disclosed in the above-mentioned publications or may be constructed as a recording head configured as an integral unit.

In addition, not only a cartridge type recording head formed integrally with an ink tank but also a replaceable chip type recording head capable of being electrically connected to the main body of a recording apparatus and being supplied with inks from the main body of the recording apparatus may be used as the recording head of the above described embodiments.

It is preferred that a restoration means, a preliminary means and so forth for the recording head, are added to the recording apparatus constructed as described above so as to further stabilize the recording operation. Examples of the restoration means, the preliminary means, and so forth for the recording head to be added include a capping means, a cleaning head, a pressurizing or absorbing means, and a preliminary heating means comprised of an electric heat converter or another heating element or a combination thereof. To provide a preliminary discharge mode for performing discharge other than the discharge intended for recording is effective for stable recording.

Further, the recording apparatus may be provided with not only a recording mode in which recording is performed in a main color such as black but also at least either one of a multiple color mode in which recording is performed in a plurality of different colors and a full color mode in which recording is performed in mixed colors irrespective of whether the recording head is configured as an integral unit or is provided in plurality.

Further, although in the above described embodiments, it is assumed that the inks are liquids, it is possible to use inks which solidify at a temperature equal to or lower than room temperature or inks which soften or liquefy at room temperature. Alternatively, in the case of ink-jet recording, since the temperature is controlled by regulating the temperature so as to be within a range between 30° C. and 70° C. such that the viscosity of inks lies in a stable discharge range, any inks can be used insofar as they are in liquid phase when a usage recording signal is applied.

In addition, to positively prevent a temperature increase due to thermal energy by using the termal energy for transition of inks from a solid state to a liquid state, or to prevent evaporation of inks, it is possible to use inks which solidify when left as they are and liquefy when heated. Anyway, the present invention may be applied to the case where inks, which are liquefied only by applying thermal energy thereto, such as inks, which are liquefied by thermal energy applied in response to a recording signal and discharged as liquids, and inks, which have already started solidifying when reaching a recording medium, are used. In this case, inks may be opposed to electric heat converters while being held as liquids or solid matters in concaves or through holes in a porous sheet as disclosed in Japanese Laid-Open Patent Publication (Kokai) No. 54-56847 or Japanese Laid-Open Patent Publication (Kokai) No. 60-71260. According to the present invention, performing the above-mentioned film boiling is the most effective for the above-mentioned color inks.

Further, the recording apparatus according to the present invention may be configured as an integral unit or a separate unit as an image output terminal of information processing equipment such as a computer, or may be implemented by a copying machine used in combination with a reader or the like or a facsimile apparatus having a transmitting and receiving function.

The present invention may either be applied to a system composed of a plurality of apparatuses (e.g. a host computer, interface equipment, a reader, and a printer) or to a single apparatus (e.g. a copying machine, a facsimile machine, or the like).

It is to be understood that the object of the present invention may also be accomplished by supplying a system or an apparatus with a storage medium in which a program code of software which realizes the functions of any of the above described embodiment is stored, and causing a computer (or CPU or MPU) of the system or apparatus to read out and execute the program code stored in the storage medium. In this case, the program code itself read from the storage medium realizes the functions of any of the embodiments described above, and hence the storage medium on which the program code is stored constitutes the present invention. Further, it is to be understood that the functions of any of the above described embodiments may be accomplished not only by executing a program code read out by a computer, but also by causing an OS (Operating System) or the like which operates on the computer to perform a part or all of the actual operations based on instructions of the program code.

Further, it is to be understood that the functions of any of the above described embodiments may be accomplished by writing a program code read out from the storage medium into an expansion board inserted into a computer or a memory provided in an expansion unit connected to the computer and then causing a CPU or the like provided in the expansion board or the expansion unit to perform a part or all of the actual operations based on instructions of the program code.

As described above, according to the present invention, it is possible to perform high-speed processing with simplified multiplications and divisions even in error diffusion comprised of a combination of processes of two or more colors.

What is claimed is:

1. An image processing apparatus that performs error diffusion on multivalued image data composed of a plurality of density components and outputs a result of the error diffusion, comprising:
   a holding device that holds a plurality of error tables;
   a selecting device that, when performing the error diffusion on a first density component among the plurality of density components, selects one error table from the plurality of error tables according to a density value of the first density component and a density value of at least one other density component; and
   a processing device that performs the error diffusion on the multivalued image data using the selected error table.

2. An image processing apparatus according to claim 1, wherein the first density component is different from the other density components in at least one of color, coloring density, and discharge rate.

3. An image processing apparatus that performs error diffusion on multivalued image data composed of a plurality of density components and outputs a result of the error diffusion, comprising:
   a holding device that holds a plurality of error tables;
   a selecting device that, when performing the error diffusion on a first density component among the plurality of density components, selects one error table from the plurality of error tables according to a density value of the first density component and density values of at least two other density components; and
   a processing device that performs the error diffusion on multivalued image data using the selected error table.

4. An image processing apparatus according to claim 3, wherein the first density component is different from the other density components in at least one of color, coloring density, and discharge rate.

5. An image processing apparatus that performs error diffusion on multivalued image data composed of a plurality of density components and outputs a result of the error diffusion, comprising:
   a holding device that holds a plurality of error tables;
   a modulating device that, when performing the error diffusion on a first density component among the plurality of density components, performs modulation on a density value of the first density component and outputs a result of the modulation;

a selecting device that selects one error table from the plurality of error tables according to the outputted result of the modulation and a density value of at least one other density component; and a processing device that performs the error diffusion on the multivalued image data using the selected error table.

6. An image processing apparatus according to claim 5, wherein the first density component is different from the other density components in at least one of color, coloring density, and discharge rate.

7. An image processing apparatus that performs error diffusion on multivalued image data composed of a plurality of density components and outputs a result of the error diffusion, comprising:

a holding device that holds a plurality of error tables;

a modulating device that, when performing error diffusion on a first density component among the plurality of density components, performs modulation on a density value of the first density component and outputs a result of the modulation;

a selecting device that selects one error table from the plurality of error tables according to the outputted result of the modulation and density values of at least two other density components; and a processing device that performs the error diffusion on the multivalued image data using the selected error table.

8. An image processing apparatus according to claim 7, wherein the first density component is different from the other density components in at least one of color, coloring density, and discharge rate.

9. An image processing apparatus that performs error diffusion on multivalued image data composed of a plurality of density components and outputs a result of the error diffusion, comprising:

a holding device that holds a plurality of error tables;

a threshold determining device that, when performing the error diffusion on a first density component among the plurality of density components, determines a threshold according to a density value of at least one other density component;

a comparing device that performs comparison between the threshold determined by said threshold determining device and the first density component, and outputs a result of the comparison;

a selecting device that selects one error table from the plurality of error tables according to the outputted result of the comparison; and a processing device that performs the error diffusion on the multivalued image data using the selected error table.

10. An image processing apparatus according to claim 9, wherein the first density component is different from the other density components in at least one of color, coloring density, and discharge rate.

11. An image processing apparatus that performs error diffusion on multivalued image data composed of a plurality of density components and outputs a result of the error diffusion, comprising:

a holding device that holds a plurality of error tables;

a determining device that, when performing the error diffusion on a first density component among the plurality of density components, determines a threshold according to at least one of a sum of and a maximum value of density values of at least two other density components;

a comparing device that performs comparison between the determined threshold and the first density component, and outputs a result of the comparison;

a selecting device that selects one error table from the plurality of error tables according to the outputted result of the comparison; and a processing device that performs the error diffusion on the multivalued image data using the selected error table.

12. An image processing apparatus according to claim 11, wherein the first density component is different from the other density components in at least one of color, coloring density, and discharge rate.

13. An image processing apparatus that performs error diffusion on multivalued image data composed of a plurality of density components and outputs a result of the error diffusion, comprising:

a holding device that holds a plurality of quantization tables;

a modulating device that, when performing the error diffusion on a first density component among the plurality of density components, performs modulation on a density value of the first component and outputs a result of the modulation;

a determining device that determines a threshold according to a density value of at least one other density component;

a comparing device that performs comparison between the determined threshold and the outputted result of the modulation, and outputs a result of the comparison;

a selecting device that selects one quantization table from the plurality of quantization tables according to the outputted result of the comparison; and a processing device that performs the error diffusion on the multivalued image data using the selected quantization table.

14. An image processing apparatus according to claim 13, wherein the first density component is different from the other density components in at least one of color, coloring density, and discharge rate.

15. An image processing apparatus that performs error diffusion on multivalued image data composed of a plurality of density components and outputs a result of the error diffusion, comprising:

a holding device that holds a plurality of quantization tables;

a modulating device that, when performing the error diffusion on a first density component among the plurality of density components, performs modulation on a density value of the first component and outputs a result of the modulation;

a determining device that determines a threshold according to at least one of a sum of and a maximum value of density values of at least two other density components;

a comparing device that performs comparison between the determined threshold and the outputted result of the modulation, and outputs a result of the comparison;

a selecting device that selects one quantization table from the plurality of quantization tables according to the outputted result of the comparison; and a processing device that performs the error diffusion on the multivalued image data using the selected quantization table.

16. An image processing apparatus according to claim 15, wherein the first density component is different from the other density components in at least one of color, coloring density, and discharge rate.

17. An image processing method that performs error diffusion on multivalued image data composed of a plurality of density components and outputs a result of the error diffusion, comprising the steps of:
  selecting one error table from a plurality of error tables, held in advance, according to a density value of a first density component among the plurality of density components and a density value of at least one other density component when performing the error diffusion on the first density component among the plurality of density components; and
  performing the error diffusion on the multivalued image data using the selected error table.

18. An image processing method according to claim 17, wherein the first density component is different from the other density components in at least one of color, coloring density, and discharge rate.

19. A computer-readable storage medium storing a program that performs error diffusion on multivalued image data composed of a plurality of density components and outputting a result of the error diffusion, wherein the program includes:
  a module operable when performing the error diffusion on a first density component among the plurality of density components, for selecting one error table from a plurality of error tables, held in advance, according to a density value of the first density component and a density value of at least one other density component; and
  a module for performing the error diffusion on the multivalued image data using the selected error table.

20. A computer-readable storage medium according to claim 19, wherein the first density component is different from the other density components in at least one of color, coloring density, and discharge rate.

* * * * *